United States Patent
Fukui

(10) Patent No.: US 12,088,924 B2
(45) Date of Patent: Sep. 10, 2024

(54) IMAGE CAPTURE APPARATUS, CONTROL METHOD, AND COMPUTER-EXECUTABLE MEDIUM

(71) Applicant: CANON KABUSHIKI KAISHA, Tokyo (JP)

(72) Inventor: Takaaki Fukui, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 111 days.

(21) Appl. No.: 17/815,826

(22) Filed: Jul. 28, 2022

(65) Prior Publication Data

US 2023/0034719 A1  Feb. 2, 2023

(30) Foreign Application Priority Data

Jul. 30, 2021 (JP) .................. 2021-125340
Mar. 14, 2022 (JP) .................. 2022-039638

(51) Int. Cl.
*H04N 23/743* (2023.01)
*H04N 5/33* (2023.01)
(Continued)

(52) U.S. Cl.
CPC ............. *H04N 23/743* (2023.01); *H04N 5/33* (2013.01); *H04N 23/20* (2023.01); *H04N 23/56* (2023.01);
(Continued)

(58) Field of Classification Search
None
See application file for complete search history.

(56) References Cited

U.S. PATENT DOCUMENTS

2009/0046815 A1   2/2009 Oh
2013/0002882 A1*  1/2013 Onozawa ............. G01S 7/4863
                                              348/E5.09
(Continued)

FOREIGN PATENT DOCUMENTS

EP   2984541 A1   2/2016
EP   3163422 A1   5/2017
(Continued)

OTHER PUBLICATIONS

H. Yamazoe et al., "A body-mounted camera system for head-pose estimation and user-view image synthesis", Elsevier—Image and Vision Computing, vol. 25, Issue 12, Dec. 3, 2007, 1848-1855.

*Primary Examiner* — Mark T Monk
(74) *Attorney, Agent, or Firm* — Canon U.S.A., Inc. I.P. Division

(57) ABSTRACT

A camera body includes an infrared LED that applies infrared light toward a face of a user that is a subject, and an infrared detection camera. The camera body determines a first irradiation amount of the infrared LED and a second exposure condition of the infrared detection camera in accordance with an LED OFF image acquired by capturing an image of the subject in a first exposure condition used by the infrared detection camera without the infrared light applied toward the subject, acquires the LED OFF image and acquires an image (LED ON image) of the subject irradiated with a first irradiation amount in image capture in a second exposure condition used by the infrared detection camera, and detect a face direction of the subject by using a difference image between these images.

23 Claims, 65 Drawing Sheets

(51) Int. Cl.
  *H04N 23/20* (2023.01)
  *H04N 23/56* (2023.01)
  *H04N 23/611* (2023.01)
  *H04N 23/617* (2023.01)
  *H04N 23/68* (2023.01)
  *H04N 25/58* (2023.01)

(52) U.S. Cl.
  CPC ......... *H04N 23/611* (2023.01); *H04N 23/617* (2023.01); *H04N 23/6811* (2023.01); *H04N 25/58* (2023.01)

(56) References Cited

U.S. PATENT DOCUMENTS

| | | |
|---|---|---|
| 2014/0355767 A1 | 12/2014 | Virette |
| 2015/0310263 A1 | 10/2015 | Zhang |
| 2015/0316981 A1 | 11/2015 | Sellen |
| 2017/0199579 A1 | 7/2017 | Chen |
| 2019/0163964 A1* | 5/2019 | Kawamae ............ H04N 25/135 |
| 2020/0137298 A1* | 4/2020 | Eslami ................ H04N 23/632 |
| 2020/0304718 A1 | 9/2020 | Toriumi |
| 2021/0034904 A1 | 2/2021 | Lee |

FOREIGN PATENT DOCUMENTS

| | | |
|---|---|---|
| GB | 2607151 A | 11/2022 |
| GB | 2611154 A | 3/2023 |
| JP | 2002132448 A | 5/2002 |
| JP | 2005322077 A | 11/2005 |
| JP | 2007074033 A | 3/2007 |
| JP | 2012039359 A | 2/2012 |
| JP | 2014181949 A | 9/2014 |
| JP | 2017060078 A | 3/2017 |
| WO | 2013065868 A1 | 5/2013 |

* cited by examiner

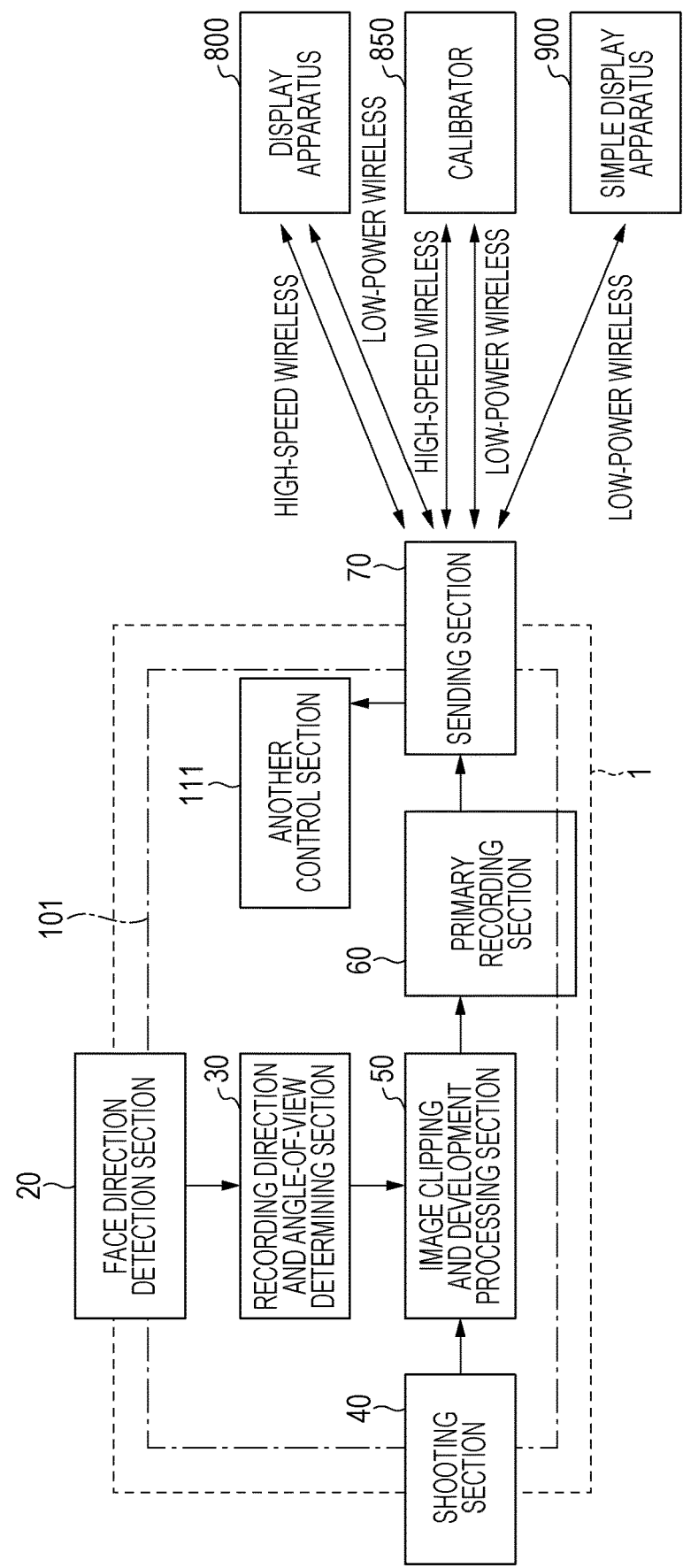

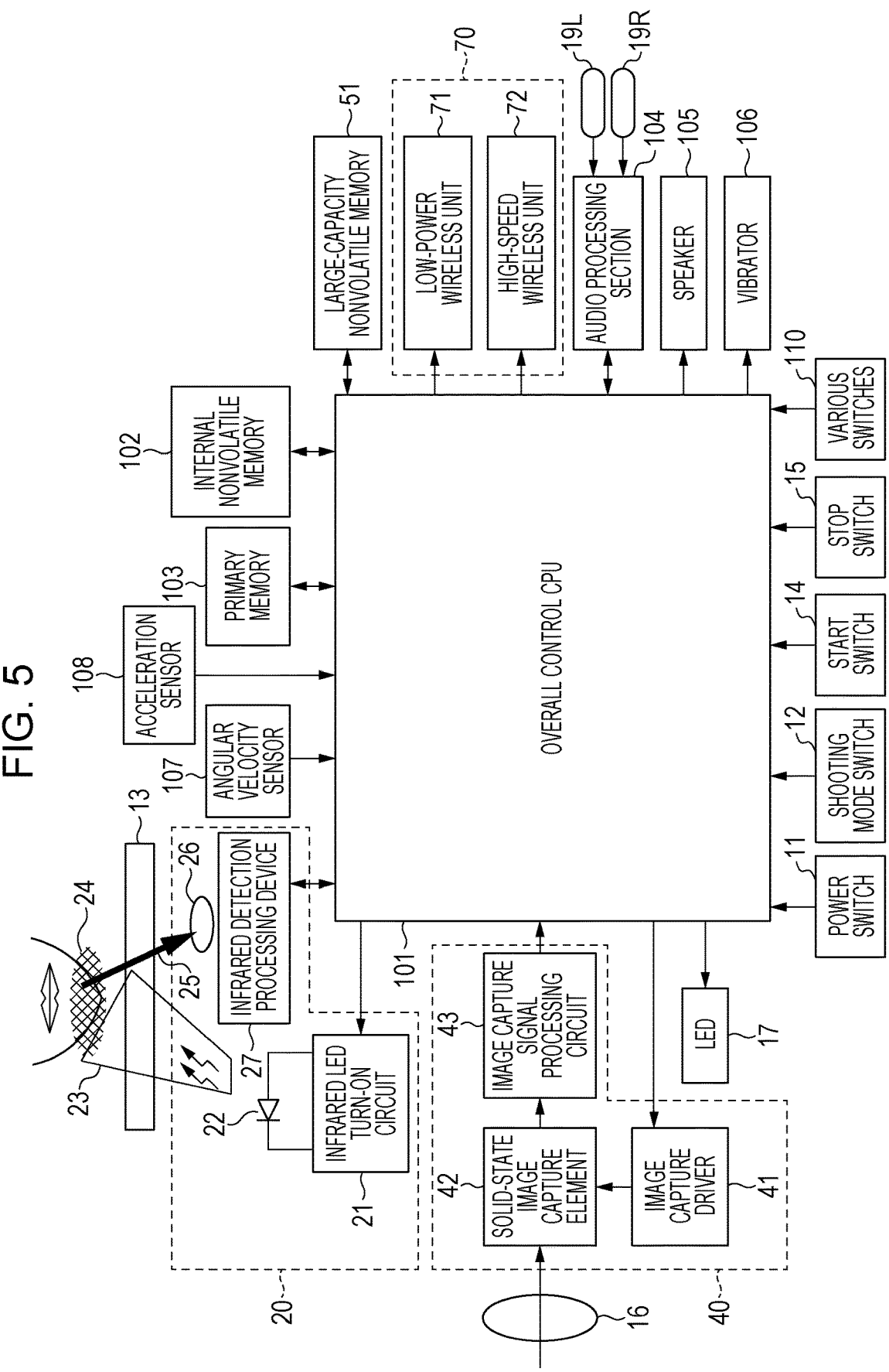

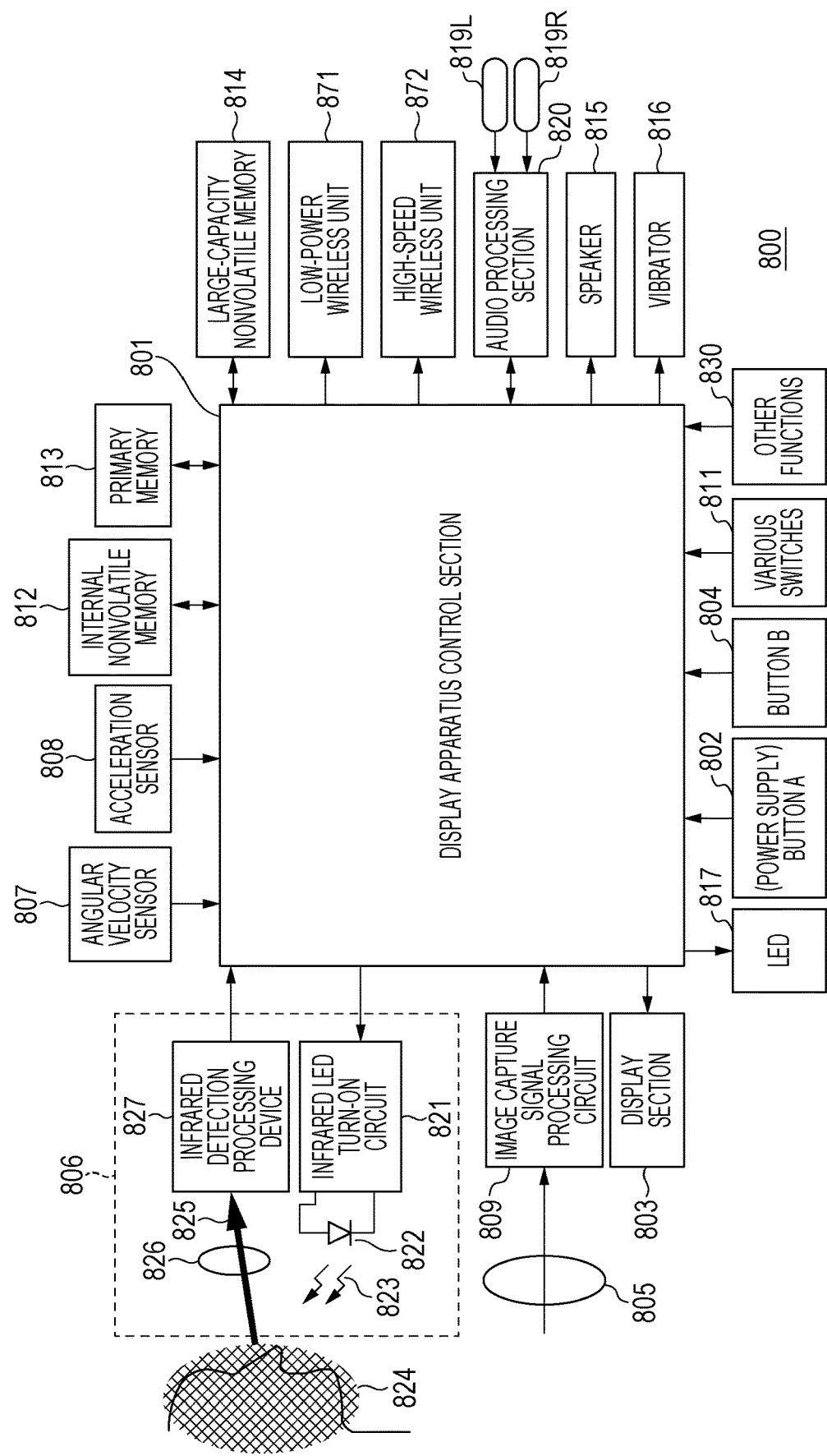

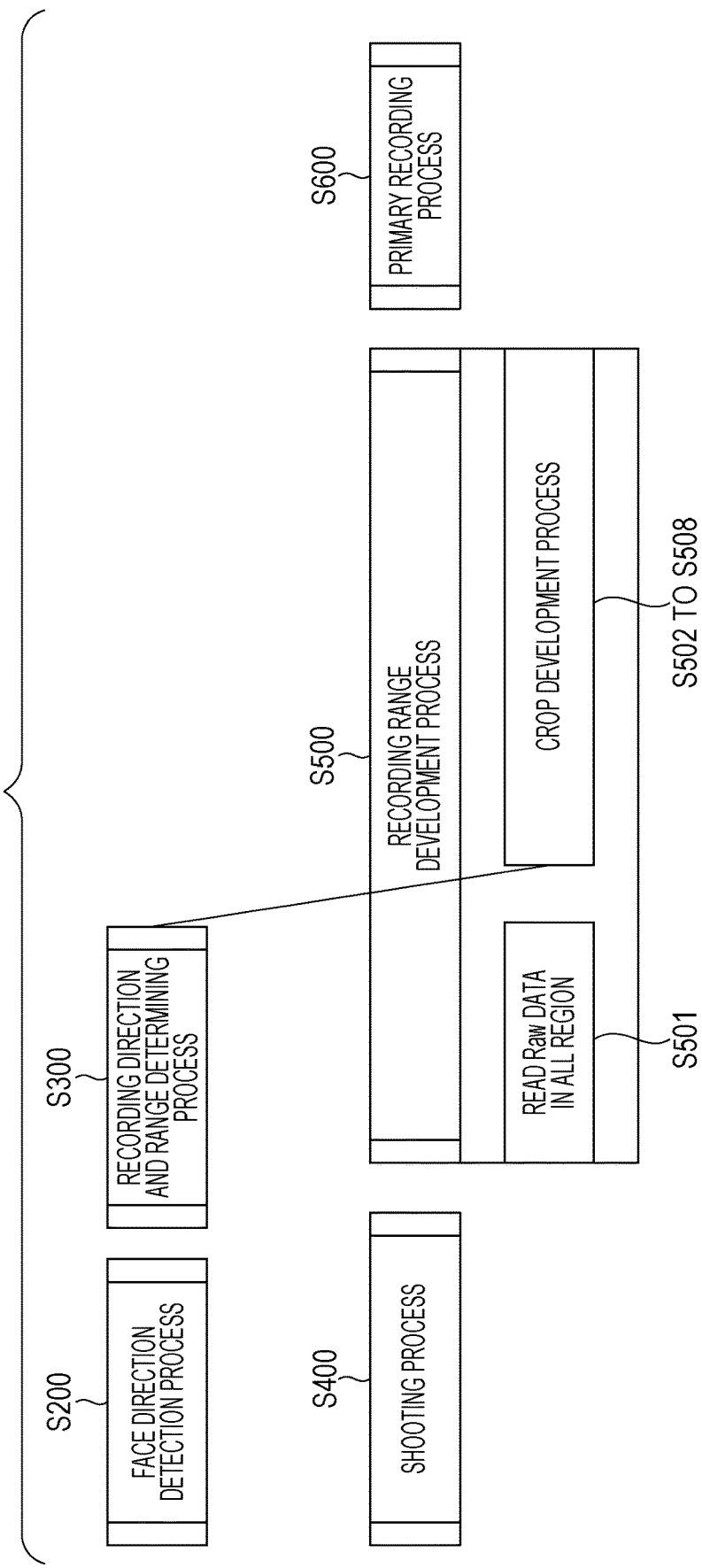

(A)　　　　　　　　　　(B)

(A)　　　　　　　　　(B)

FIG. 9A
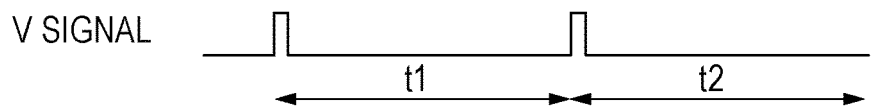
FIG. 9B
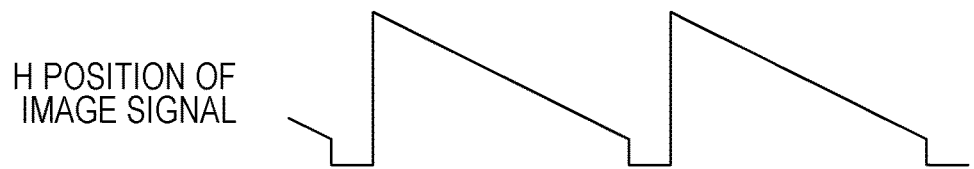
FIG. 9C
FIG. 9D
FIG. 9E

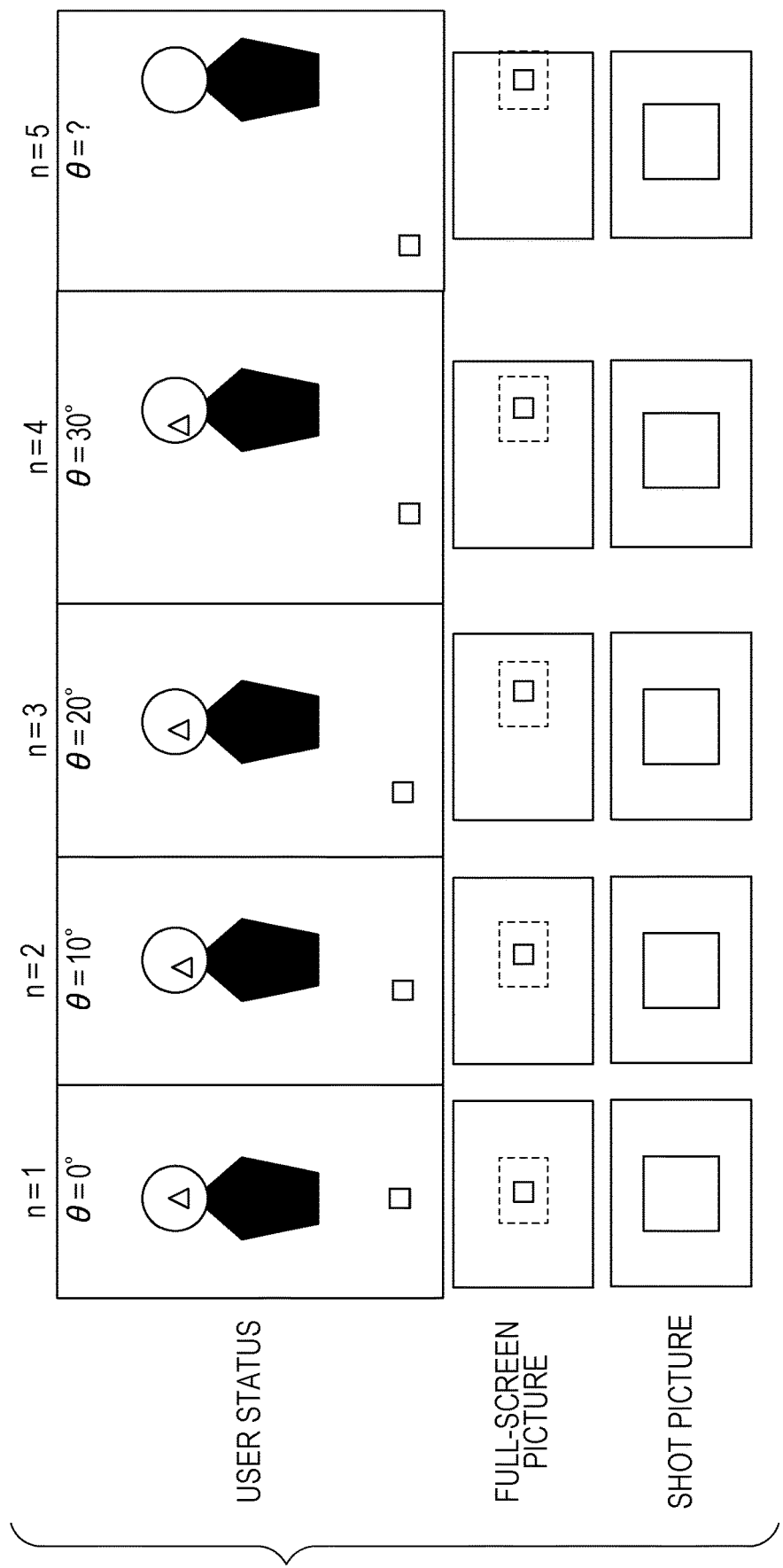

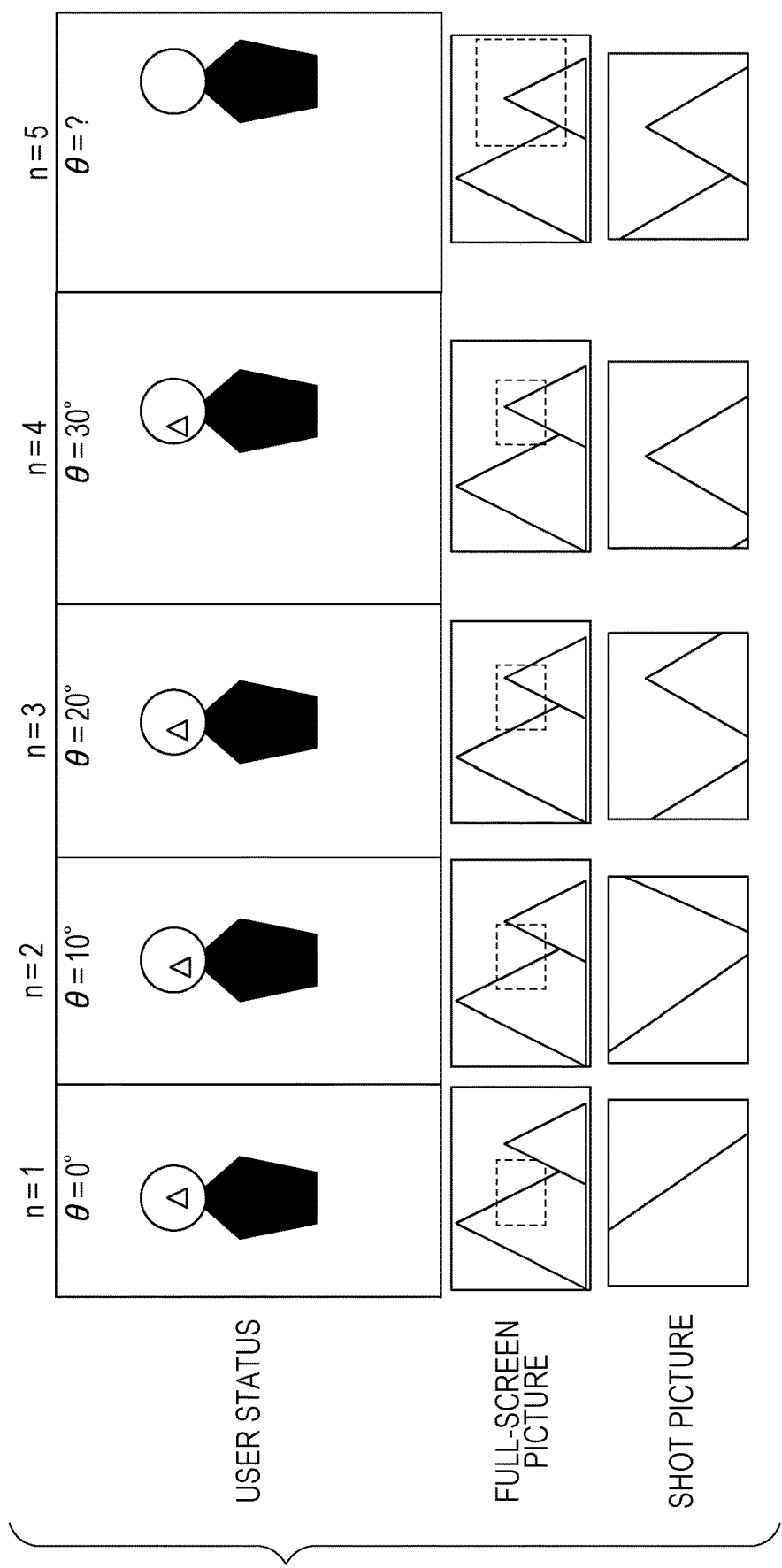

FACING FORWARD

FACING TO RIGHT
AT 45 DEGREES

FACING TO RIGHT
AT 90 DEGREES

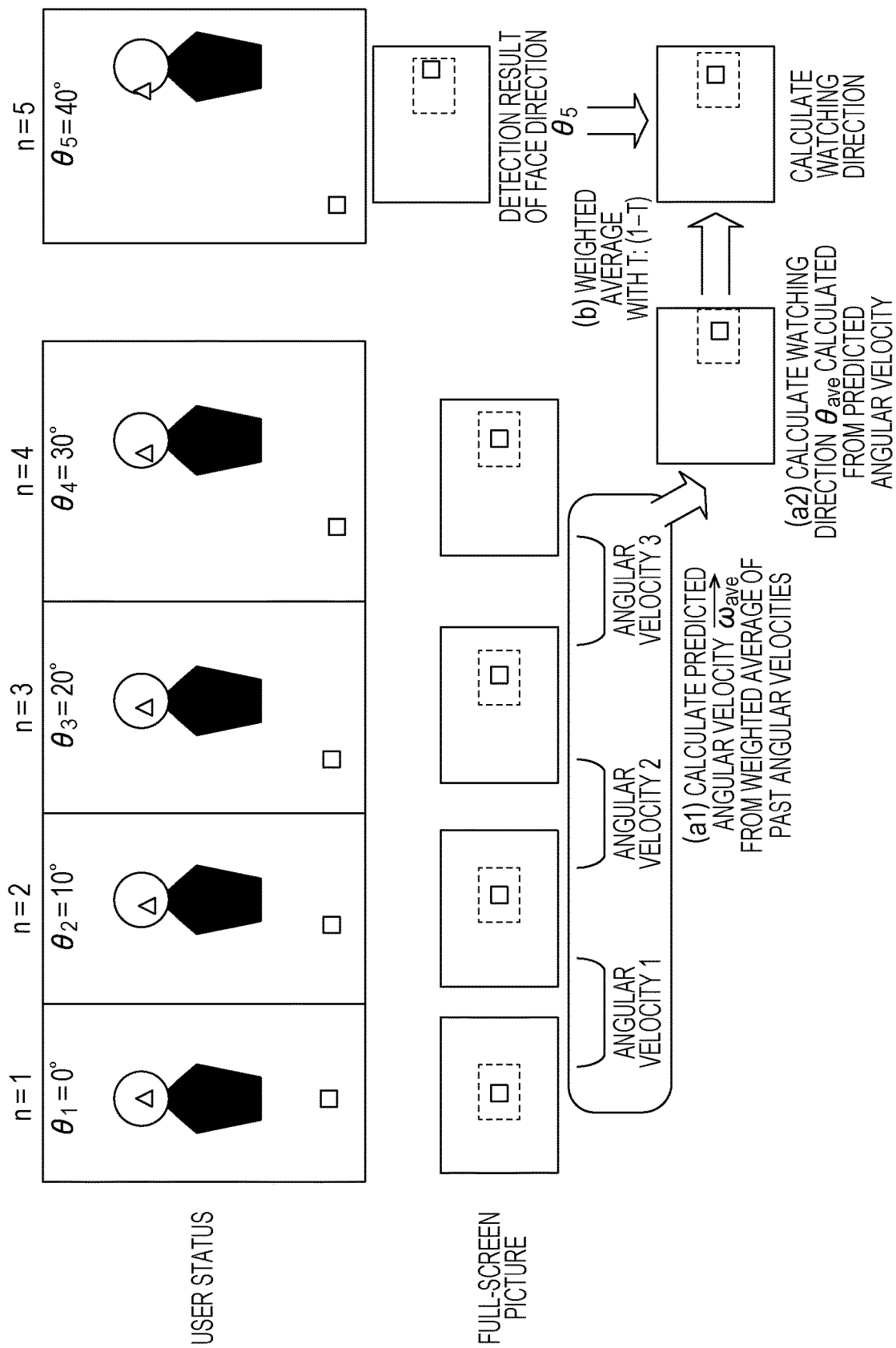

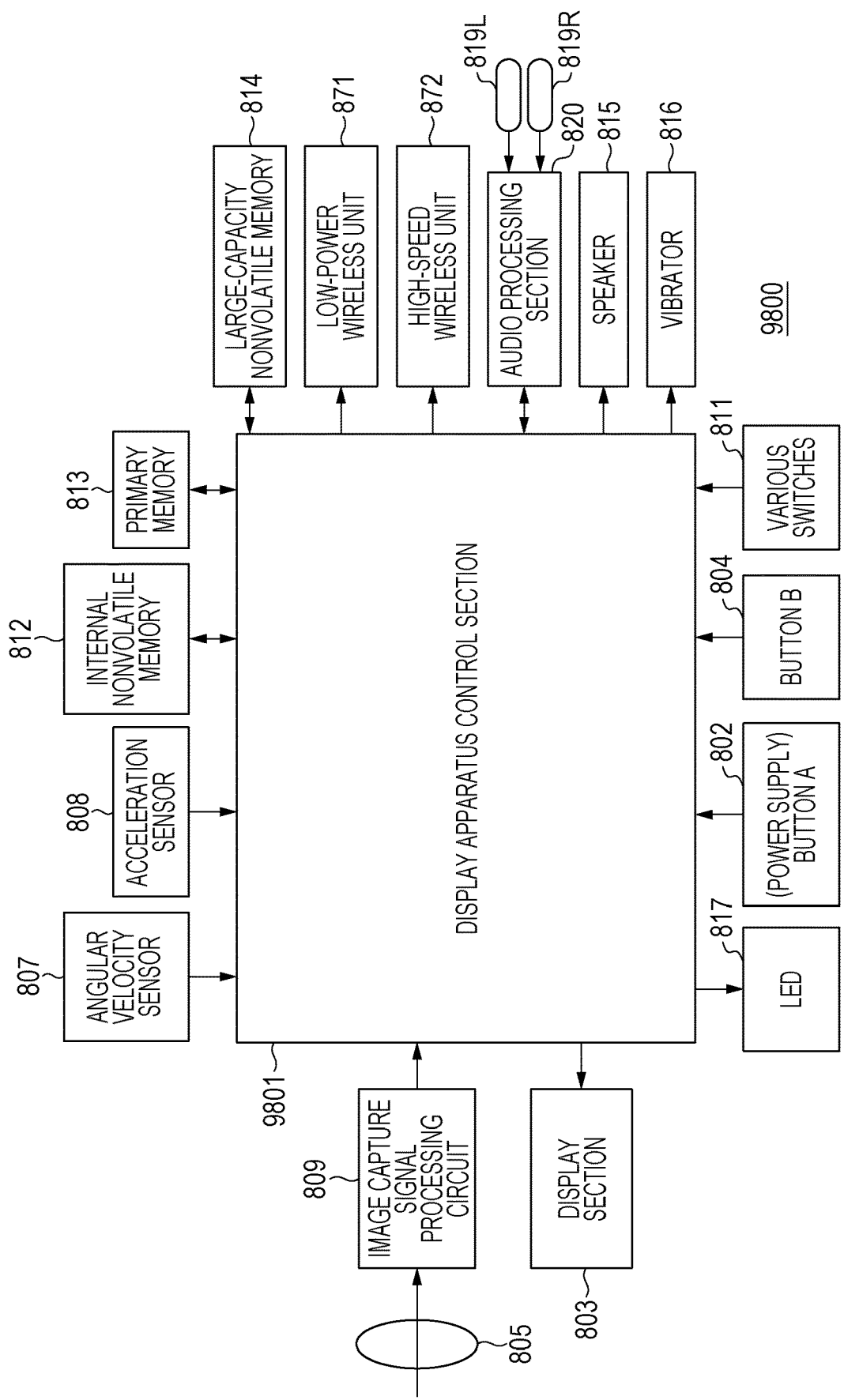

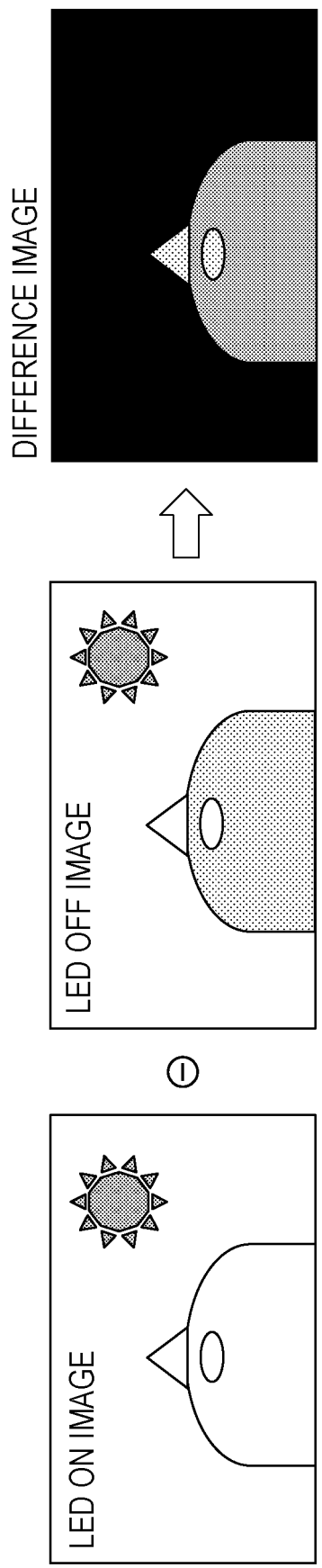

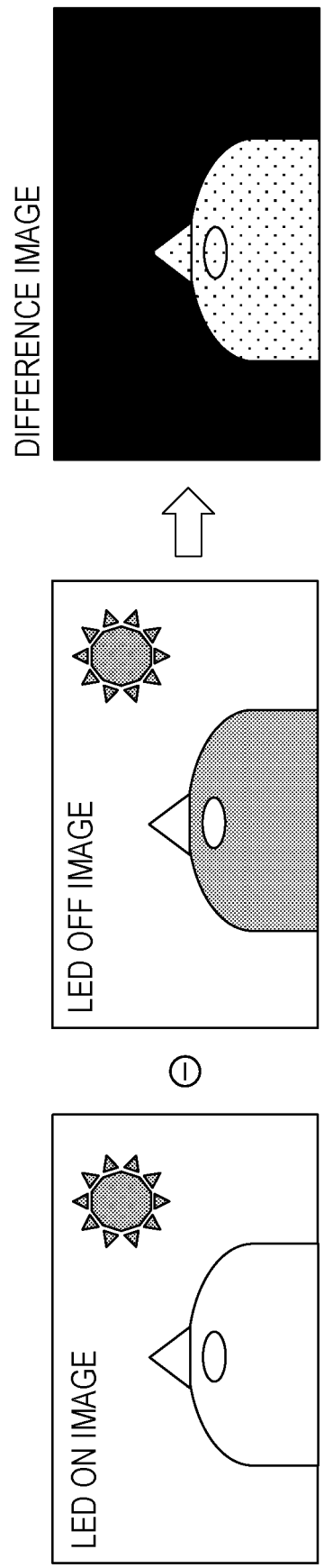

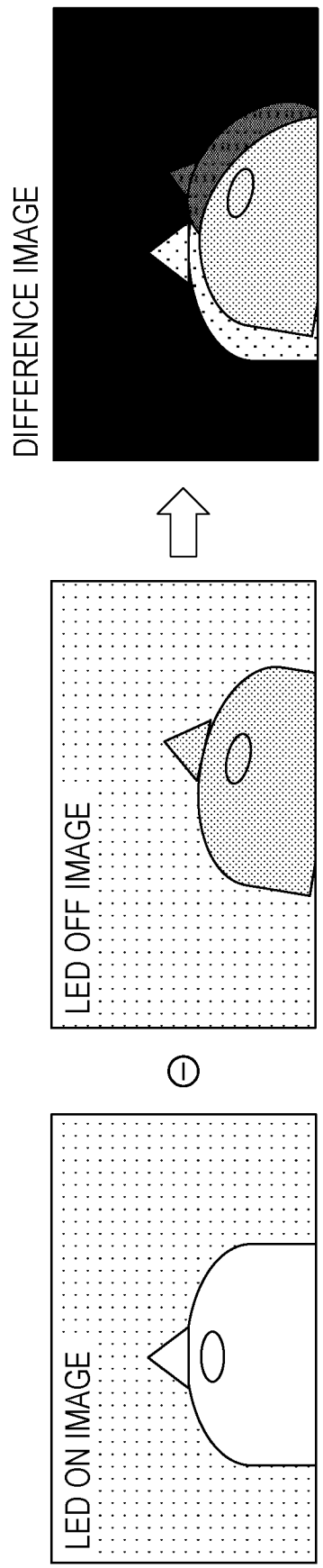

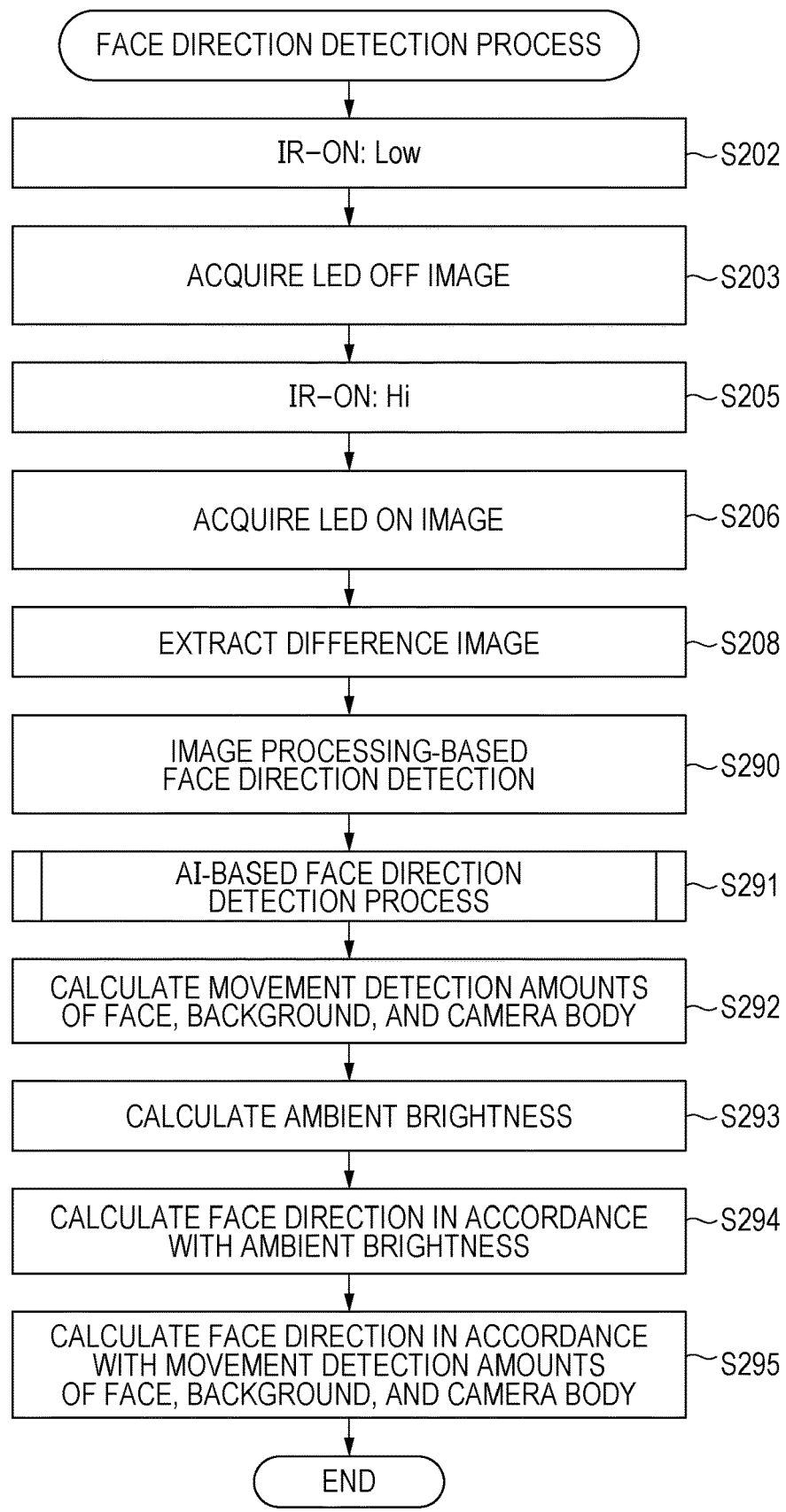

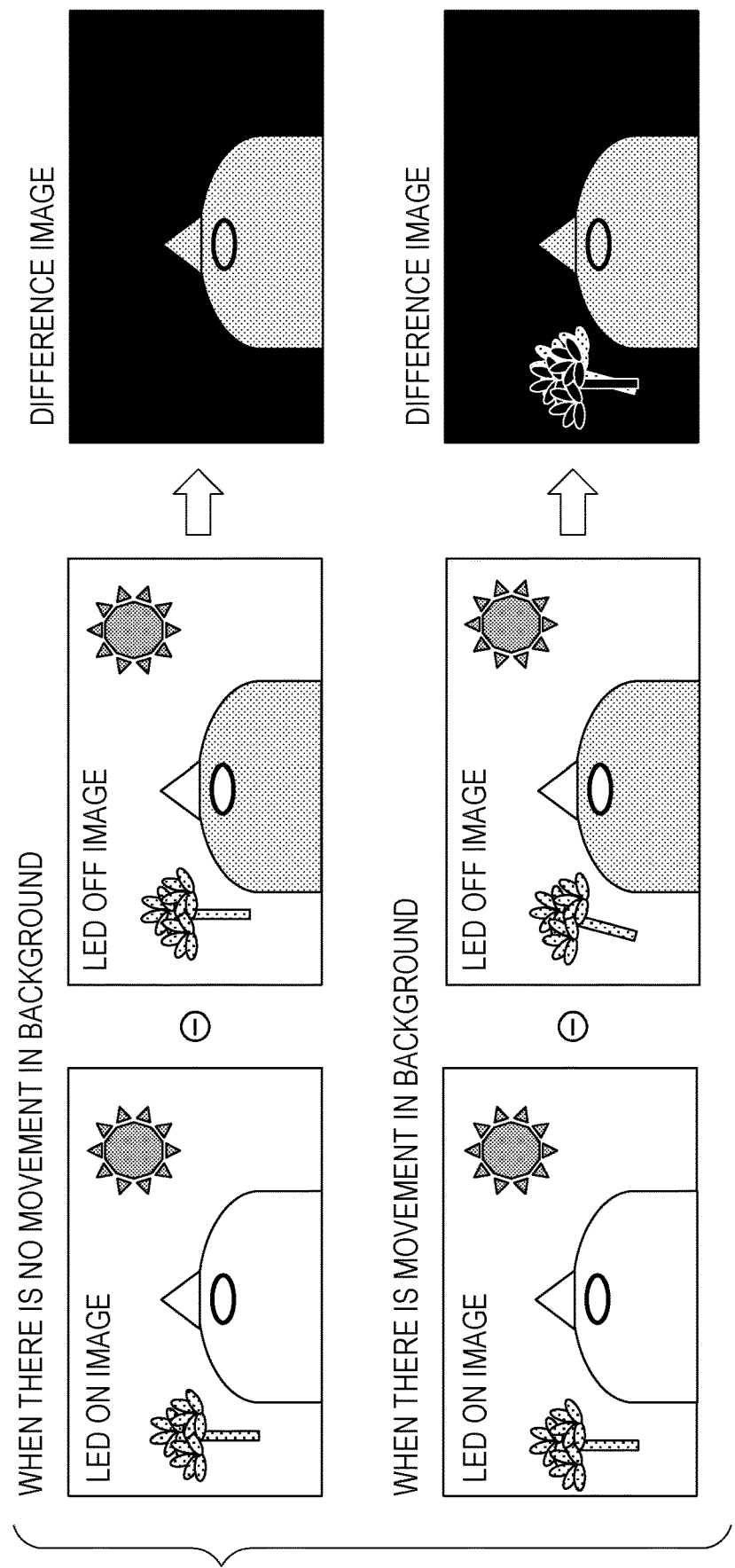

IMAGE CAPTURE APPARATUS, CONTROL METHOD, AND COMPUTER-EXECUTABLE MEDIUM

BACKGROUND

Field

The present disclosure relates to an image capture apparatus used as an action camera, a control method, and a program.

Description of the Related Art

In existing image capture apparatuses, there are techniques for detecting a subject by applying light and methods of improving subject detection accuracy by applying light multiple times.

For example, Japanese Patent Laid-Open Publication No. 2014-181949 describes a technique in which a target region is irradiated with light while changing the light amount at different timings, an image region to be excluded from a detection object is calculated from a difference in the luminance values of an image captured by a sensor, and a physical object is detected from another image region other than the excluded image region.

Japanese Patent Laid-Open Publication No. 2002-132448 describes a technique for improving the accuracy of detecting a light source that is a subject by distinguishing light from the light source and disturbance light from other objects in accordance with a difference in the amount of received light (output waveform) of a sensor array at the time of turning on and turning off the light source (light spot).

SUMMARY OF THE INVENTION

The present disclosure provides an image capture apparatus, a control method, and a program capable of accurately detecting a subject in various environments.

An aspect of the present disclosure provides an image capture apparatus. The image capture apparatus includes an irradiation unit configured to apply illumination toward a subject, a first image capture unit, one or more processors and a memory storing a program which, when executed by the one or more processors, causes the image capture apparatus to function as, a first image acquiring unit configured to acquire a first image by capturing an image of the subject in a first exposure condition with the first image capture unit in a state where the illumination is not applied toward the subject, a first determining unit configured to determine a first irradiation amount used by the irradiation unit, and a second exposure condition in accordance with the first image, a second image acquiring unit configured to acquire a second image by capturing an image of the subject in a second exposure condition with the first image capture unit in a state where the illumination is applied toward the subject with the first irradiation amount, a third image acquiring unit configured to acquire a third image by capturing an image of the subject in the second exposure condition with the first image capture unit in a state where the illumination is not applied toward the subject, and a status detection unit configured to detect a status of the subject by using a difference image between the second image and the third image.

Another aspect of the present disclosure provides an image capture apparatus. The image capture apparatus includes an irradiation unit configured to apply illumination toward a subject, a first image capture unit, one or more processors and a memory storing a program which, when executed by the one or more processors, causes the image capture apparatus to function an unirradiated image acquiring unit configured to acquire an unirradiated image by capturing an image of the subject with the first image capture unit in a state where the illumination is not applied toward the subject, an irradiated image acquiring unit configured to acquire an irradiated image by capturing an image of the subject with the first image capture unit in a state where the illumination is applied toward the subject, a first status detection unit configured to detect a status of the subject as a first result by using one of the unirradiated image and the irradiated image, a second status detection unit configured to detect a status of the subject as a second result by using the unirradiated image and the irradiated image, and a status calculating unit configured to calculate a status of the subject by using the first and second results.

Further features of the present disclosure will become apparent from the following description of embodiments with reference to the attached drawings.

BRIEF DESCRIPTION OF THE DRAWINGS

FIG. 4 is a functional block diagram of the camera body according to the first embodiment.

FIG. 5 is a block diagram showing the hardware configuration of the camera body.

FIG. 6 is a block diagram showing the hardware configuration of the display apparatus.

FIG. 7F is a diagram for illustrating processes from step S200 to step S600 of FIG. 7A in a moving image mode.

FIG. 8C is a view showing a picture in a case where the images of the user and the fluorescent lamps serving as its background, shown in FIG. 8B, are formed by a sensor of the infrared detection processing device through the face direction detection window in a state where an infrared LED of the infrared detection processing device is not turned on.

FIG. 8D is a view showing a picture in a case where the images of the user and the fluorescent lamps serving as its background, shown in FIG. 8B, are formed by the sensor of the infrared detection processing device through the face direction detection window in a state where the infrared LED is turned on.

FIG. 9A to FIG. 9E are timing charts showing the turn-on timing of the infrared LED.

FIG. 21A is a view showing the relationship between a watching direction detected status of the user for each frame and a shot picture according to the second embodiment.

FIG. 21B is a view showing the relationship between a watching direction detected status of the user for each frame and a shot picture in a subject lost mode according to the second embodiment.

FIG. 25 is a schematic diagram of the watching direction determining process at the time of acquiring the face direction in the third embodiment.

FIG. 26A is a block diagram showing the hardware configuration of a display apparatus to be connected to a camera body serving as an image capture apparatus according to a fourth embodiment.

FIG. 28C shows schematic diagrams of an LED OFF image and an LED ON image shot without appropriately setting an exposure condition according to the condition of outside light in an environment in which a large amount of infrared component is included in outside light, and a difference image between these images.

FIG. 28D shows schematic diagrams of an LED OFF image and an LED ON image shot with an exposure condition appropriately set according to the condition of outside light in the face direction detection process of FIG. 27A in an environment in which a large amount of infrared component is included in outside light, and a difference image between these images.

FIG. 28F shows schematic diagrams of an LED OFF image and an LED ON image shot in a case where there is a movement in the face of a cameraman, and a difference image between these images.

FIG. 31 is a flowchart of a subroutine of the face direction detection process of step S200 of FIG. 7A according to a sixth embodiment.

FIG. 33B shows schematic diagrams showing a state where a difference image between an LED ON image and an LED OFF image is generated when there occurs a movement in the background of a subject.

DESCRIPTION OF THE EMBODIMENTS

In studying an image capture apparatus capable of accurately detecting a subject in various environments, for example, the technique described in Japanese Patent Laid-Open Publication No. 2014-181949 is not able to properly detect a subject because the sensor can often become saturated in outdoor environments in which the sunshine is strong. Embodiments of the present disclosure address at least part of these inconveniences. Hereinafter, embodiments of the present disclosure will be described in detail with reference to the attached drawings.

First Embodiment

FIG. 1A to FIG. 1D are views for illustrating a camera system made up of a camera body 1 and a display apparatus 800. The camera body 1 includes a shooting and detection section 10 and serves as a wearable image capture apparatus according to the present embodiment. The display apparatus 800 is provided separately from the camera body 1. In the present embodiment, an example in which the camera body 1 and the display apparatus 800 are separate will be described; however, the camera body 1 and the display apparatus 800 may be integrated. The camera body 1 may include a function other than a camera that will be described in the present embodiment, such as a media player, a communications function, and a GPS function, as a mobile device. A user wearing the camera body 1 around the neck is, hereinafter, referred to as user.

Figure 1A:
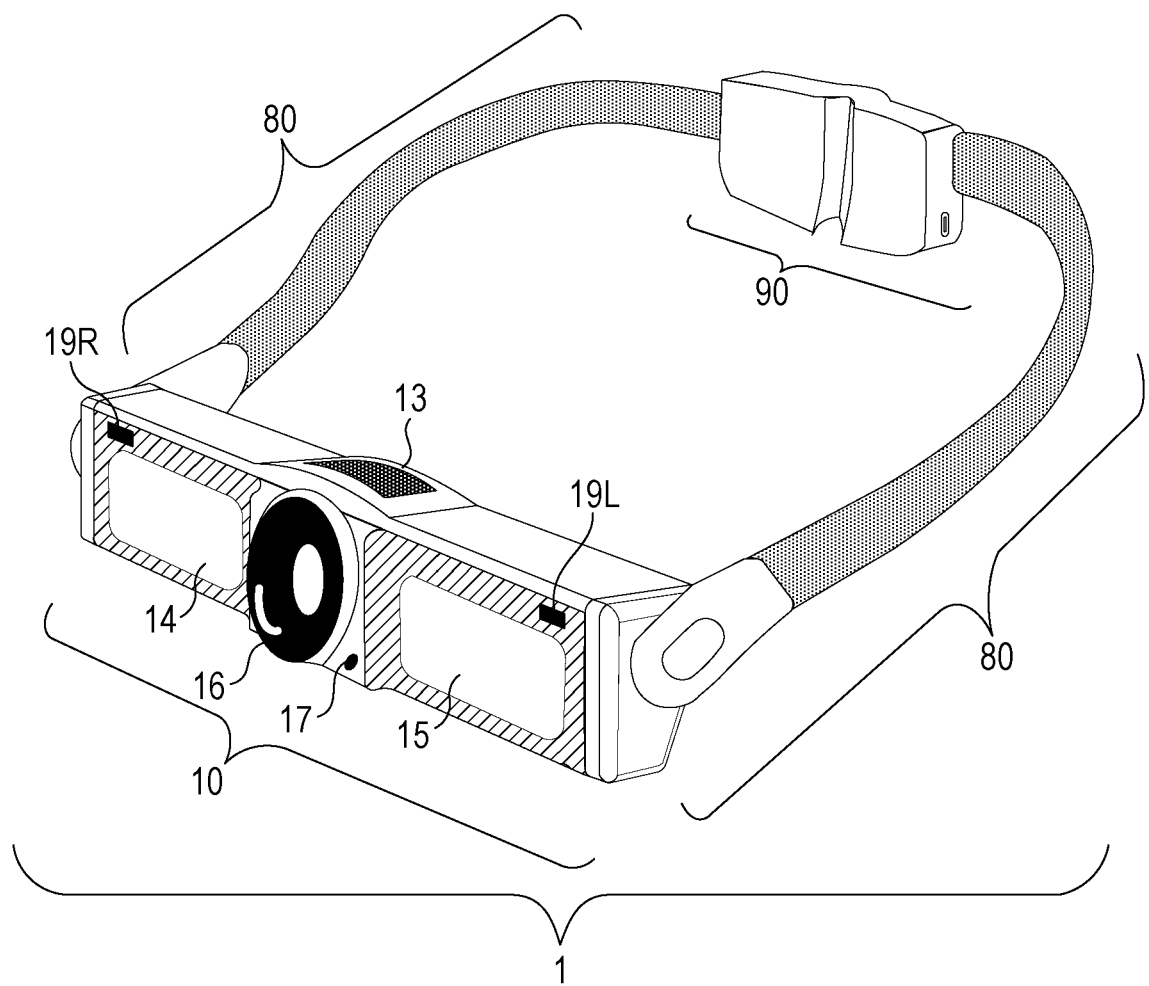
FIG. 1A is an outer appearance view of a camera body that includes a shooting and detection section and that serves as an image capture apparatus according to a first embodiment.

FIG. 1A is an outer appearance view of the camera body 1.

In FIG. 1A, the camera body 1 includes a shooting and detection section 10, a battery section 90, and connection sections 80 that connect the shooting and detection section 10 with the battery section 90 (power supply unit).

The shooting and detection section 10 includes a face direction detection window 13, a start switch 14, a stop switch 15, a taking lens 16, an LED 17, and microphones 19R, 19L.

The face direction detection window 13 passes infrared light projected from an infrared LED turn-on circuit 21 (infrared irradiation unit in FIG. 5) for detecting the positions of the parts of the face of the user, and its reflected light. The infrared LED turn-on circuit 21 is incorporated in the shooting and detection section 10.

The start switch 14 is a switch to start shooting.

The stop switch 15 is a switch to stop shooting.

The taking lens 16 guides shooting light to a solid-state image capture element 42 (FIG. 5) inside the shooting and detection section 10.

The LED 17 is an LED used to indicate shooting of a picture or indicate a warning.

The microphones 19R, 19L are microphones that take in ambient sound. The microphone 19L takes in sound on the left side (the reader's right side in FIG. 1A) around the user. The microphone 19R takes in sound on the right side (the reader's left side in FIG. 1A) around the user.

Figure 1B:
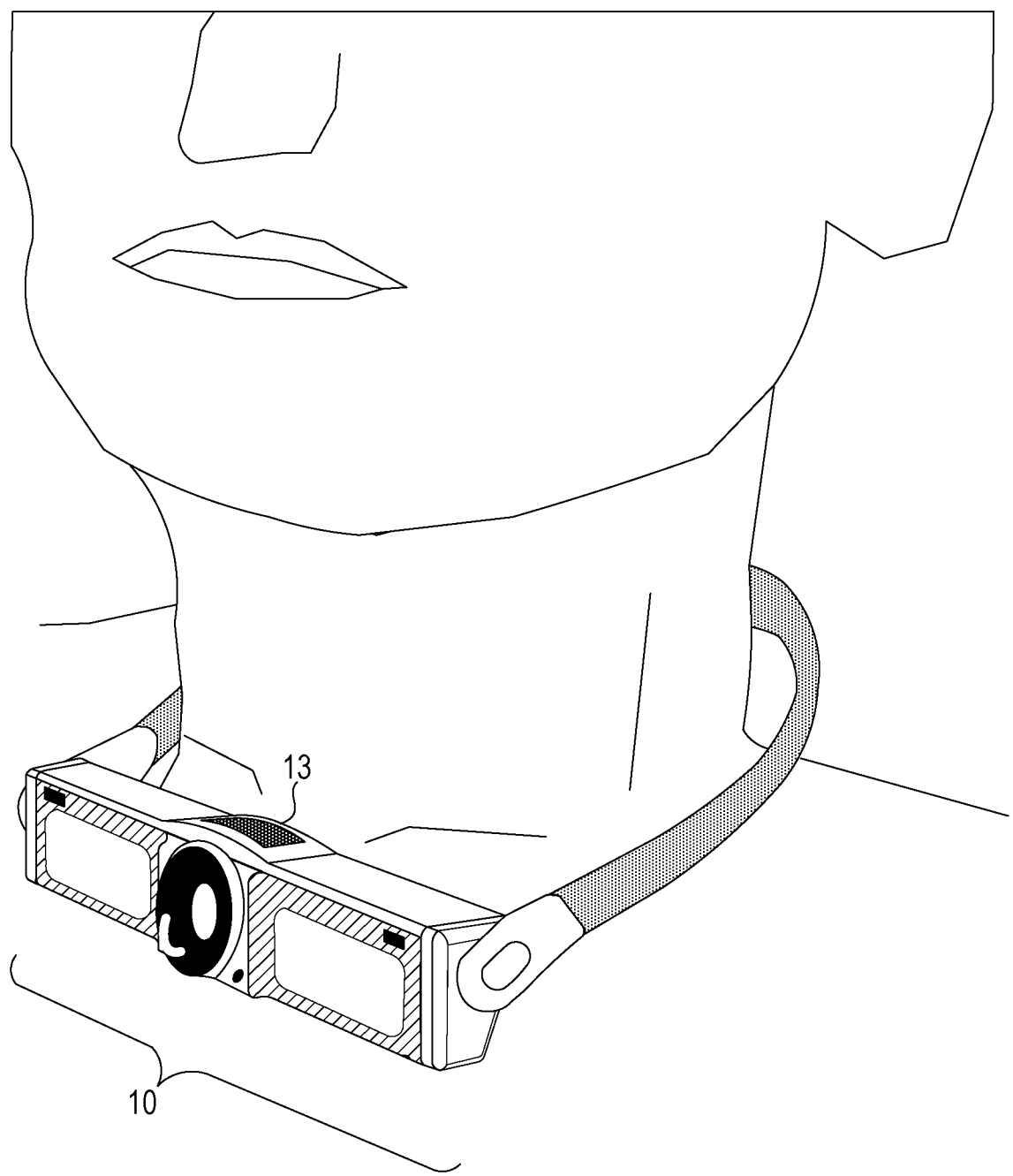
FIG. 1B is a view showing a state where a user is wearing the camera body.

FIG. 1B is a view showing a state where the user is wearing the camera body 1.

When the user wears the camera body 1 such that the battery section 90 is placed on the back side of the user and the shooting and detection section 10 is placed on the front side of the body of the user, the shooting and detection section 10 is biased toward the chest by the connection sections 80 of which both ends are respectively connected to near the right and left ends of the shooting and detection section 10. As a result, the shooting and detection section 10 is positioned substantially in front of the clavicles of the user. At this time, the face direction detection window 13 is positioned under the chin of the user. An infrared light condenser lens 26 that will be shown in FIG. 2E later is present in the face direction detection window 13. The optical axis (image capture optical axis) of the taking lens 16 and the optical axis (detection optical axis) of the infrared light condenser lens 26 are oriented in different directions. A face direction detection section 20 (described later) detects a watching direction of the user from the positions of the parts of the face. Thus, the watching direction is able to be shot by a shooting section 40 (second image capture unit) (described later).

An adjustment method or the like for a set position due to an individual difference in body shape and a difference in clothes will be described later.

By disposing the shooting and detection section 10 on the front side of the body and disposing the battery section 90 on the back side, the weight is distributed, with the result that the effect of reducing user's fatigue and the effect of reducing a deviation due to centrifugal force or the like at the time when the user moves are obtained.

In the present embodiment, the example in which the shooting and detection section 10 is worn so as to be positioned substantially in front of the clavicles of the user has been described; however, the configuration is not limited thereto. In other words, as long as the camera body 1 is able to detect the watching direction of the user by using the face direction detection section 20 and is able to shoot a picture in the watching direction by using the shooting section 40, the camera body 1 may be worn on any part on the body, other than the head of the user.

Figure 1C:
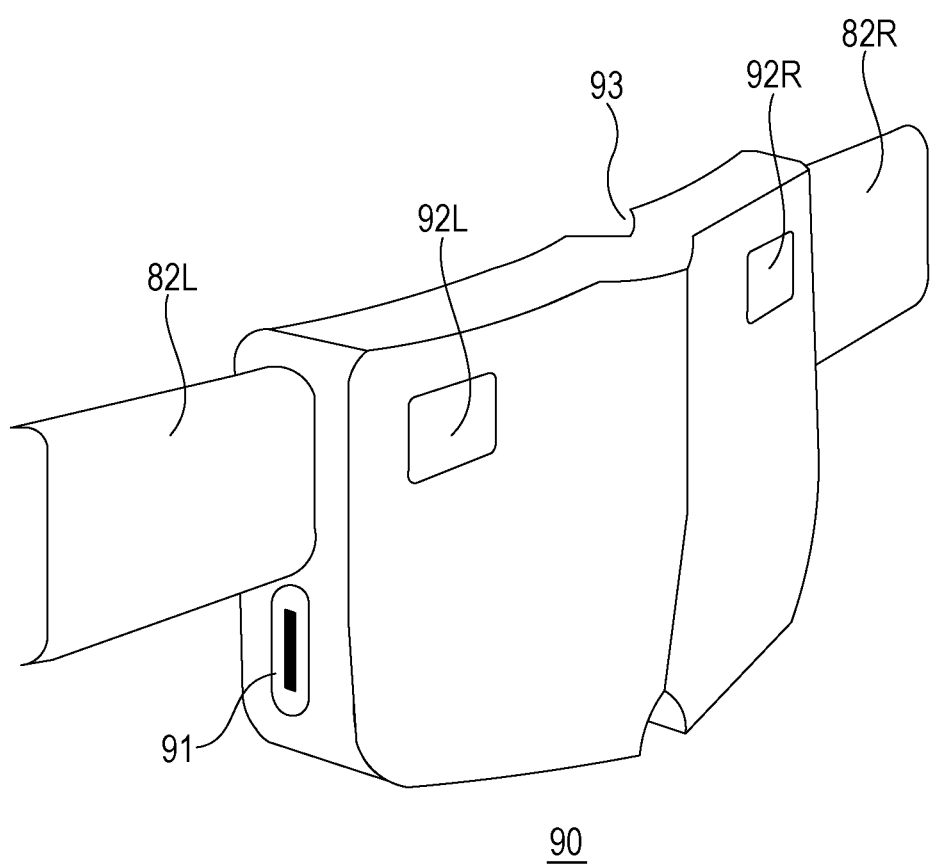
FIG. 1C is a view of a battery section in the camera body from the rear of FIG. 1A.

FIG. 1C is a view of the battery section 90 from the rear of FIG. 1A.

In FIG. 1C, the battery section 90 includes a charging cable insertion port 91, adjustment buttons 92R, 92L, and a backbone cutout 93.

The charging cable insertion port 91 is an insertion port for a charging cable (not shown). An internal battery 94 is charged from an external power supply via the charging cable, or the shooting and detection section 10 is supplied with electric power via the charging cable.

The adjustment buttons 92R, 92L are buttons for respectively adjusting the lengths of band portions 82R, 82L of the connection sections 80. The adjustment button 92L is a button for adjusting the reader's left-side band portion 82L. The adjustment button 92R is a button for adjusting the reader's right-side band portion 82R. In the present embodiment, the length of the band portions 82R, 82L are respectively, individually adjusted by the adjustment buttons 92R, 92L. Alternatively, the length of the band portions 82R, 82L may be configured to be adjusted at the same time by using a single button. Hereinafter, the band portions 82R, 82L are collectively referred to as band portions 82.

The backbone cutout 93 is a cutaway portion that keeps away from the backbone part of the user such that the battery section 90 does not interfere with the backbone part. An uncomfortable feeling in wearing is reduced by keeping away from a protruded part of the backbone of a human body, while a movement of the body to the right or to the left is reduced during usage.

Figure 1D:
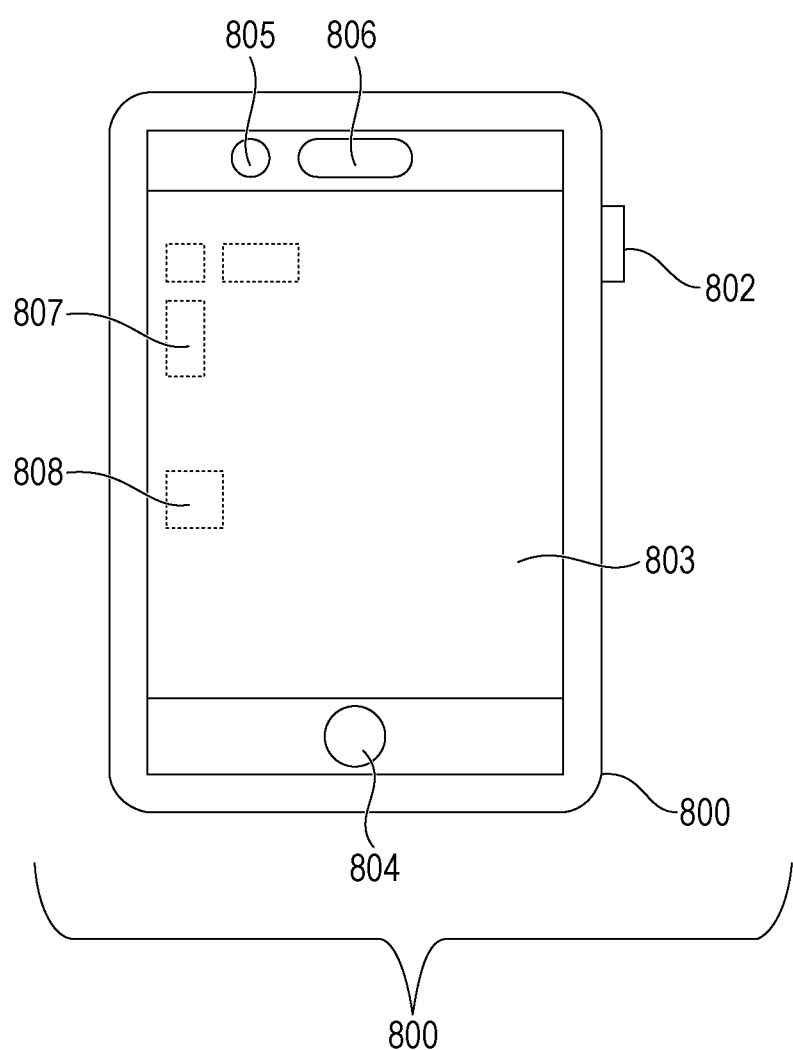
FIG. 1D is an outer appearance view of a display apparatus serving as a mobile device according to the first embodiment and provided separately from the camera body.

FIG. 1D is an outer appearance view of the display apparatus 800 serving as a mobile device according to the first embodiment and provided separately from the camera body 1.

In FIG. 1D, the display apparatus 800 includes a button A 802, a display section 803, a button B 804, an in-camera 805, a face sensor 806, an angular velocity sensor 807, and an acceleration sensor 808. Although not shown in FIG. 1D, the display apparatus 800 includes a wireless LAN capable of high-speed connection with the camera body 1.

The button A 802 is a button that has the function of a power supply button of the display apparatus 800. The button A 802 receives an operation to turn on or off the power through long tap and receives an instruction for the other processing timing by short tap.

The display section 803 allows to check a picture shot with the camera body 1 or display a menu screen used for setting. In the present embodiment, a transparent touch sensor is provided on the top face of the display section 803, and the display section 803 receives an operation through touching on a currently displayed screen (for example, a menu screen).

The button B 804 is a button that functions as a calibration button 854 used in a calibration process (described later).

The in-camera 805 is a camera capable of shooting a person watching the display apparatus 800.

The face sensor 806 detects the face shape and watching direction of a person watching the display apparatus 800.

A specific structure of the face sensor 806 is not limited. The face sensor 806 may be implemented by various sensors, such as a structural light sensor, a ToF sensor, and a millimeter-wave radar.

The angular velocity sensor 807 is represented by dashed lines as a meaning of a see-through view since the angular velocity sensor 807 is inside the display apparatus 800. The display apparatus 800 of the present embodiment is equipped with a three-dimensional gyroscope sensors for three X, Y, and Z directions to provide the function of a calibrator (described later).

The acceleration sensor 808 detects the posture of the display apparatus 800.

A general smartphone is used as the display apparatus 800 according to the present embodiment. The camera system according to the embodiment of the present disclosure may be implemented by firmware in the smartphone, caused to support firmware on the camera body 1. The camera system according to the embodiment of the present disclosure may be implemented by firmware on the camera body 1, caused to support an application or OS of a smartphone serving as the display apparatus 800.

FIG. 2A to FIG. 2F are views illustrating the shooting and detection section 10 in detail. In the following drawings, like reference signs are assigned to the already described portions to denote the same functions, and the description in the specification is omitted.

Figure 2A:
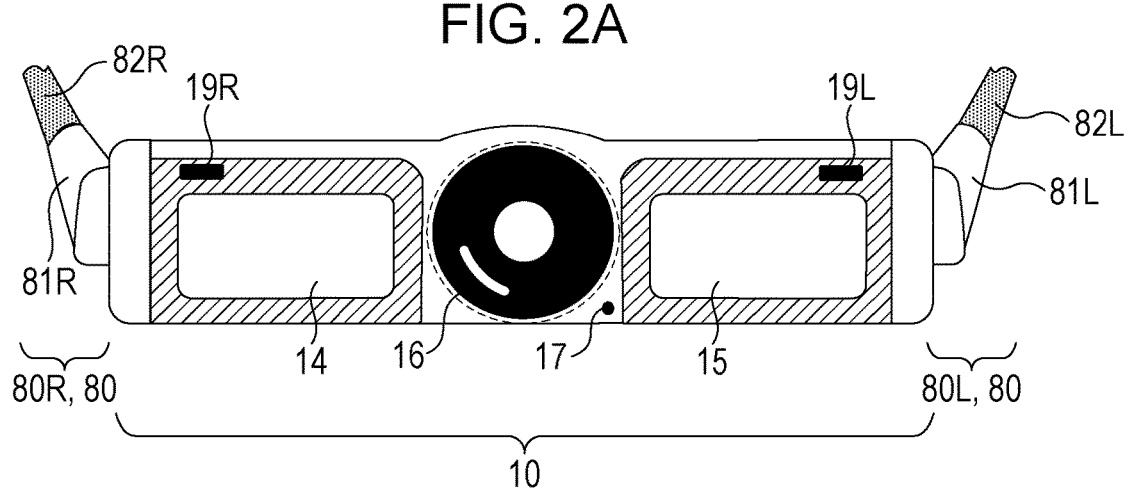
FIG. 2A is a view of the shooting and detection section from the front.

FIG. 2A is a view of the shooting and detection section 10 from the front.

The connection sections 80 connect with the shooting and detection section 10 at the right-side connection section 80R on the right side (the reader's left side in FIG. 2A) of the body of the user and at the left-side connection section 80L on the left side (the reader's right side in FIG. 2A) of the body of the user. More specifically, each of the connection sections 80 is divided into an angle holding portion and the band portion 82. The angle holding portion 81 is made of a hard material that holds the angle with respect to the shooting and detection section 10. In other words, the right-side connection section 80R includes the angle holding portion 81R and the band portion 82R, and the left-side connection section 80L includes the angle holding portion 81L and the band portion 82L.

Figure 2B:
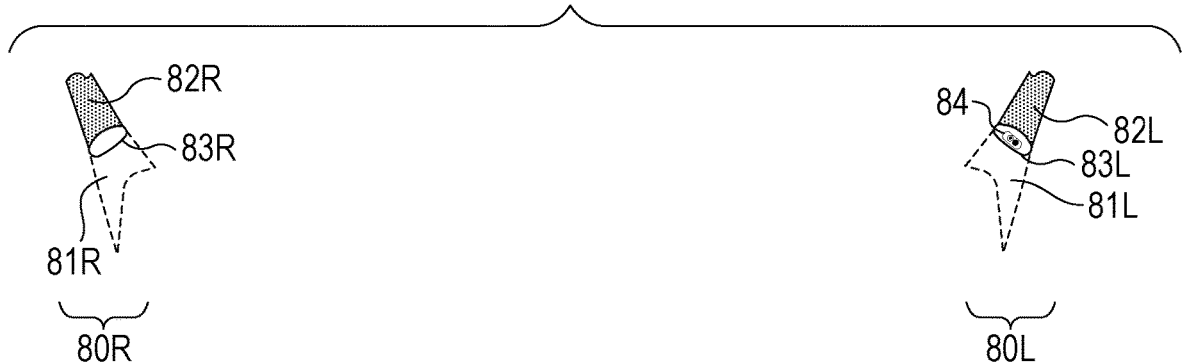
FIG. 2B is a view showing the shape of a band portion at each connection section in the camera body.

FIG. 2B is a view showing the shape of the band portion 82 of each connection section 80. In this drawing, for the sake of illustrating the shape of the band portion 82, the angle holding portion 81 is seen through.

The band portion 82 includes a connection surface 83 and an electric cable 84.

The connection surface 83 is a connection surface between the angle holding portion 81 and the band portion 82 and has a cross-sectional shape not a perfect circle, here, an elliptical shape. Hereinafter, the connection surfaces 83 respectively disposed bilaterally symmetric on the right side (the reader's left side in FIG. 2B) and the left side (the reader's right side in FIG. 2B) of the body of the user when the camera body 1 is worn are referred to as a right-side connection surface 83R and a left-side connection surface 83L. The right-side connection surface 83R and the left-side connection surface 83L have just like an inverted V-shape. In other words, as it goes from the reader's bottom view toward the reader's top view in FIG. 2B, the distance between the right-side connection surface 83R and the left-side connection surface 83L reduces. Thus, when the user wears the camera body 1, the long axis direction of the connection surface 83 of each connection section 80 is put in a direction along the body of the user, so the effect that the user is comfortable when the band portion 82 contacts with the body of the user and the shooting and detection section 10 does not move in the right and left, and front and rear directions is obtained.

The electric cable 84 (power supply unit) is a cable that is wired inside the band portion 82L and that electrically connects the battery section 90 with the shooting and detection section 10. The electric cable 84 connects the power supply of the battery section 90 with the shooting and detection section 10 and transmits and receives an electrical signal to and from the outside.

Figure 2C:
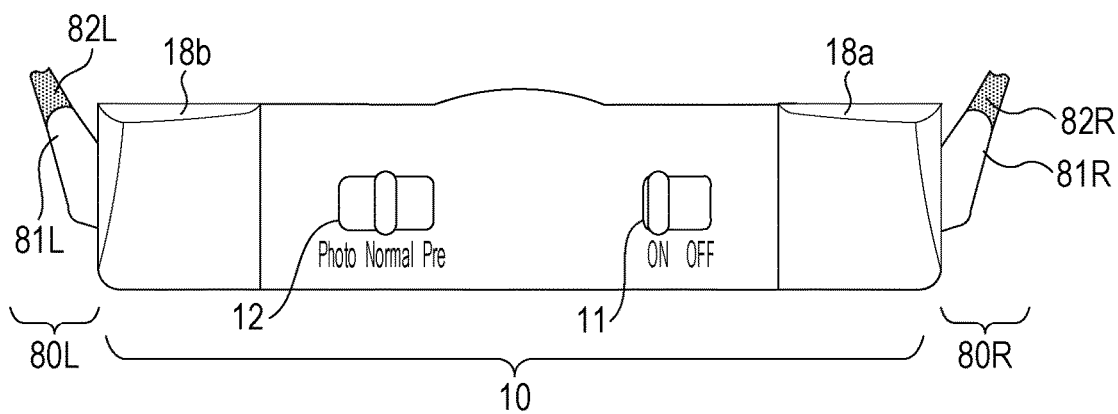
FIG. 2C is a view of the shooting and detection section from the back side.

FIG. 2C is a view of the shooting and detection section 10 from the back side. FIG. 2C is a view from the side that contacts with the body of the user, that is, the opposite side of FIG. 2A, so the positional relationship between the right-side connection section 80R and the left-side connection section 80L is opposite to that of FIG. 2A.

The shooting and detection section 10 includes a power switch 11, a shooting mode switch 12, and chest pads 18 on its back side.

The power switch 11 is a power switch for switching the power of the camera body 1 between an on state and an off state. The power switch 11 of the present embodiment is a slide lever switch; however, the power switch 11 is not limited thereto. For example, the power switch 11 may be a push switch or a switch configured integrally with a slide cover (not shown) of the taking lens 16.

The shooting mode switch 12 (changing unit) is a switch for changing a shooting mode and is able to change the mode related to shooting. In the present embodiment, the shooting mode switch 12 is able to switch into not only a still image mode or a moving image mode but also a preset mode to be set by using the display apparatus 800 (described later).

The chest pads 18 (fixing units) are parts that contact with the body of the user when the shooting and detection section 10 is biased toward the body of the user. As shown in FIG. 2A, the shooting and detection section 10 is formed such that the overall horizontal (right and left) length is longer than the overall vertical (up and down) length when the camera body 1 is worn. The chest pads 18 are disposed near the right and left ends of the shooting and detection section 10. As disposed in this way, it is possible to reduce right and left rotation shake while shooting with the camera body 1.

With the chest pads 18, it is possible to prevent the contact of the power switch 11 or the shooting mode switch 12 with the body. Furthermore, the chest pads 18 play a role in reducing transfer of heat to the body of the user even when the temperature of the shooting and detection section 10 increases as a result of shooting for a long time and a role in adjusting the angle of the shooting and detection section 10.

Figure 2D:
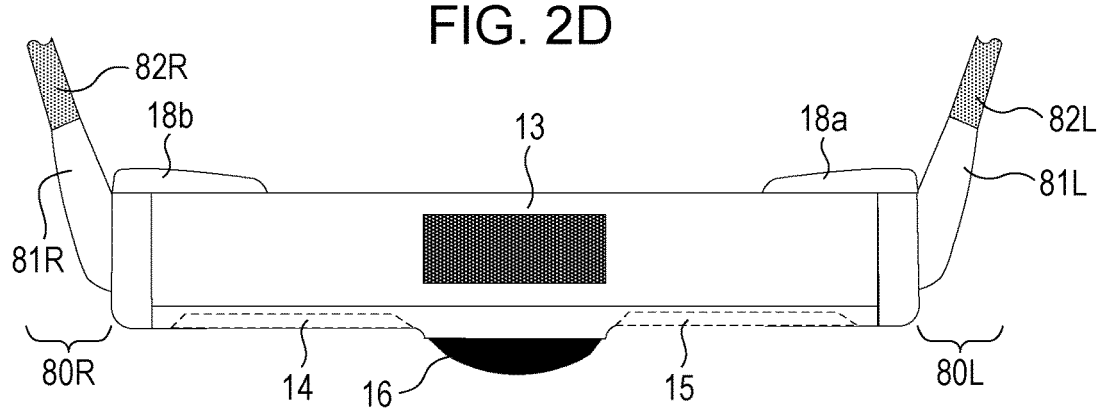
FIG. 2D is a view of the shooting and detection section from the top.

FIG. 2D is a view of the shooting and detection section 10 from the top.

As shown in FIG. 2D, the face direction detection window 13 is provided at the center of the top face of the shooting and detection section 10, and the chest pads 18 project from the shooting and detection section 10.

Figure 2E:
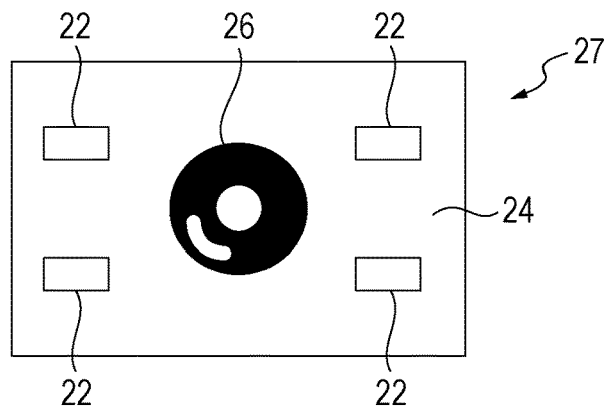
FIG. 2E is a view showing the configuration of an infrared detection processing device disposed inside the shooting and detection section and below a face direction detection window in the camera body.

FIG. 2E is a view showing the configuration of the infrared detection processing device 27 disposed inside the shooting and detection section 10 and under the face direction detection window 13.

The infrared detection processing device 27 includes an infrared LED 22 and an infrared light condenser lens 26.

The infrared LED 22 projects infrared light 23 (FIG. 5) toward the user.

The infrared light condenser lens 26 is a lens that forms reflected light 25 (FIG. 5) reflected from the user when the infrared light 23 is projected from the infrared LED 22 on a sensor (infrared detection camera (first image capture unit)) (not shown) of the infrared detection processing device 27.

Figure 2F:
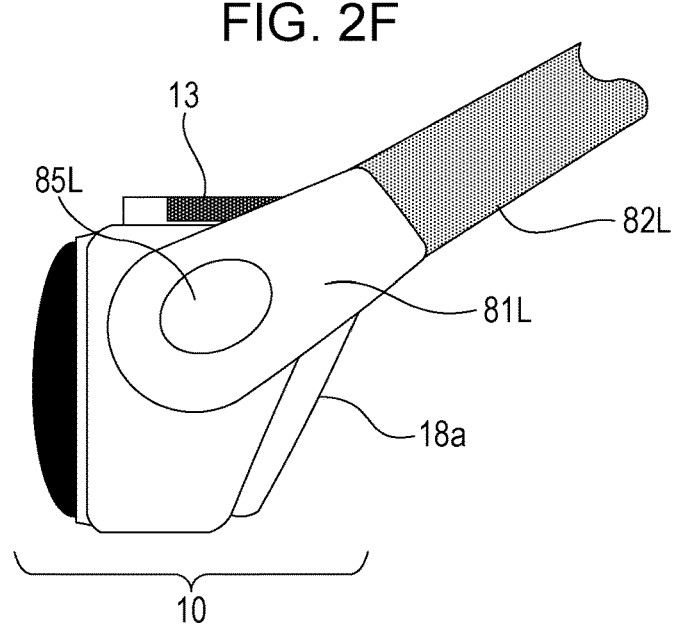
FIG. 2F is a view of a state where a user is wearing the camera body, from the left side of the user.

FIG. 2F is a view of a state where the user is wearing the camera body 1 from the left side of the user.

An angle adjustment button 85L is a button provided in the angle holding portion 81L and is used in adjusting the angle of the shooting and detection section 10. Although not shown in the drawing, an angle adjustment button 85R is also set at a position symmetric to the angle adjustment button 85L inside the angle holding portion 81R that is on the opposite side surface. Hereinafter, the angle adjustment buttons 85R, 85L are referred to as angle adjustment buttons 85 when collectively referred to.

The angle adjustment buttons 85 are at the positions that can be seen in FIG. 2A, FIG. 2C, and FIG. 2D; however, the angle adjustment buttons 85 are omitted for the sake of simple illustration.

The user is able to change the angle between the shooting and detection section 10 and the angle holding portion 81 by moving the angle holding portion 81 up and down toward FIG. 2F while pushing the angle adjustment button 85. The chest pads 18 are able to change the projected angle. The shooting and detection section 10 is capable of adjusting the orientation of the taking lens 16 horizontally for an individual difference in the chest position and shape of the user by the function of the two angle changing members (the angle adjustment buttons 85 and the chest pads 18).

Figure 3A:
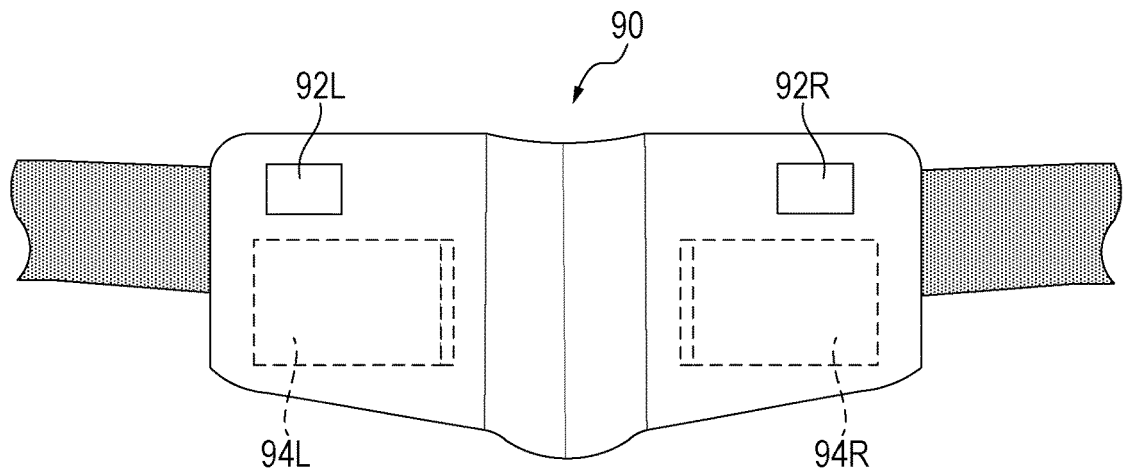
FIG. 3A to FIG. 3C are views illustrating the details of the battery section.
Figure 3B:
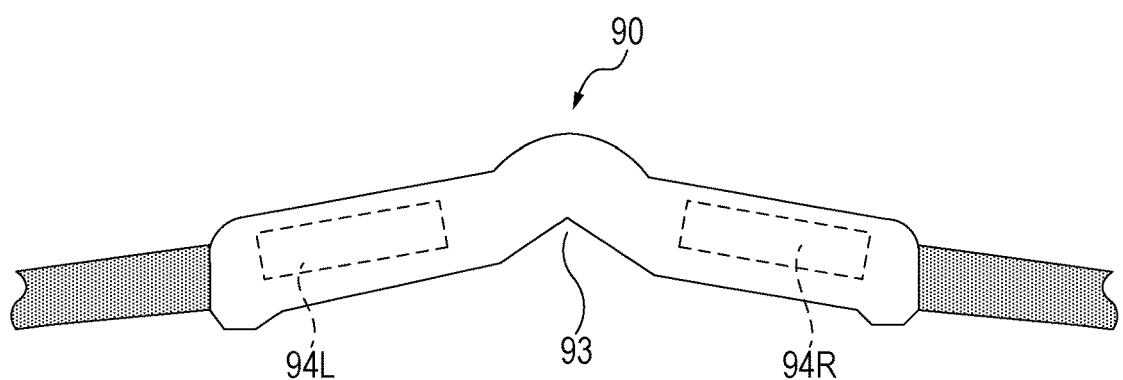
Figure 3C:
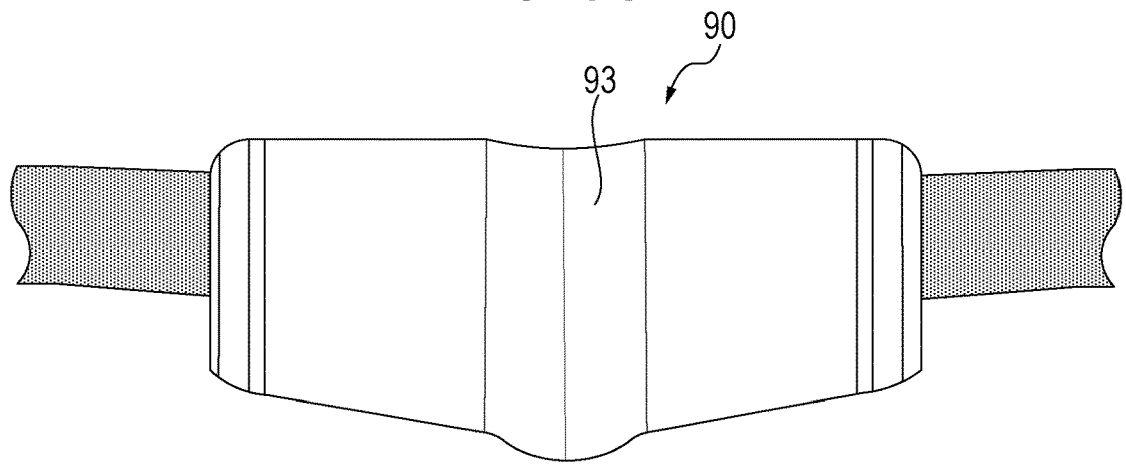

FIG. 3A to FIG. 3C are views illustrating the details of the battery section 90.

FIG. 3A is a partially see-through view of the battery section 90 from the back side.

As shown in FIG. 3A, the battery section 90 is configured such that right battery 94R and left battery 94L (hereinafter, also collectively referred to as batteries 94) are mounted symmetrically inside to keep the weight balance. The right and left weight balance is kept by disposing the batteries 94 symmetrically with respect to the center of the battery section 90 in this way, with the result that a position deviation of the camera body 1 is reduced. The battery section 90 may be configured to include only one battery.

FIG. 3B is a view of the battery section 90 from the top. In this drawing as well, the batteries 94 are seen through.

As shown in FIG. 3B, the relationship between the backbone cutout 93 and the batteries 94 is obtained. In this way, by disposing the batteries 94 symmetrically on both sides of the backbone cutout 93, the relatively weighty battery section 90 is able to be worn by the user without burden.

FIG. 3C is a view of the battery section 90 from the back side. FIG. 3C is a view from the side that contacts with the body of the user, that is, the opposite side to FIG. 3A.

As shown in FIG. 3C, the backbone cutout 93 is provided at the center along the backbone of the user.

FIG. 4 is a functional block diagram of the camera body 1. The details will be described later, so the flow of a process that is executed by the camera body 1 will be roughly described with reference to FIG. 4 here.

In FIG. 4, the camera body 1 includes a face direction detection section 20, a recording direction and angle-of-view determining section 30, the shooting section 40, an image clipping and development processing section 50, a primary recording section 60, a sending section 70, and another control section 111. These functional blocks are implemented by control of an overall control CPU 101 (FIG. 5) that controls the overall camera body 1.

The face direction detection section 20 (watching direction detection unit) is a functional block implemented by the above-described infrared LED 22, the infrared detection processing device 27, and the like. The face direction detection section 20 infers the watching direction by analogy by detecting the face direction and transfers the watching direction to the recording direction and angle-of-view determining section 30.

The recording direction and angle-of-view determining section 30 (recording direction determining unit) determines information on the position and the range in clipping a picture from the shooting section 40 by performing various computations in accordance with the watching direction inferred by the face direction detection section 20 by analogy, and transfers the information to the image clipping and development processing section 50.

The shooting section 40 converts light from a subject to a picture and transfers the picture to the image clipping and development processing section 50.

The image clipping and development processing section 50 (developing unit) clips and develops the picture from the shooting section 40 by using the information from the recording direction and angle-of-view determining section 30 to transfer only the picture in a direction in which the user is viewing to the primary recording section 60.

The primary recording section 60 is a functional block made up of a primary memory 103 (FIG. 5) or the like. The primary recording section 60 records picture information and transfers the picture information to the sending section 70 at timing as needed.

The sending section 70 (sending unit) wirelessly connects with the display apparatus 800 (FIG. 1D), a calibrator 850, and a simple display apparatus 900, which are predetermined devices with which the sending section 70 communicates, and performs communication with these.

The display apparatus 800 is a display apparatus capable of connecting with the sending section 70 by a wireless LAN available for high-speed connection (hereinafter, referred to as high-speed wireless technology). Here, in the present embodiment, wireless communication that supports IEEE 802.11ax (WiFi 6) standard is used for high-speed wireless technology. Alternatively, wireless communication that supports another standard, such as WiFi 4 standard and WiFi 5 standard, may be used. The display apparatus 800 may be a device developed exclusively for the camera body 1 or may be a general smartphone, tablet terminal, or the like.

A low-power wireless technology may be used to connect the sending section 70 with the display apparatus 800, both the high-speed wireless technology and the low-power wireless technology may be used for connection, or the high-speed wireless technology and the low-power wireless technology may be switched for connection. In the present embodiment, a picture file of a moving image picture (described later) or the like with a large amount of data is transmitted with the high-speed wireless technology, and a small amount of data or data of which transmission is allowed to take time is transmitted with the low-power wireless technology. Here, in the present embodiment, Bluetooth® is used as the low-power wireless technology. Alternatively, another short range wireless communication, such as near field communication (NFC), may be used for the low-power wireless technology.

The calibrator 850 is a device that performs initial setting or individual setting of the camera body 1 and that is capable of connecting with the sending section 70 with the high-speed wireless technology as in the case of the display apparatus 800. The details of the calibrator 850 will be described later. The display apparatus 800 may also have the function of the calibrator 850.

The simple display apparatus 900 is, for example, a display apparatus that is able to connect with the sending section 70 only with the low-power wireless technology.

The simple display apparatus 900 is a display apparatus that is not able to transmit a moving image picture to the sending section 70 due to time constraint and that is able to transmit the timing of shooting start and stop and, for example, check images to such an extent for framing check. The simple display apparatus 900, as in the case of the display apparatus 800, may be a device developed exclusively for the camera body 1 or may be a smart watch or the like.

FIG. 5 is a block diagram showing the hardware configuration of the camera body 1. Like reference signs denote the components and the functions described with reference to FIG. 1A to FIG. 1C and the like, and the detailed description thereof is omitted.

In FIG. 5, the camera body 1 includes the overall control CPU 101, the power switch 11, the shooting mode switch 12, the face direction detection window 13, the start switch 14, the stop switch 15, the taking lens 16, and the LED 17.

The camera body 1 includes the infrared LED turn-on circuit 21, the infrared LED 22, the infrared light condenser lens 26, and the infrared detection processing device 27 that make up the face direction detection section 20 (FIG. 4).

The camera body 1 includes the shooting section 40 (FIG. 4) and the sending section 70 (FIG. 4). The shooting section 40 is made up of an image capture driver 41, a solid-state image capture element 42, and an image capture signal processing circuit 43. The sending section 70 is made up of a low-power wireless unit 71 and a high-speed wireless unit 72.

The camera body 1 includes only one shooting section 40 in the present embodiment. Alternatively, the camera body 1 may include two or more shooting sections 40 to shoot a 3D picture, shoot a picture wider than an angle of view that the single shooting section 40 is able to acquire, or shoot pictures in multiple directions.

The camera body 1 includes various memories, that is, a large-capacity nonvolatile memory 51, an internal nonvolatile memory 102, a primary memory 103, and the like.

The camera body 1 further includes an audio processing section 104, a speaker 105, a vibrator 106, an angular velocity sensor 107, an acceleration sensor 108, and various switches 110.

The power switch 11 described above with reference to FIG. 2C, and the like are connected to the overall control CPU 101. The overall control CPU 101 controls the camera body 1. The recording direction and angle-of-view determining section 30, the image clipping and development processing section 50, and the other control section 111 in FIG. 4 are implemented by the overall control CPU 101 itself.

The infrared LED turn-on circuit 21 controls turn-on and turn-off of the infrared LED 22 described with reference to FIG. 2E and controls projection of the infrared light 23 from the infrared LED 22 toward the user.

The face direction detection window 13 is made up of a visible light cut filter and is not able to substantially pass visible light, but the face direction detection window 13 sufficiently passes the infrared light 23 and its reflected light 25 that are light in an infrared band.

The infrared light condenser lens 26 is a lens that condenses the reflected light 25.

The infrared detection processing device 27 (infrared detection unit) has a sensor that detects the reflected light 25 condensed by the infrared light condenser lens 26. The sensor forms the condensed reflected light 25 as a picture, converts the picture to sensor data, and transfers the sensor data to the overall control CPU 101.

When the user is wearing the camera body 1 as shown in FIG. 1B, the face direction detection window 13 is positioned under the chin of the user. Therefore, the infrared light 23 projected from an infrared LED illumination of the infrared LED turn-on circuit 21 passes through the face direction detection window 13 and is applied to an infrared irradiation surface 24 that is around the chin of the user as shown in FIG. 5. The infrared light 23 reflected on the infrared irradiation surface 24 becomes the reflected light 25, passes through the face direction detection window 13, and is condensed by the infrared light condenser lens 26 to the sensor in the infrared detection processing device 27.

The various switches 110 are not shown in FIG. 1A to FIG. 1C and the like and, although not described in detail, are switches for executing functions not related to the present embodiment.

The image capture driver 41 includes a timing generator and the like, generates and outputs various timing signals to various sections concerned with image capture, and drives shooting.

The solid-state image capture element 42 outputs a signal obtained by photoelectrically converting a subject image projected from the taking lens 16 described with reference to FIG. 1A to the image capture signal processing circuit 43.

The image capture signal processing circuit 43 outputs shooting data generated by executing processes, that is, a process, such as clamping and a process, such as A/D conversion, on a signal from the solid-state image capture element 42 to the overall control CPU 101.

A flash memory or the like may be used as the internal nonvolatile memory 102. The internal nonvolatile memory 102 stores a boot program of the overall control CPU 101 and setting values of various program modes. In the present embodiment, since it is possible to change a watching field of view (angle of view) and set the effective level of image stabilization control, such setting values are also recorded.

The primary memory 103 is made up of a RAM or the like. The primary memory 103 temporarily stores picture data in process, and temporarily stores a computation result of the overall control CPU 101.

The large-capacity nonvolatile memory 51 records or reads primary image data. In the present embodiment, for the sake of easy description, the case where the large-capacity nonvolatile memory 51 is a semiconductor memory with no removable mechanism will be described; however, the configuration is not limited thereto. For example, the large-capacity nonvolatile memory 51 may be made up of a removable recording medium, such as an SD card, or may also be used together with the internal nonvolatile memory 102.

The low-power wireless unit 71 exchanges data by using the low-power wireless technology with the display apparatus 800, the calibrator 850, and the simple display apparatus 900.

The high-speed wireless unit 72 exchanges data by using the high-speed wireless technology with the display apparatus 800, the calibrator 850, and the simple display apparatus 900.

The audio processing section 104 includes the reader's right-side microphone 19L that collects outside sound (analog signal) and the reader's left-side microphone 19R in FIG. 1A. The audio processing section 104 processes a collected analog signal and generates an audio signal.

The LED 17, the speaker 105, and the vibrator 106 emit light, emit sound, or vibrate to inform or warn the user of the status of the camera body 1.

The angular velocity sensor 107 is a sensor using gyroscope or the like and detects a movement of the camera body 1 itself as gyroscope data.

The acceleration sensor 108 detects the posture of the shooting and detection section 10.

The angular velocity sensor 107 and the acceleration sensor 108 are incorporated in the shooting and detection section 10. An angular velocity sensor 807 and an acceleration sensor 808 that are provided separately from the angular velocity sensor 107 and the acceleration sensor 108 are provided in the display apparatus 800 (described later).

FIG. 6 is a block diagram showing the hardware configuration of the display apparatus 800. For the sake of simplification of description, like reference signs denote the portions described with reference to FIG. 1D, and the description is omitted.

In FIG. 6, the display apparatus 800 includes a display apparatus control section 801, the button A 802, the display section 803, the button B 804, the in-camera 805, the face sensor 806, the angular velocity sensor 807, the acceleration sensor 808, an image capture signal processing circuit 809, and various switches 811.

The display apparatus 800 includes an internal nonvolatile memory 812, a primary memory 813, a large-capacity nonvolatile memory 814, a speaker 815, a vibrator 816, an LED 817, an audio processing section 820, a low-power wireless unit 871, and a high-speed wireless unit 872.

The display apparatus control section 801 is made up of a CPU. The button A 802, the face sensor 806, and the like, described with reference to FIG. 1D, are connected to the display apparatus control section 801. The display apparatus control section 801 controls the display apparatus 800.

The image capture signal processing circuit 809 serves as functions equivalent to the image capture driver 41, the solid-state image capture element 42, and the image capture signal processing circuit 43 in the camera body 1; however, those are not significantly used to describe the present embodiment, so those functions will be collectively described as one for the sake of simple description. Data output from the image capture signal processing circuit 809 is processed in the display apparatus control section 801. The details of the processing of data will be described later.

The various switches 811 are not shown in FIG. 1D and, although not described in detail, are switches for executing functions not related to the present embodiment.

The angular velocity sensor 807 is a sensor using a gyroscope or the like and detects a movement of the display apparatus 800 itself.

The acceleration sensor 808 detects the posture of the display apparatus 800.

As described above, the angular velocity sensor 807 and the acceleration sensor 808 are incorporated in the display apparatus 800 and have similar functions to those of the angular velocity sensor 107 and the acceleration sensor 108 in the camera body 1 described above but are provided separately.

A flash memory or the like may be used as the internal nonvolatile memory 812. The internal nonvolatile memory 812 stores a boot program of the display apparatus control section 801 and setting values of various program modes.

The primary memory 813 is made up of a RAM or the like. The primary memory 813 temporarily stores picture data in process, and temporarily stores a computation result of the image capture signal processing circuit 809. In the present embodiment, during recording of a moving image picture, gyroscope data detected by the angular velocity sensor 807 is associated with each frame at shooting time of the frame and is held in the primary memory 813.

The large-capacity nonvolatile memory 814 records or reads image data of the display apparatus 800.

In the present embodiment, the large-capacity nonvolatile memory 814 is made up of a removable memory, such as an SD card. The large-capacity nonvolatile memory 814 may be made up of a non-removable memory, such as the large-capacity nonvolatile memory 51 in the camera body 1.

The speaker 815, the vibrator 816, and the LED 817 emit sound, vibrate, or emit light to inform or warn the user of the status of the display apparatus 800.

The audio processing section 820 includes a right microphone 819R and a left microphone 819L that collect outside sound (analog signal). The audio processing section 820 processes the collected analog signal and generates an audio signal.

The low-power wireless unit 871 exchanges data with the camera body 1 by using the low-power wireless technology.

The high-speed wireless unit 872 exchanges data with the camera body 1 by using the high-speed wireless technology.

The face sensor 806 includes an infrared LED turn-on circuit 821, an infrared LED 822, an infrared light condenser lens 826, and an infrared detection processing device 827.

The infrared LED turn-on circuit 821 is a circuit that has functions similar to those of the infrared LED turn-on circuit 21 of FIG. 5. The infrared LED turn-on circuit 821 controls the turn-on and the turn-off of the infrared LED 822 and controls projection of the infrared light 823 from the infrared LED 822 toward the user.

The infrared light condenser lens 826 is a lens that condenses the reflected light 825 of the infrared light 823.

The infrared detection processing device 827 has a sensor that detects the reflected light condensed by the infrared light condenser lens 826. The sensor converts the condensed reflected light 825 to sensor data and transfers the sensor data to the display apparatus control section 801.

When the face sensor 806 shown in FIG. 1D is oriented toward the user, the infrared light 823 projected from the infrared LED turn-on circuit 821 is applied to the infrared irradiation surface 824 that is the overall face of the user as shown in FIG. 6. The infrared light 823 reflected on the infrared irradiation surface 824 becomes the reflected light 825 and is condensed by the infrared light condenser lens 826 to the sensor in the infrared detection processing device 827.

The other functional section 830, although not be described in detail, executes a telephone function and functions specific to a smartphone, such as other sensors.

Hereinafter, how to use the camera body 1 and the display apparatus 800 will be described.

Figure 7A:
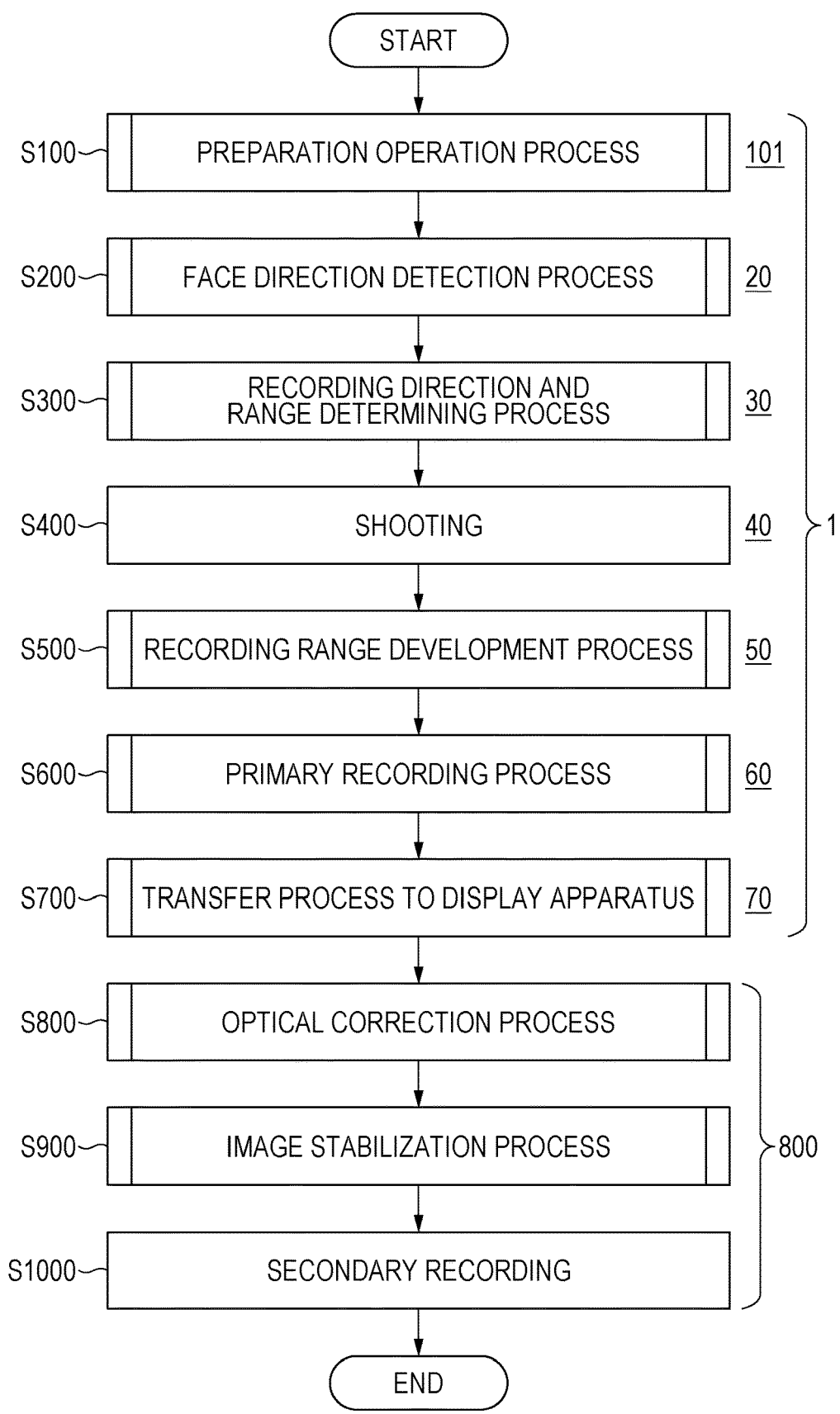
FIG. 7A is a flowchart showing the outline of a shooting and recording process according to the first embodiment, which is executed in the camera body and the display apparatus.

FIG. 7A is a flowchart showing the outline of a shooting and recording process according to the present embodiment, which is executed in the camera body 1 and the display apparatus 800.

To assist in description, in FIG. 7A, each step is performed in which device shown in FIG. 4 is shown on the right side of the step. In other words, step S100 to step S700 in FIG. 7A are executed by the camera body 1, and step S800 to step S1000 in FIG. 7A are executed by the display apparatus 800.

In step S100, when the power switch 11 turns on and the power is supplied to the camera body 1, the overall control CPU 101 boots up to read the boot program from the internal nonvolatile memory 102. After that, the overall control CPU 101 executes a preparation operation process of setting the camera body 1 before shooting. The details of the preparation operation process will be described later with reference to FIG. 7B.

In step S200, when the face direction detection section 20 detects a face direction, the face direction detection section 20 executes a face direction detection process of inferring a watching direction by analogy. The details of the face direction detection process will be described later with reference to FIG. 7C. The process is executed at a predetermined frame rate.

In step S300, the recording direction and angle-of-view determining section 30 executes the recording direction and range determining process. The details of the recording direction and range determining process will be described later with reference to FIG. 7D.

In step S400, the shooting section 40 performs shooting and generates shooting data.

In step S500, the image clipping and development processing section 50 clips a picture from the shooting data generated in step S400 by using information on the recording direction and the angle of view, determined in step S300, and executes a recording range development process of executing a development process on the range. The details of the recording range development process will be described later with reference to FIG. 7E.

In step S600, the primary recording section 60 (picture recording unit) executes a primary recording process of saving the picture developed in step S500 in the primary memory 103 as picture data. The details of the primary recording process will be described later with reference to FIG. 14.

In step S700, the sending section 70 executes a transfer process of wirelessly sending the picture primarily recorded in step S600 to the display apparatus 800 at designated timing. The details of the transfer process to the display apparatus 800 will be described later with reference to FIG. 16.

Step S800 and the following steps are executed in the display apparatus 800.

In step S800, the display apparatus control section 801 executes an optical correction process of optically correcting the picture transferred from the camera body 1 in step S700. The details of the optical correction process will be described later with reference to FIG. 17.

In step S900, the display apparatus control section 801 executes an image stabilization process on the picture optically corrected in step S800. The details of the image stabilization process will be described later with reference to FIG. 19.

The order of step S800 and step S900 may be reversed. In other words, image stabilization correction of the picture may be performed first, and optical correction may be performed later.

In step S1000, the display apparatus control section 801 (moving image recording unit) performs secondary recording of recording the picture, on which the optical correction process in step S800 and the image stabilization process in step S900 are complete, in the large-capacity nonvolatile memory 814, and ends the process.

Next, the subroutines of the steps described in FIG. 7A will be described in detail together with the order of the processes with reference to FIG. 7B to FIG. 7F by using the other drawings and the like.

Figure 7B:
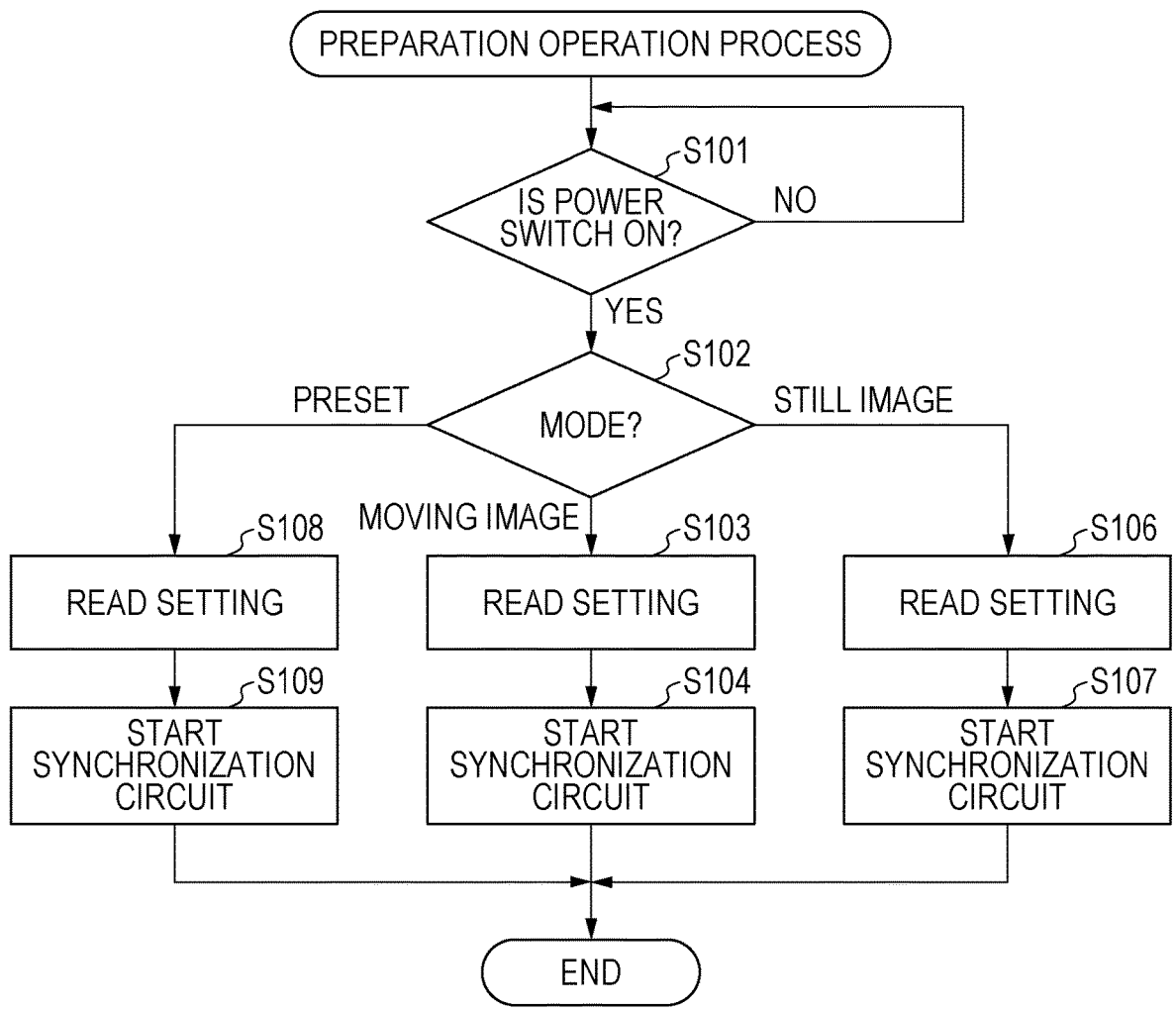
FIG. 7B is a flowchart of a subroutine of a preparation operation process of step S100 of FIG. 7A according to the first embodiment.

FIG. 7B is a flowchart of the subroutine of the preparation operation process of step S100 of FIG. 7A. Hereinafter, the process will be described by using the portions shown in FIG. 2 and FIG. 5.

In step S101, it is determined whether the power switch 11 is on. The process is in a standby state when the power remains off, and the process proceeds to step S102 when the power turns on.

In step S102, the mode selected by the shooting mode switch 12 is determined.

As a result of the determination, when the mode selected by the shooting mode switch 12 is the moving image mode, the process proceeds to step S103.

In step S103, various settings of the moving image mode are read from the internal nonvolatile memory 102 and saved in the primary memory 103, and then the process proceeds to step S104. Here, various settings of the moving image mode include a set angle of view ang (in the present embodiment, 90° set in advance) and an image stabilization level designated as "high", "intermediate", "off", or the like.

In step S104, after the operation of the image capture driver 41 is started for the moving image mode, the subroutine is exited.

As a result of the determination in step S102, when the mode selected by the shooting mode switch 12 is the still image mode, the process proceeds to step S106.

In step S106, various settings of the still image mode are read from the internal nonvolatile memory 102 and saved in the primary memory 103, and then the process proceeds to step S107. Here, various settings of the still image mode include a set angle of view ang (in the present embodiment, 45° set in advance) and an image stabilization level designated as "high", "intermediate", "off", or the like.

In step S107, after the operation of the image capture driver 41 is started for the still image mode, the subroutine is exited.

As a result of the determination in step S102, when the mode selected by the shooting mode switch 12 is the preset mode, the process proceeds to step S108. Here, the preset mode is a mode in which the shooting mode is set from an external device, such as the display apparatus 800, to the camera body 1 and is a third shooting mode including a moving image mode and a still image mode. The preset mode may be replaced with a custom shooting mode. For example, arrangement of an operating switch and a plurality of settings for a wearable device is difficult for the camera body 1. Therefore, detailed settings are performed by an external device, such as the display apparatus 800.

For example, assuming a case where, even in the same moving image shooting, an image with an angle of view of 90° and an image with an angle of view of 110° are intended to be successively shot. In the normal moving image mode, an angle of view of 90° is set. When the angle of view is intended to be switched to 110°, shooting is stopped, the display apparatus 800 is caused to shift into a setting screen, and the angle of view is changed to 110°. During any event, it is burdensome to operate the display apparatus 800.

When the preset mode is set in advance to a moving image with an angle of view of 110°, shooting is able to be immediately changed to shooting with an angle of view of 110° just by sliding the shooting mode switch 12 to the preset after the end of moving image shooting with an angle of view of 90°, and a current action does not need to be interrupted.

The contents of the preset include not only changing the angle of view but also changing the image stabilization level designated as "high", "intermediate", "off", and the like, setting of voice recognition not described in the present embodiment, or the like.

In step S108, various settings of the preset mode are read from the internal nonvolatile memory 102 and saved in the primary memory 103, and then the process proceeds to step S109. Here, various settings of the preset mode include a set angle of view ang and an image stabilization level designated as "high", "intermediate", "off", or the like.

In step S109, after the operation of the image capture driver 41 is started for the preset mode, the subroutine is exited.

Here, various settings of the moving image mode, read in step S103, will be described with reference to FIG. 13.

Figure 13:
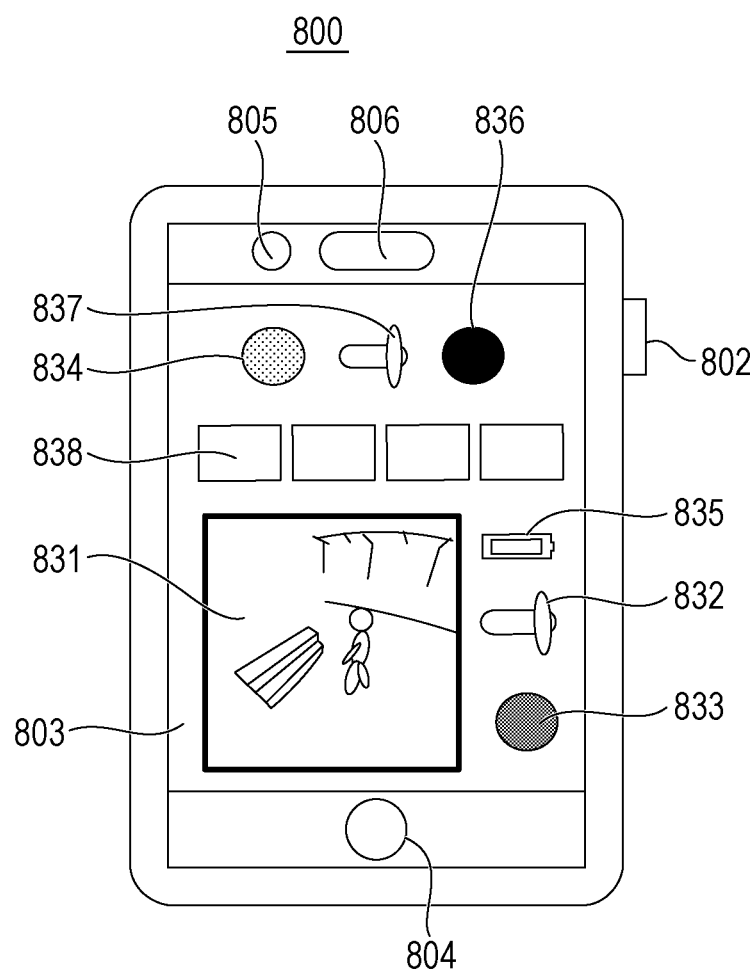
FIG. 13 is a view showing a menu screen for various settings in a moving image mode, which is displayed on a display section of the display apparatus before shooting with the camera body.

FIG. 13 is a view showing a menu screen for various settings in the moving image mode, which is displayed on the display section 803 of the display apparatus 800 before shooting with the camera body 1. Like reference signs denote the same portions as those of FIG. 1D, and the description is omitted. The display section 803 has a touch panel function, and, hereinafter, the description will be made on the assumption that the display section 803 functions with a touch operation including operations, such as swipe.

In FIG. 13, the menu screen contains a preview screen 831, a zoom magnification lever 832, a recording start and stop button 833, a switch 834, a remaining battery level indicator 835, a button 836, a lever 837, and an icon display portion 838.

With the preview screen 831, a picture shot by the camera body 1 is able to be checked, and a zoom amount and an angle of view are able to be checked.

The zoom magnification lever 832 is an operating portion with which zoom magnification setting is able to be performed by shifting the zoom magnification lever 832 to the right or to the left. In the present embodiment, the case where four values, that is, 45°, 90°, 110°, and 130°, are able to be set as the set angles of view ang will be described. Alternatively, values other than these values may be able to be set as the set angles of view ang by the zoom magnification lever 832.

The recording start and stop button 833 is a toggle switch that has both the function of the start switch 14 and the function of the stop switch 15.

The switch 834 is a switch for switching image stabilization between "off" and "on".

The remaining battery level indicator 835 indicates the remaining battery level of the camera body 1.

The button 836 is a button for entering another mode.

The lever 837 is a lever for setting image stabilization level. In the present embodiment, only "high" and "intermediate" are able to be set as the image stabilization level. Alternatively, another image stabilization level, such as "low", may also be able to be set. Alternatively, the image stabilization level may be able to be set continuously.

The icon display portion 838 displays a plurality of preview thumbnail icons.

Figure 7C:
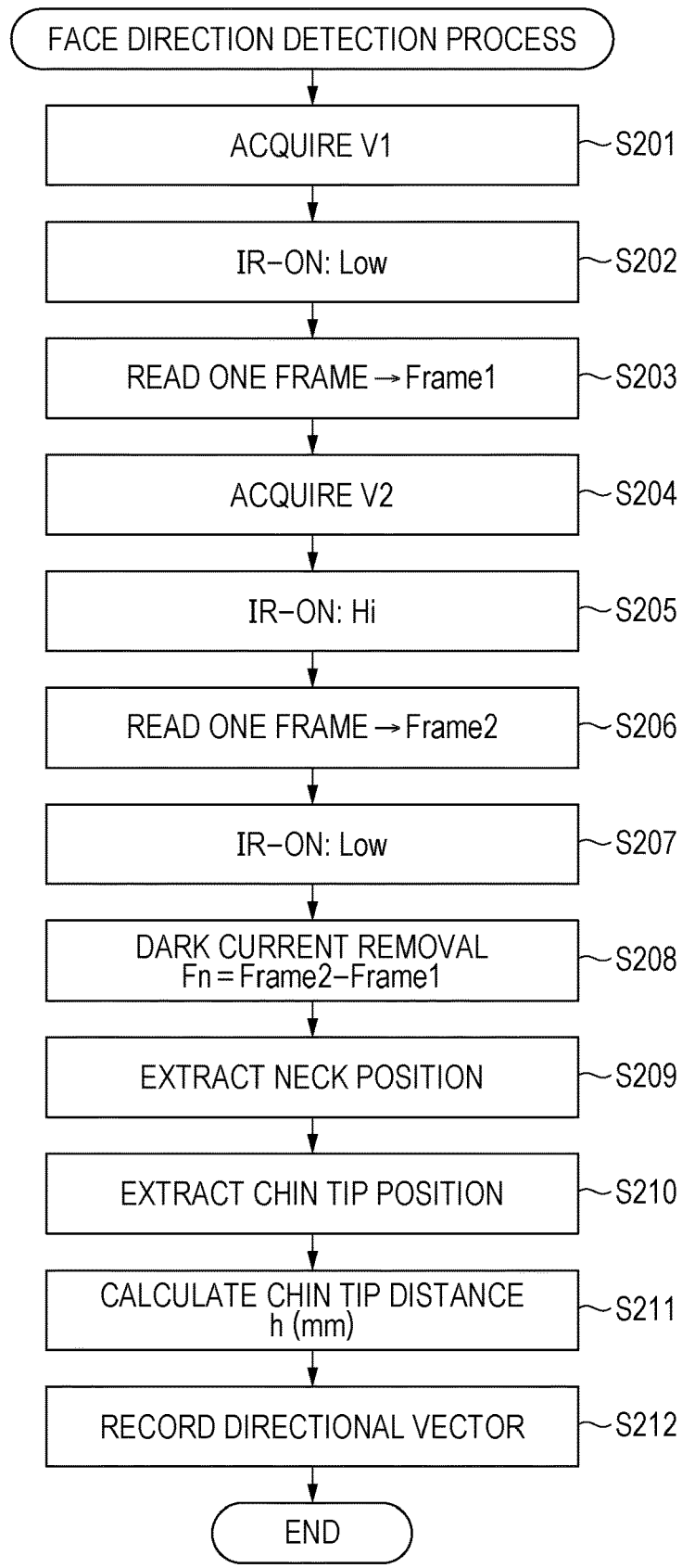
FIG. 7C is a flowchart of a subroutine of a face direction detection process of step S200 of FIG. 7A according to the first embodiment.

FIG. 7C is a flowchart of the subroutine of the face direction detection process of step S200 of FIG. 7A. Before the details of the process are described, a method of detecting a face direction with infrared light projection will be explained with reference to FIG. 8A to FIG. 8K.

Figure 8A:
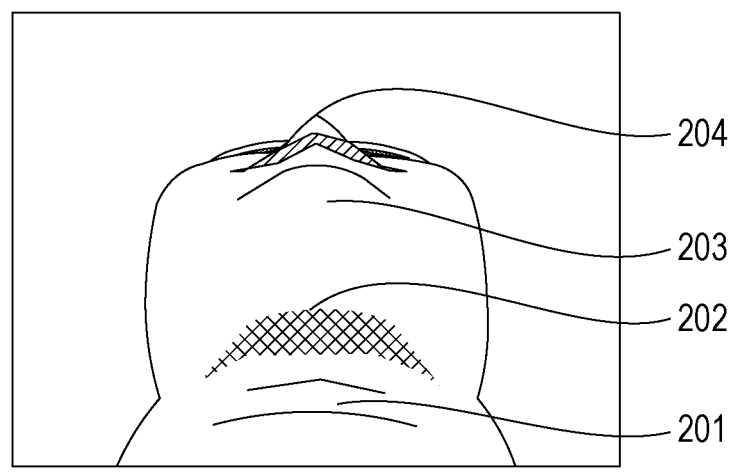
FIG. 8A is a view showing a picture of the user, seen through the face direction detection window.

FIG. 8A is a view showing a picture of the user, seen through the face direction detection window 13.

The picture of FIG. 8A is the same as a picture shot by a visible light image capture element when the face direction detection window 13 has no visible light cut filter component, sufficiently passes visible light, and the infrared detection processing device 27 is the visible light image capture element.

Figure 8B:
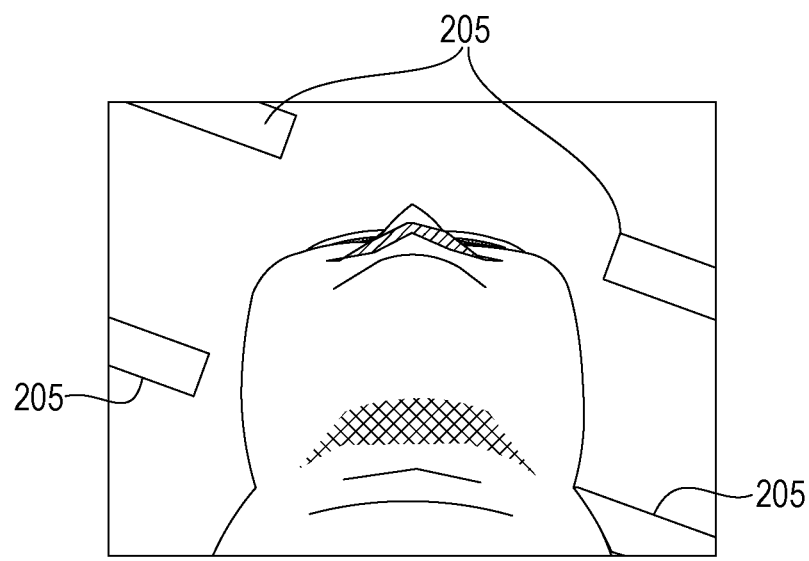
FIG. 8B is a view showing a case where fluorescent lamps in a room are seen as a background in a picture of the user, seen through the face direction detection window.

A face 204 including a neck front part 201, a chin base 202, a chin tip 203, and a nose above the clavicles of the user is reflected in the picture of FIG. 8A FIG. 8B is a view showing a case where fluorescent lamps in a room are seen as a background in a picture of the user, seen through the face direction detection window 13.

A plurality of fluorescent lamps 205 is reflected around the user in the picture of FIG. 8B. Since various backgrounds and the like are reflected in the infrared detection processing device 27 depending on a usage condition in this way, it is difficult for the face direction detection section 20 or the overall control CPU 101 to separate the picture of the face part from sensor data from the infrared detection processing device 27. In these days, there is a technology to separate such a picture by using AI or the like; however, the overall control CPU 101 needs high performance and is not appropriate for the camera body 1 in a mobile device.

Actually, the face direction detection window 13 is made up of a visible light cut filter, so visible light substantially does not pass through the face direction detection window 13, and a picture of the infrared detection processing device 27 is not the picture like FIG. 8A or FIG. 8B.

Figure 8C:
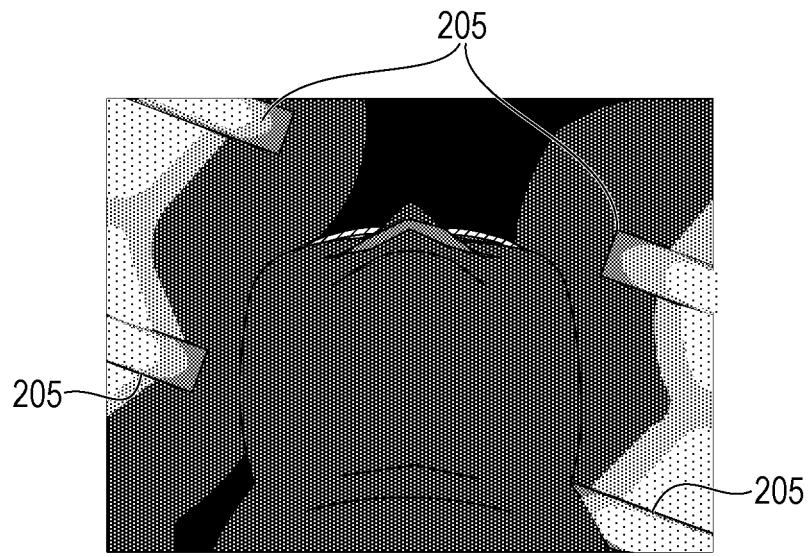

FIG. 8C is a view showing a picture in a case where the images of the user and the fluorescent lamps serving as its background, shown in FIG. 8B, are formed by the sensor of the infrared detection processing device 27 through the face direction detection window 13 in a state where the infrared LED 22 is not turned on.

In the picture of FIG. 8C, the neck and the chin of the user are dark. On the other hand, the fluorescent lamps 205 hold not only visible light but also an infrared light component, so the fluorescent lamps 205 reflect slightly bright.

Figure 8D:
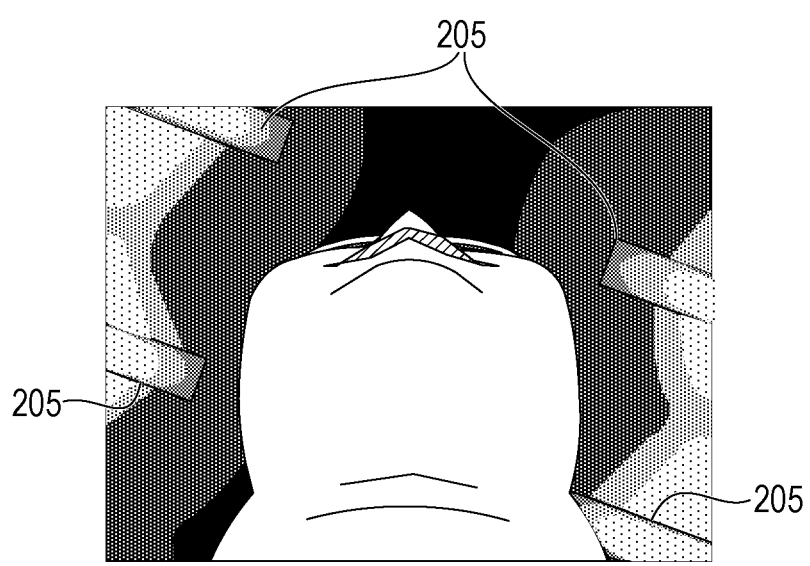

FIG. 8D is a view showing a picture in a case where the images of the user and the fluorescent lamps serving as its background, shown in FIG. 8B, are formed by the sensor of the infrared detection processing device 27 through the face direction detection window 13 in a state where the infrared LED 22 is turned on.

In the picture of FIG. 8D, the neck and the chin of the user are bright. On the other hand, different from FIG. 8C, brightness and the like around the fluorescent lamps 205 are not changed.

Figure 8E:
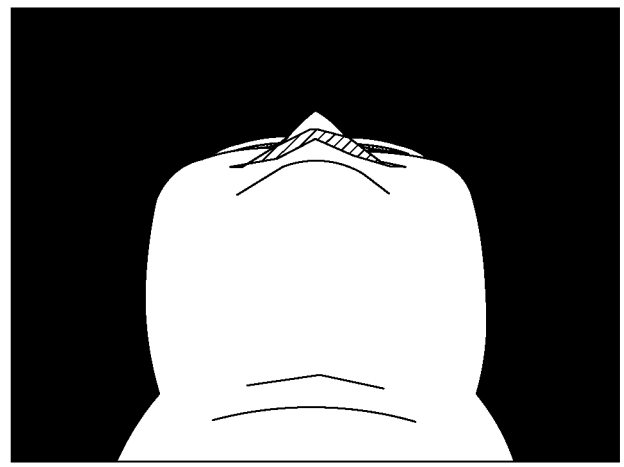
FIG. 8E is a view showing a difference picture computed from the pictures of FIG. 8C and FIG. 8D.

FIG. 8E is a view showing a difference picture computed from the pictures of FIG. 8C and FIG. 8D. It is found that the face of the user is rising.

In this way, the overall control CPU 101 (image acquiring unit) obtains a difference picture from which the face of the user is extracted (hereinafter, also referred to as face picture) by computing a difference between pictures formed on the sensor of the infrared detection processing device 27 respectively at the turn-on and turn-off of the infrared LED 22.

The face direction detection section 20 of the present embodiment adopts a system of acquiring a face picture by extracting an infrared light reflection intensity by the infrared detection processing device 27 as a two-dimensional image. The sensor of the infrared detection processing device 27 adopts a similar structure to that of a general image capture element and acquires a face image frame by frame. A vertical synchronization signal (hereinafter, referred to as V signal) for synchronizing a frame is generated by the infrared detection processing device 27 and is output to the overall control CPU 101.

FIG. 9A to FIG. 9E are timing charts showing the turn-on timing of the infrared LED 22.

FIG. 9A shows the timing at which a V signal is generated by the infrared detection processing device 27. The timings of frame synchronization and the turn-on and turn-off of the infrared LED 22 are timed by the V signal becoming high.

In FIG. 9A, t1 represents the first face image acquisition period, and t2 represents the second face image acquisition period. FIG. 9A, FIG. 9B, FIG. 9C, and FIG. 9D are drawn such that the time axes of the abscissa axes are the same.

The ordinate axis of FIG. 9B represents an H position of an image signal output from the sensor of the infrared detection processing device 27. The infrared detection processing device 27 controls the operation of the sensor such that the H position of the image signal is synchronized with the V signal as shown in FIG. 9B. The sensor of the infrared detection processing device 27 adopts a similar structure to a general image capture element as described above, and the operation of the image capture element is known, so the detailed control will not be described.

FIG. 9C shows the timing of switching an IR-ON signal, output from the overall control CPU 101 to the infrared LED turn-on circuit 21, between a high level and a low level. The overall control CPU 101 controls switching of the IR-ON signal between a high level and a low level in synchronization with the V signal as shown in FIG. 9C. Specifically, the overall control CPU 101 outputs a low-level IR-ON signal to the infrared LED turn-on circuit 21 during the period of t1 and outputs a high-level IR-ON signal to the infrared LED turn-on circuit 21 during the period of t2.

Here, in the period during which the IR-ON signal is high, the infrared LED turn-on circuit 21 turns on the infrared LED 22, and the infrared light 23 is projected to the user. On the other hand, in the period during which the IR-ON signal is low, the infrared LED turn-on circuit 21 turns off the infrared LED 22.

FIG. 9D is image capture data output from the sensor of the infrared detection processing device 27 to the overall control CPU 101. The ordinate axis represents signal strength and indicates the amount of received reflected light 25. In other words, during the period of t1, the infrared LED 22 is turned off, so there is no reflected light 25 from the face part of the user, and image capture data as shown in FIG. 8C is obtained. On the other hand, during the period of t2, the infrared LED 22 is turned on, so there is the reflected light 25 from the face part of the user, and image capture data as shown in FIG. 8D is obtained. For this reason, as shown in FIG. 9D, the signal strength during the period of t2 increases by the amount of reflected light 25 from the face part of the user as compared to the signal strength during the period of t1.

FIG. 9E shows a difference between image capture data during the period of t1 and image capture data during the period of t2 in FIG. 9D, and image capture data that is only the extracted component of the reflected light 25 from the face of the user as shown in FIG. 8E is obtained.

FIG. 7C shows the face direction detection process in step S200, including the operations described with reference to FIG. 8C to FIG. 8E, and FIG. 9A to FIG. 9E.

In step S201, when the V signal output from the infrared detection processing device 27 becomes timing V1 at which the period of t1 begins, the process proceeds to step S202.

Subsequently, in step S202, the IR-ON signal is set to a low level and is output to the infrared LED turn-on circuit 21. Thus, the infrared LED 22 turns off.

In step S203, one-frame image capture data output from the infrared detection processing device 27 during the period of t1 is read, and the data is temporarily saved in the primary memory 103 as Frame1.

In step S204, when the V signal output from the infrared detection processing device 27 becomes timing V2 at which the period of t2 begins, the process proceeds to step S203.

In step S205, the IR-ON signal is set to a high level and is output to the infrared LED turn-on circuit 21. Thus, the infrared LED 22 turns on.

In step S206, one-frame image capture data output from the infrared detection processing device 27 during the period of t2 is read, and the data is temporarily saved in the primary memory 103 as Frame2.

In step S207, the IR-ON signal is set to a low level and is output to the infrared LED turn-on circuit 21. Thus, the infrared LED 22 turns off.

In step S208, Frame1 and Frame2 are read from the primary memory 103, and the light intensity Fn of the component of the reflected light 25 of the user in FIG. 9E, which is a difference obtained by subtracting Frame1 from Frame2, is computed (this corresponds to a process generally called dark current removal).

In step S209, a neck position (neck rotation center) is extracted by using the light intensity Fn.

The overall control CPU 101 (dividing unit) divides a face picture into a plurality of distance areas described with reference to FIG. 8F in accordance with the light intensity Fn.

Figure 8F:
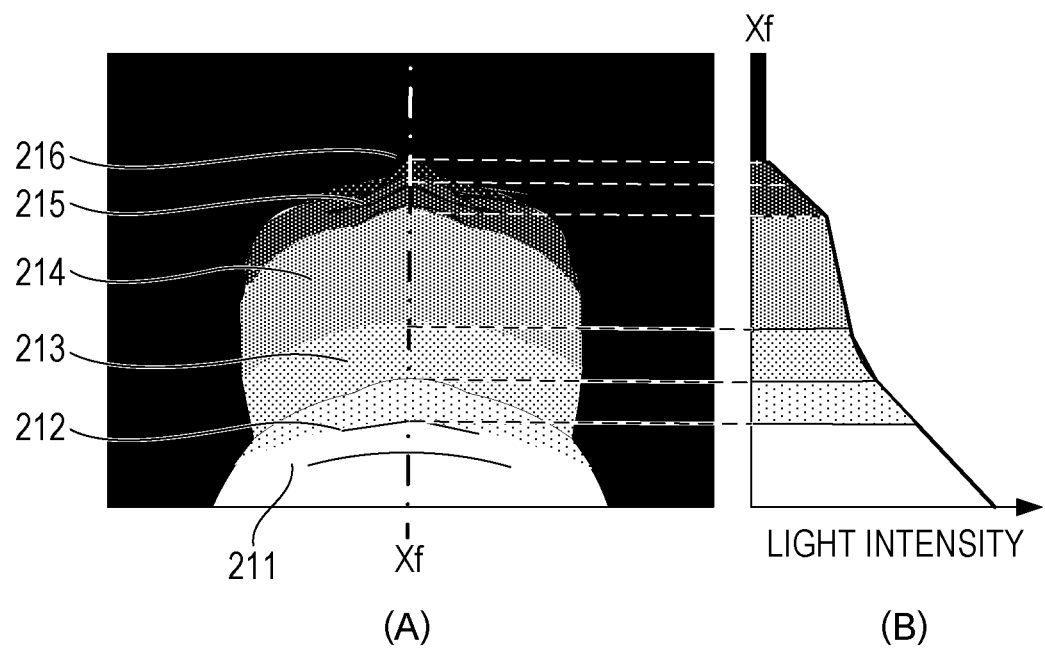
FIG. 8F is a view showing a case where the light and dark of the difference picture of FIG. 8E is adjusted by setting the scale for the light intensity of reflected light of infrared light projected to the face and neck part of the user.

FIG. 8F is a view showing a case where the light and dark of the difference picture of FIG. 8E is adjusted by setting the scale for the light intensity of the reflected light 25 of the infrared light 23 projected to the face and neck part of the user to check the distribution of the amount of light for each area of the face and neck part of the user.

(A) in FIG. 8F is a view showing the distribution of the light intensity of the reflected light 25 by regions in the face picture of FIG. 8E in gray scale for the sake of simple illustration. The Xf-axis is taken for description in a direction from the center of the neck of the user to the chin tip.

In (B) of FIG. 8F, the abscissa axis represents the light intensity of (A) of FIG. 8F on the Xf-axis, and the ordinate axis represents Xf-axis. The abscissa axis indicates higher light intensity toward the right-hand side.

In (A) of FIG. 8F, the face picture is divided into six regions (distance areas) 211 to 216 according to the light intensity.

The region 211 is a region in which the light intensity is the highest and is represented by white in gray scale.

The region 212 is a region slightly lower in light intensity than the region 211 and is represented by quite bright gray in gray scale.

The region 213 is a region further lower in light intensity than the region 212 and is represented by bright gray in gray scale.

The region 214 is a region much further lower in light intensity than the region 213 and is represented by middle gray in gray scale.

The region 215 is a region by far lower in light intensity than the region 214 and is represented by slightly dark gray in gray scale.

The region 216 is a region lowest in light intensity and is the darkest gray in gray scale. An upper side beyond the region 216 is black with no light intensity.

The light intensity will be explained in detail with reference to FIG. 10A to FIG. 10D.

FIG. 10A to FIG. 10D are views illustrating a movement in the up and down direction of the face of the user and show the status of the user, watched from the left lateral side.

Figure 10A:
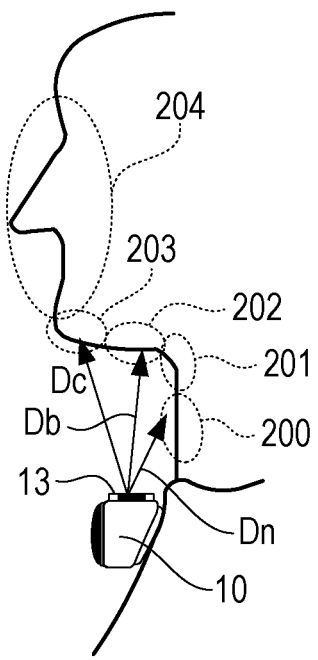
FIG. 10A to FIG. 10D are views illustrating a movement in an up and down direction of the face of the user.

FIG. 10A is a view showing a state where the user is facing forward. The shooting and detection section 10 is present in front of the clavicles of the user. The infrared light 23 of the infrared LED 22 is applied though the face direction detection window 13 at the top of the shooting and detection section 10 to the bottom of the head part of the user. Where the distance from the face direction detection window 13 to the neck base 200 above the clavicles of the user is Dn, the distance from the face direction detection window 13 to the chin base 202 is Db, and the distance from the face direction detection window 13 to the chin tip 203 is Dc, it appears that the distance increases in order of Dn, Db, Dc. Since the light intensity is inversely proportional to the square of the distance, the light intensity at the time when the reflected light 25 from the infrared irradiation surface 24 is formed at the sensor of the infrared detection processing device 27 reduces in order of the neck base 200, the chin base 202, and the chin tip 203. For the face 204 including a nose, of which the distance from the face direction detection window 13 is at a position much farther than Dc, it appears that the light intensity is further dark. In other words, in the case as shown in FIG. 10A, it appears that a picture with the distribution of the light intensity shown in FIG. 8F is obtained.

When the face direction of the user is detected, the configuration of the face direction detection section 20 is not limited to the configuration shown in the present embodiment. For example, an infrared light pattern may be applied by the infrared LED 22 (infrared light pattern irradiation unit), and an infrared light pattern reflected from an irradiation object may be detected by the sensor (infrared light pattern detection unit) of the infrared detection processing device 27. In this case, the sensor of the infrared detection processing device 27 can be a structural light sensor. Alternatively, the sensor of the infrared detection processing device 27 may be a sensor that compares the phase between the infrared light 23 and the reflected light 25 (infrared light phase comparing unit), such as a Tof sensor.

Next, extraction of the neck position in step S209 of FIG. 7C will be described with reference to FIG. 8G.

Figure 8G:
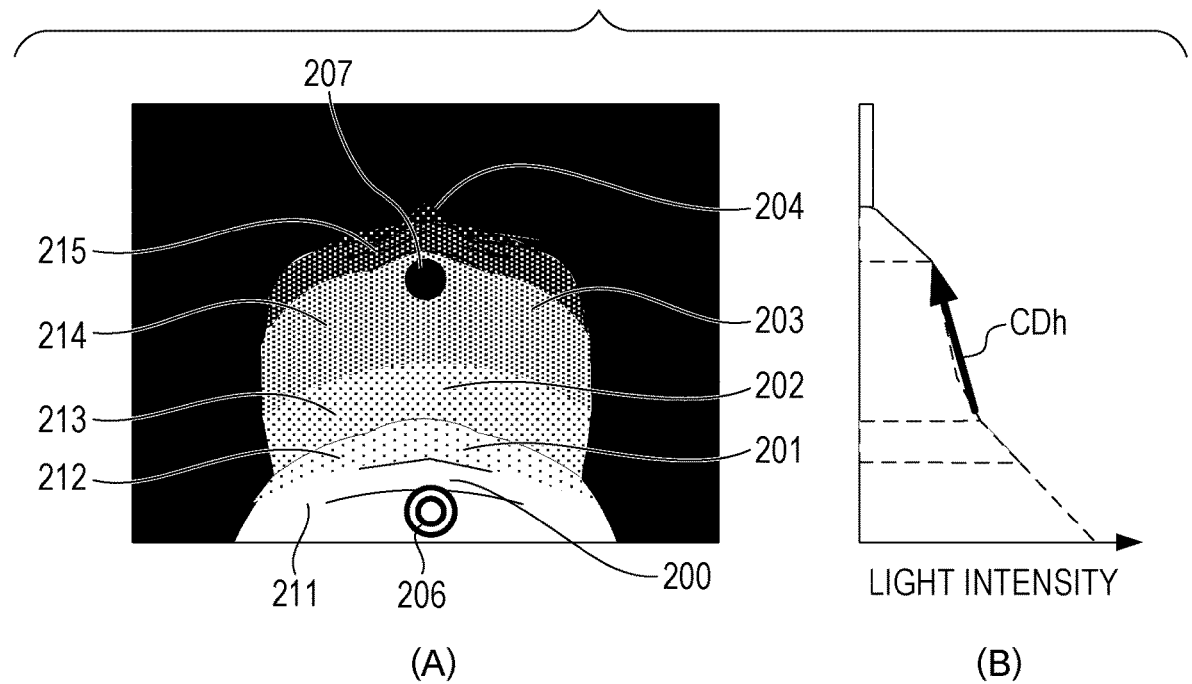
FIG. 8G is a view obtained by superposing reference signs indicating the areas of the body of the user and a double-circle mark and a black-circle mark respectively indicating a neck position and a chin tip position on FIG. 8F.

(A) in FIG. 8G is a view obtained by superposing reference signs indicating the areas of the body of the user and a double-circle mark and a black-circle mark respectively indicating the neck position and the chin tip position in FIG. 10A on FIG. 8F.

The white region 211 corresponds to the neck base 200 (FIG. 10A). The quite bright gray region 212 corresponds to the neck front part 201 (FIG. 10A). The bright gray region 213 corresponds to the chin base 202 (FIG. 10A). The middle gray region 214 corresponds to the chin tip 203 (FIG. 10A). The slightly dark gray region 215 corresponds to the lip positioned in the lower part of the face 204 (FIG. 10A) and the face lower part around the lip. The dark gray region 216 corresponds to a nose positioned in the center of the face 204 (FIG. 10A) and the face upper part around the nose.

As shown in FIG. 10A, the difference between the distances Db and Dc is small as compared to the distance from the face direction detection window 13 to another area of the user, so the difference between the reflected light intensity in the bright gray region 213 and the reflected light intensity in the middle gray region 214 is also small.

On the other hand, as shown in FIG. 10A, of the distances from the face direction detection window 13 to the areas of the user, the distance Dn is the shortest near distance, so the white region 211 corresponding to the neck base 200 is a portion where the reflection intensity is highest.

Thus, the region 211 is around the neck base 200, and the overall control CPU 101 (setting unit) sets the position 206 indicated by a double-circle mark in (A) of FIG. 8G, which is the center of the region 211 in the right and left direction and closest to the shooting and detection section 10, for the position of the neck rotation center (hereinafter, referred to as the neck position 206). The process up to here is the contents to be executed in step S209 of FIG. 7C.

Next, extraction of the chin tip position of step S210 of FIG. 7C will be described with reference to FIG. 8G.

The middle gray region 214 brighter than the region 215 corresponding to the face lower part including the lip in the face 204, shown in (A) of FIG. 8G, is a region including the chin tip. As is apparent from (B) of FIG. 8G, the light intensity steeply drops in the region 215 that borders the region 214, and a change in distance from the face direction detection window 13 increases. The overall control CPU 101 determines the region 214 before the region 215 of which the light intensity steeply drops, as a chin tip region. The overall control CPU 101 calculates (extracts) a position at the center of the region 214 in the right and left direction and farthest from the neck position 206 (the position indicated by a black-circle mark in (A) of FIG. 8G) as the chin tip position 207.

Figure 8H:
FIG. 8H is a view showing a difference picture computed by a method similar to FIG. 8E when the face of the user is facing to the right.
Figure 8I:
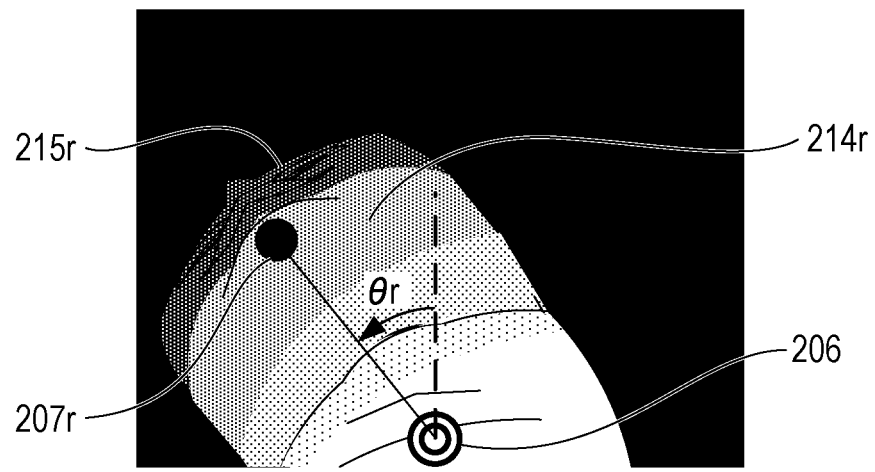
FIG. 8I is a view obtained by superposing the double-circle mark and the black-circle mark respectively indicating the neck position and the chin tip position on FIG. 8H.

For example, FIG. 8H and FIG. 8I show a change when the face is facing to the right.

FIG. 8H is a view showing a difference picture computed by a method similar to FIG. 8E when the face of the user is facing to the right. FIG. 8I is a view obtained by superposing a double-circle mark and a black-circle mark respectively indicating the neck position 206, which is the center position of neck movement, and the chin tip position 207$r$ on FIG. 8H.

Since the user faces to the right, the region 214 moves to the region 214$r$ shown in FIG. 8I on the left side when viewed upward from the shooting and detection section 10 side. The region 215 corresponding to the face lower part including the lip in the face 204 also moves to a region 215$r$ on the left side when viewed upward from the shooting and detection section 10 side.

The overall control CPU 101 determines the region 214$r$ before the region 215$r$ of which the light intensity steeply drops, as a chin tip region. The overall control CPU 101 calculates (extracts) a position at the center of the region 214$r$ in the right and left direction and farthest from the neck position 206 (the position indicated by a black-circle mark in FIG. 8I) as a chin tip position 207$r$.

After that, the overall control CPU 101 obtains a moving angle θr indicating how far the chin tip position 207$r$ of FIG. 8I has moved to the right about the neck position 206 from the chin tip position 207 of (A) of FIG. 8G. As shown in FIG. 8I, the moving angle θr is an angle of the face of the user in the right and left direction.

With the above method, in step S210, the chin tip position and the angle of the face of the user in the right and left direction are detected by the infrared detection processing device 27 of the face direction detection section 20 (three-dimensional detection sensor).

Next, detection of the face in the upward direction will be described.

Figure 10B:
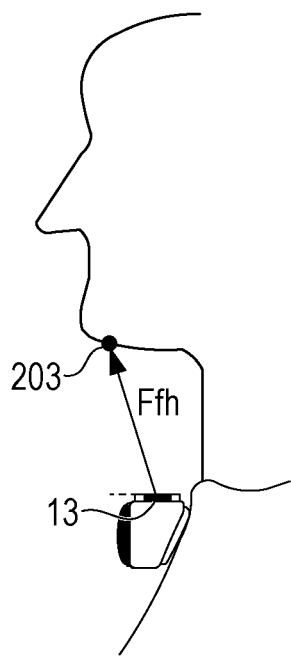
Figure 10C:
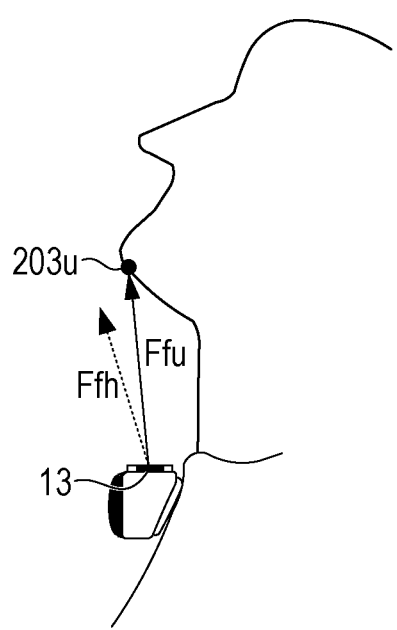

FIG. 10B is a view showing a state where the user is facing in the horizontal direction. FIG. 10C is a view showing a state where the user is facing upward at an angle of 33° with respect to the horizontal direction.

In FIG. 10B, the distance from the face direction detection window 13 to the chin tip 203 is Ffh. In FIG. 10C, the distance from the face direction detection window 13 to the chin tip 203u is Ffu.

As shown in FIG. 10C, the chin tip 203u together with the face also moves upward, so it appears that Ffu is longer in distance than Ffh.

Figure 8J:
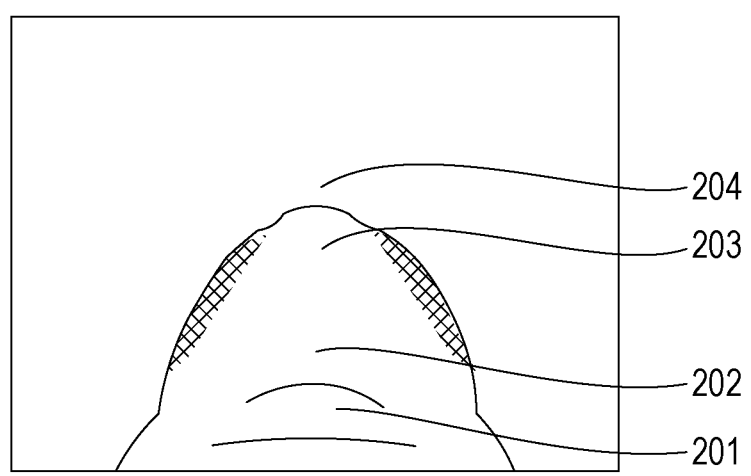
FIG. 8J is a view showing a picture of the user seen through the face direction detection window when the user is facing upward at an angle of 33° with respect to a horizontal direction.
Figure 8K:
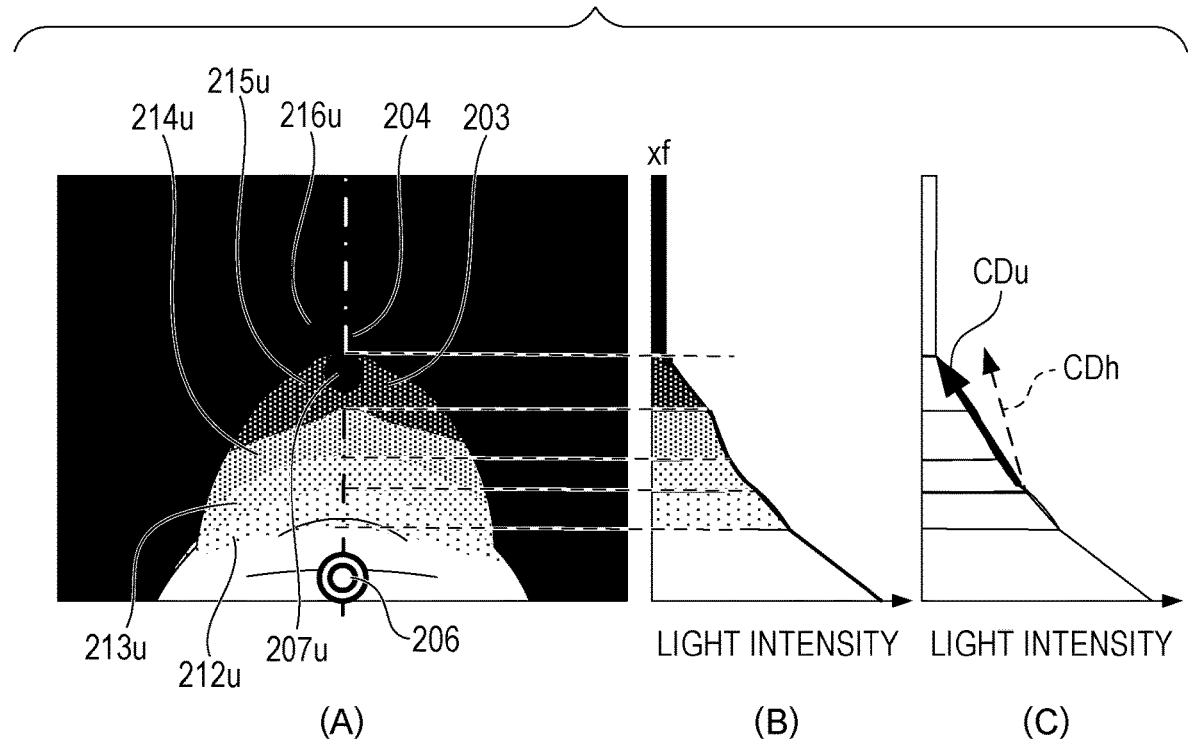
FIG. 8K is a view obtained by superposing the double-circle mark and the black-circle mark respectively indicating the neck position and the chin tip position on a difference picture computed by a method similar to FIG. 8E when the user is facing upward at an angle of 33° with respect to the horizontal direction.

FIG. 8J is a view showing a picture of the user seen through the face direction detection window 13 when the user is facing upward at an angle of 33° with respect to the horizontal direction. As shown in FIG. 10C, the user is facing upward, so the face 204 including the nose and the lip is not seen from the face direction detection window 13 positioned under the chin of the user, and the region up to the chin tip 203 is seen. FIG. 8K shows the distribution of the light intensity of the reflected light 25 when the infrared light 23 is applied to the user at this time. FIG. 8K is a view obtained by superposing a double-circle mark and a black-circle mark respectively indicating the neck position 206 and the chin tip position 207u over a difference picture computed by a similar method to FIG. 8E.

Six regions 207u, 212u, 213u, 214u, 215u and 216u according to the light intensity in FIG. 8K are regions referenced with suffixes "u" to the same regions of light intensity as the regions shown in FIG. 8F. The light intensity of the chin tip 203 of the user is the middle gray region 214 in FIG. 8F, and it appears that the light intensity shifts toward gray in FIG. 8K and is present in the slightly gray region 215u. In this way, as shown in FIG. 10C, since Ffu is longer in distance than Ffh, the fact that the light intensity of the reflected light 25 of the chin tip 203 of the user weakens so as to be inversely proportional to the square of distance is able to be detected by the infrared detection processing device 27.

Next, detection of the face in the downward direction will be described.

Figure 10D:
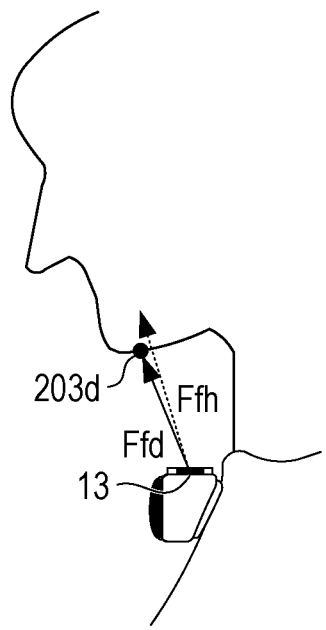

FIG. 10D is a view showing a state where the user is facing downward at an angle of 22° with respect to the horizontal direction.

In FIG. 10D, the distance from the face direction detection window 13 to the chin tip 203d is defined as Ffd.

As shown in FIG. 10D, the chin tip 203d together with the face also moves downward, so it appears that Ffd gets shorter in distance than Ffh and the light intensity of the reflected light 25 of the chin tip 203 increases.

Referring back to FIG. 7C, in step S211, the overall control CPU 101 (distance calculating unit) calculates the distance from the chin tip position to the face direction detection window 13 from the light intensity at the chin tip position, detected by the infrared detection processing device 27 of the face direction detection section 20 (three-dimensional detection sensor). At this time, the angle of the face in the up and down direction is also calculated.

For example, as shown in FIG. 10B, where the vertical angle of the neck when the user is facing in the horizontal direction is θh and the distance in the horizontal component between the chin tip position 207 and the neck position 206 of the user is Lh, Ffh×cos θ=Lh.

As shown in FIG. 10C, where the vertical angle of the neck when the user is facing upward at an angle of 33° is θu and the distance in the horizontal component between the chin tip position 207 and the neck position 206 of the user is Lu, Ffu×cos θu=Lu.

Thus, the overall control CPU 101 calculates a difference between θh and θu as the angle of the face in the up and down direction.

The distance Ffh is calculated from the light intensity at the chin tip position 207 in FIG. 8G, and the distance Ffu is calculated from the light intensity at the chin tip position 207u in FIG. 8K.

The distance Lh is calculated by converting the distance between the chin tip position 207 and the neck position 206 in the face picture of FIG. 8G to the real size of the subject, and the distance Lu is calculated by converting the distance between the chin tip position 207u and the neck position 206 in the face picture in FIG. 8K to the real size of the subject.

Angle calculation this time is performed in the case where the distance from the movement center of the head to the chin tip and the distance from the face direction detection window 13 to the chin tip are substantially equal. A calculation method in the case where the shooting and detection section 10 is installed at a separate location is more complicated.

In step S212, the angle of the face in the right and left direction and the angle in the up and down direction perpendicular to the right and left direction, respectively acquired in step S210 and step S211, are saved in the primary memory 103 as a three-dimensional watching direction vi (as a result of detecting the face status of the subject) of the user (the sign of i is a selected sign). For example, a watching direction vo in the case where the user is watching the center of the front is vector information [0°,0°] since the angle θh in the right and left direction is 0° and the angle θv in the up and down direction is 0°. A watching direction vr in the case where the user is watching at an angle of 45° to the right is vector information [45°,0°].

In step S211, the angle of the face in the up and down direction is detected by detecting the distance from the face direction detection window 13; however, the configuration is not limited thereto. For example, an angle change may be calculated by comparing a variation level of the light intensity at the chin tip 203. In other words, an angle change of the neck part may be calculated in accordance with a change in the slope CDu of the reflected light intensity from the chin base 202 to the chin tip 203 in (C) of FIG. 8K with respect to the slope CDh of the reflected light intensity from the chin base 202 to the chin tip 203 in (B) of FIG. 8G.

Figure 7D:
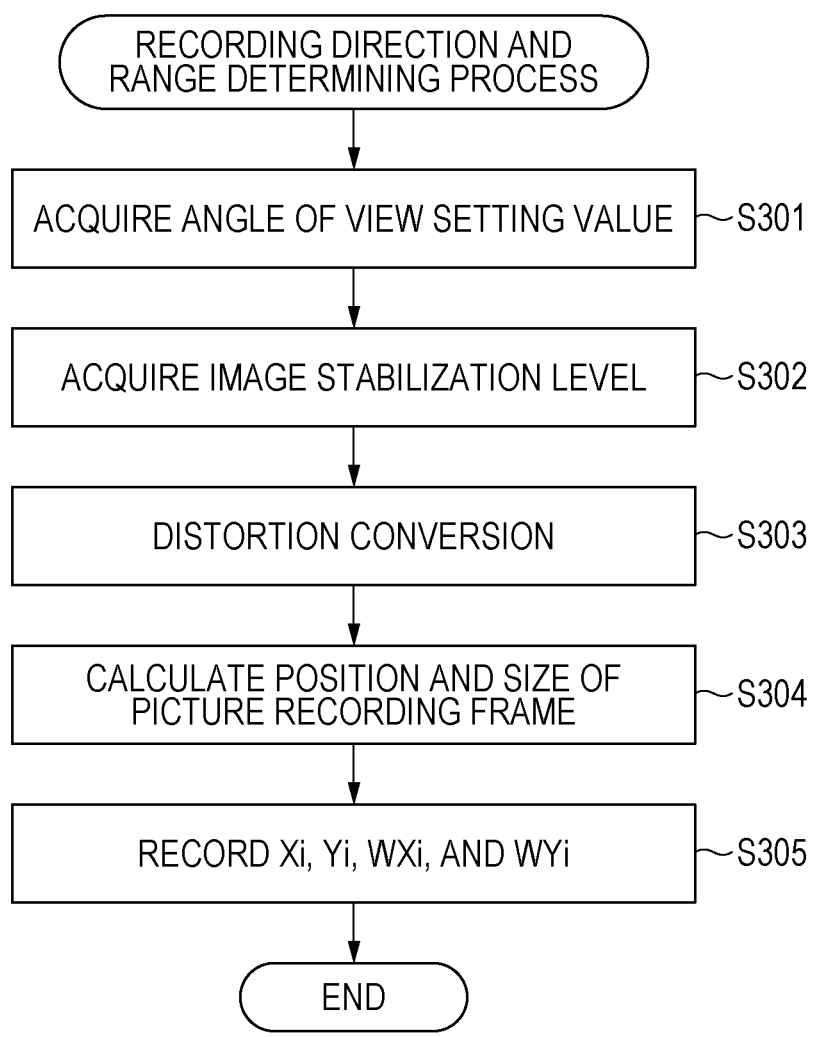
FIG. 7D is a flowchart of a subroutine of a recording direction and range determining process of step S300 of FIG. 7A according to the first embodiment.

FIG. 7D is a flowchart of the subroutine of the recording direction and range determining process of step S300 of FIG. 7A. Before the details of the process are described, a super-wide angle picture for which a recording direction and a recording range are determined in the present embodiment will be described with reference to FIG. 11A.

In the camera body 1 of the present embodiment, the shooting section 40 takes a super-wide angle picture by using the super-wide angle taking lens 16 around the shooting and detection section 10 and clips part of the super-wide angle picture to obtain a picture in the watching direction.

Figure 11A:
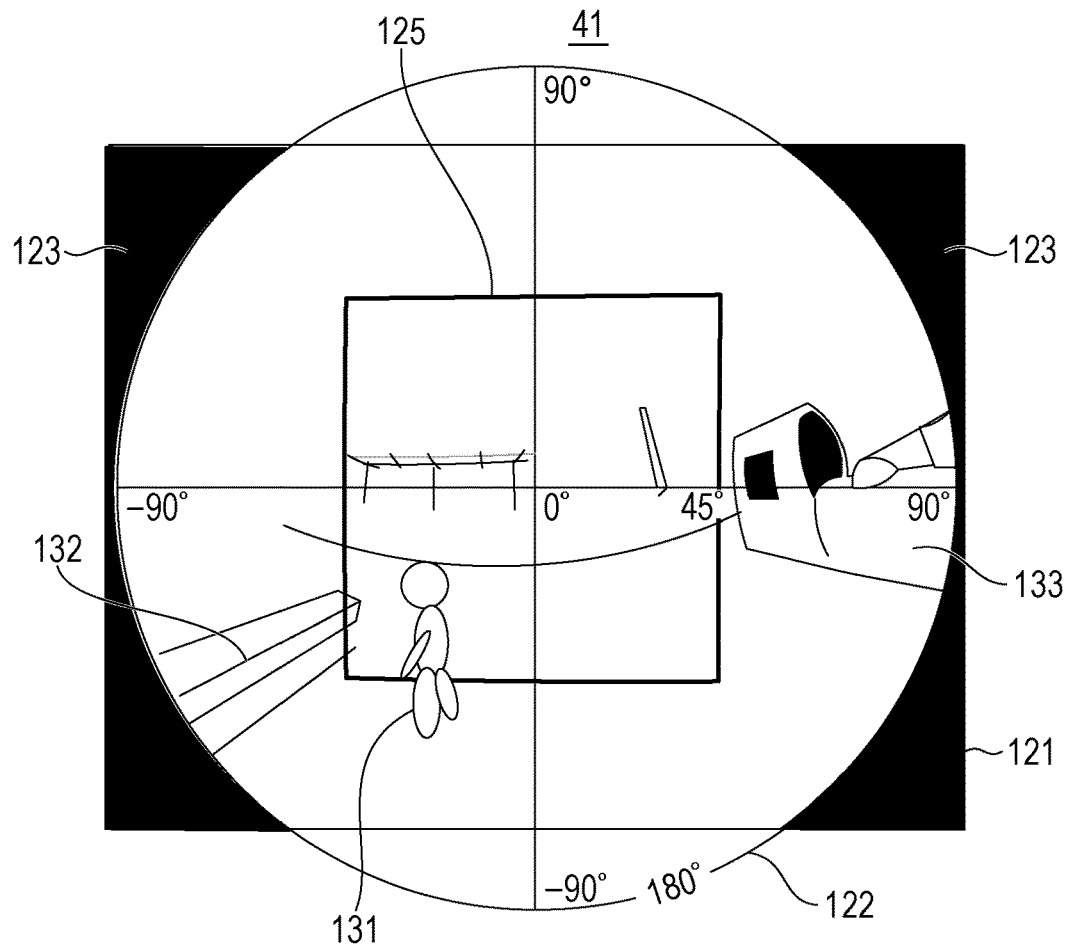
FIG. 11A is a view showing an intended field of view in a super-wide angle picture shot by a shooting section of the camera body in a case where the user is facing forward.
Figure 11B:
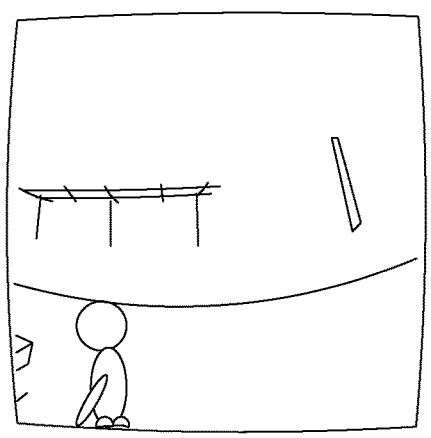
FIG. 11B is a view showing a picture of the intended field of view in FIG. 11A, clipped from the super-wide angle picture.
Figure 11C:
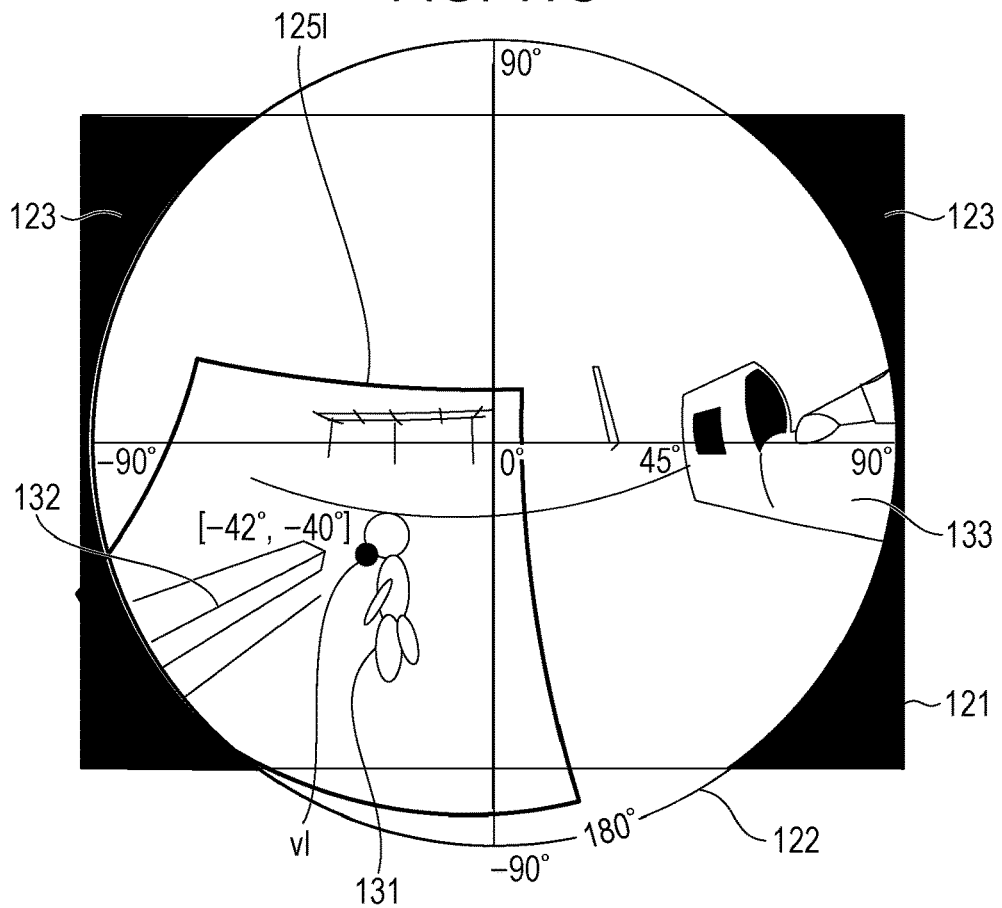
FIG. 11C is a view showing an intended field of view in the super-wide angle picture in a case where the user is watching subject A.
Figure 11D:
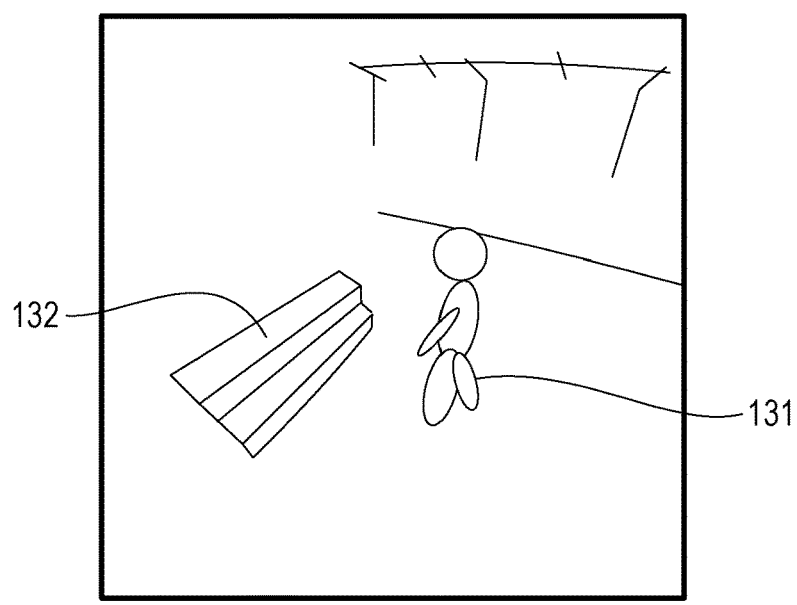
FIG. 11D is a view showing a picture obtained by correcting distortion and shaking on the picture of the intended field of view in FIG. 11C, clipped from the super-wide angle picture.

FIG. 11A is a view showing an intended field of view 125 in a super-wide angle picture shot by the shooting section 40 in a case where the user is facing forward.

As shown in FIG. 11A, a shootable pixel region 121 of the solid-state image capture element 42 is a rectangular region. An effective projection part 122 (predetermined region) is a region in which a circular hemisphere picture fish-eye projected to the solid-state image capture element 42 by the taking lens 16. The taking lens 16 is adjusted such that the center of the pixel region 121 coincides with the center of the effective projection part 122.

The outermost periphery of the circular effective projection part 122 represents the position of a field of view (FOV) angle of 180°. When the user is viewing the horizontal-vertical center, the intended field of view 125 that is a region to be shot and recorded is 90° that is a half of the angle from the center of the effective projection part 122. The taking lens 16 of the present embodiment is able to introduce light outside the effective projection part 122 and is able to perform fish-eye projection of light up to about the maximum FOV angle 192° to the solid-state image capture element 42. However, outside the effective projection part 122, optical performance significantly decreases, for example, resolution extremely drops, the light amount reduces, and distortion increases. Thus, in the present embodiment, an example in which, for a recording region, an image in a watching direction only from a picture (hereinafter, simply referred to as super-wide angle picture) projected to the pixel region 121 of the hemisphere picture displayed in the effective projection part 122 will be described.

In the present embodiment, the size of the effective projection part 122 in the up and down direction is greater than the size of the short side of the pixel region 121, so the picture at the top end and the picture at the bottom end in the effective projection part 122 are outside the pixel region 121; however, the configuration is not limited thereto. For example, the configuration of the taking lens 16 is changed and designed such that all the effective projection part 122 fits in the pixel region 121.

An ineffective pixel region 123 is, of the pixel region 121, a pixel region not included in the effective projection part 122.

The intended field of view 125 is a region that indicates a range in which a picture in the watching direction of the user is clipped from a super-wide angle image and is defined by preset right, left, upper, and lower angles of view (here, 45° FOV 90°) about the watching direction. In the example of FIG. 11A, since the user is facing forward, the center of the intended field of view 125 is the watching direction vo that is the center of the effective projection part 122.

The super-wide angle picture shown in FIG. 11A contains subject A131 that is a child, subject B132 that is a stairway the child that is subject A intends to climb up, and subject C133 that is play equipment in the shape of a locomotive.

Next, the recording direction and range determining process in step S300 that is executed to obtain a picture in the watching direction from the super-wide angle picture described with reference to FIG. 11A is shown in FIG. 7D. Hereinafter, the process will be described with reference to FIG. 12A to FIG. 12G that are specific examples of the intended field of view 125.

In step S301, the set angles of view ang set in advance is acquired by reading the set angles of view ang from the primary memory 103.

In the present embodiment, all the angles of view, that is, 45°, 90°, 110°, and 130°, with which a picture in the watching direction is able to be clipped from the super-wide angle image by the image clipping and development processing section 50, are saved in the internal nonvolatile memory 102 as the set angles of views ang. In any one of step S103, step S106, and step S108, one of the set angles of view ang saved in the internal nonvolatile memory 102 is set, and is saved in the primary memory 103.

In step S301, the watching direction vi determined in step S212 is determined as the recording direction, and a picture with the intended field of view 125, clipped from the super-wide angle image with the acquired set angle of view ang about the recording direction vi is saved in the primary memory 103.

When, for example, the set angle of view ang is 90° and the watching direction vo (vector information [0°,0°]) is detected in the face direction detection process (FIG. 7C), the range of right and left 45° and up and down 45° about the center O of the effective projection part 122 is set to the intended field of view 125 (FIG. 11A). In other words, the overall control CPU 101 (relative position setting unit) sets the angle of the face direction detected by the face direction detection section 20 to the watching direction vi that is vector information indicating a relative position to the super-wide angle picture.

Here, in the case of the watching direction vo, the influence of optical distortion caused by the taking lens 16 can be almost ignored, so the shape of the set intended field of view 125 is directly an intended field of view 125o (FIG. 12A) after distortion conversion in step S303 (described later). Hereinafter, the intended field of view 125 after distortion conversion in the case of the watching direction vi is referred to as intended field of view 125i.

Subsequently, in step S302, the image stabilization level set in advance is acquired by reading the image stabilization level from the primary memory 103.

In the present embodiment, as described above, the image stabilization level is set in any one of step S103, step S106, and step S108 and is saved in the primary memory 103.

In step S302, image stabilization reserved pixel count Pis are set in accordance with the acquired image stabilization level.

In the image stabilization process, in keeping up with the shake amount of the shooting and detection section 10, a picture that keeps up with a picture opposite to the shake direction is acquired. Therefore, in the present embodiment, a reserved region used for image stabilization is provided around the intended field of view 125i.

In the present embodiment, a table holding the value of the image stabilization reserved pixel count Pis associated with each image stabilization level is stored in the internal nonvolatile memory 102. When, for example, the image stabilization level is "intermediate", a reserved pixel region of 100 pixels that is the image stabilization reserved pixel count Pis read from the table is set as a reserved region.

Figure 12A:
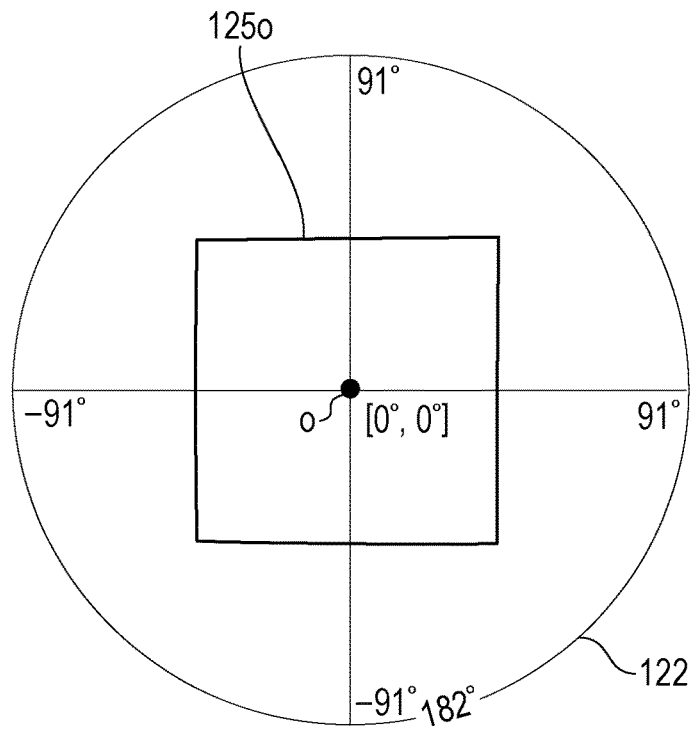
FIG. 12A is a view showing an example of an intended field of view in a super-wide angle picture.
Figure 12B:
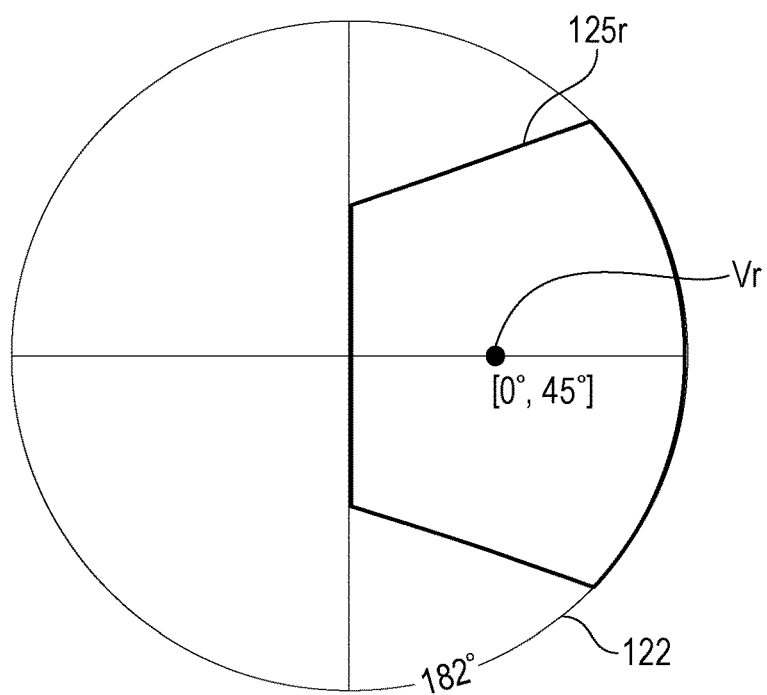
FIG. 12B is a view showing an example of an intended field of view having the same set angle of view as the intended field of view of FIG. 12A but different in watching direction in a super-wide angle picture.
Figure 12C:
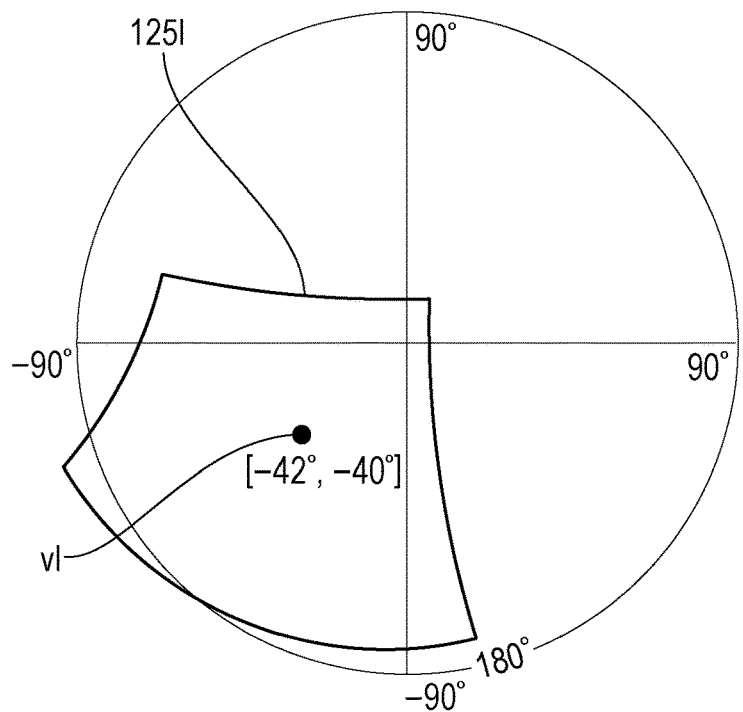
FIG. 12C is a view showing an example of another intended field of view having the same set angle of view as the intended field of view of FIG. 12A but different in watching direction in a super-wide angle picture.
Figure 12D:
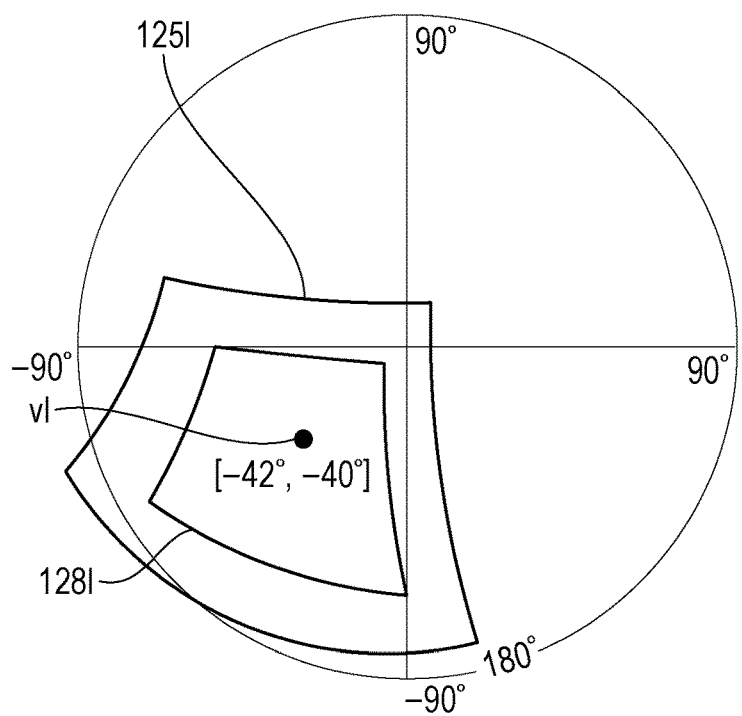
FIG. 12D is a view showing an example of an intended field of view having the same watching direction as the intended field of view of FIG. 12C but smaller in set angle of view in a super-wide angle picture.
Figure 12E:
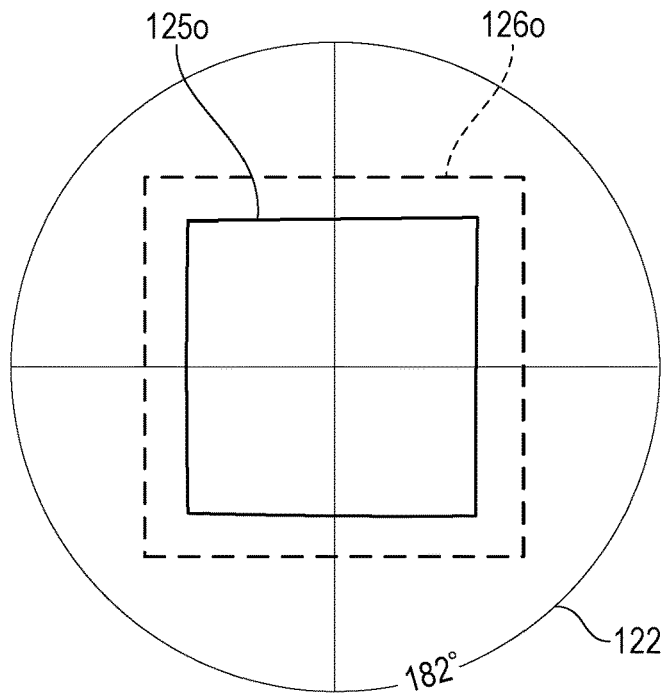
FIG. 12E is a view showing an example in which an image stabilization reserved region corresponding to a predetermined image stabilization level is provided around the intended field of view shown in FIG. 12A.

FIG. 12E is a view showing an example in which a reserved region is assigned to around the intended field of view 125o shown in FIG. 12A. Here, the case where the image stabilization level is "intermediate", that is, the image stabilization reserved pixel count Pis is 100 pixels will be described.

As shown in FIG. 12E, the dashed-line portion with a margin (reserved region) of 100 pixels that is the image stabilization reserved pixel count Pis is provided for each of upper, lower, right, and left sides is an image stabilization reserved pixel frame 126o for the intended field of view 125o.

In FIG. 12A and FIG. 12E, for the sake of easy illustration, the case where the watching direction vi coincides with the center O of the effective projection part 122 (the optical axis center of the taking lens 16) has been described. However, as described in steps below, when the watching direction vi is a peripheral part of the effective projection part 122, there is the influence of optical distortion, so conversion is needed.

In step S303, the shape of the intended field of view 125 set in step S301 is corrected (distortion conversion) in consideration of the watching direction vi and the optical properties of the taking lens 16, and the intended field of view 125*i* is generated. Similarly, the image stabilization reserved pixel count Pis set in step S302 is also corrected in consideration of the watching direction vi and the optical properties of the taking lens 16.

For example, when the set angle of view ang is 90° and the user is watching at an angle of 45° to the right from the center O, the watching direction vi determined in step S212 is the watching direction yr (vector information [45°,0°]). The range of right and left 45° and up and down 45° about the watching direction yr is the intended field of view 125. However, in consideration of the optical properties of the taking lens 16, the intended field of view 125 is corrected to the intended field of view 125*r* shown in FIG. 12B.

As shown in FIG. 12B, the intended field of view 125*r* expands toward the peripheral part of the effective projection part 122, and the position of the watching direction yr is also slightly inside from the center of the intended field of view 125*r*. This is because, in the present embodiment, an optical design of the taking lens 16 is close to stereographic projection fish eye. When the taking lens 16 is designed with an equidistant projection fish eye, equisolidangle projection fish eye, orthogonal projection fish eye, or the like, the relationship changes, so correction for the optical properties is performed over the intended field of view 125.

Figure 12F:
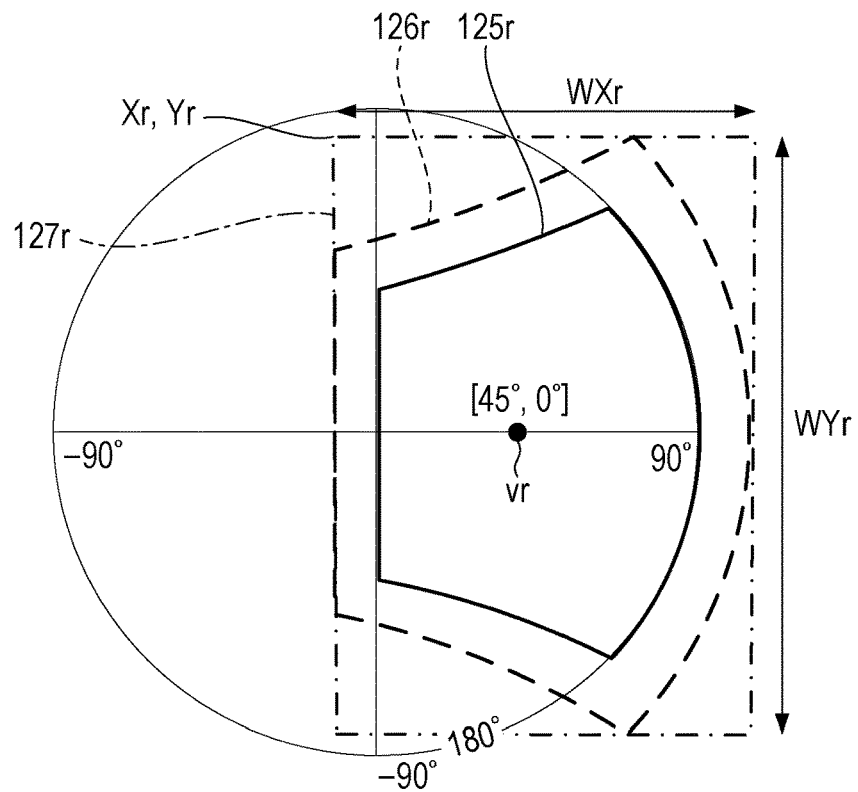
FIG. 12F is a view showing an example in which an image stabilization reserved region having the same image stabilization level as the image stabilization reserved region of FIG. 12E is provided around the intended field of view shown in FIG. 12B.

FIG. 12F is a view showing an example in which a reserved region having the same image stabilization level "intermediate" as the reserved region of FIG. 12E is provided around the intended field of view 125*r* shown in FIG. 12B.

For the image stabilization reserved pixel frame 126*o* (FIG. 12E), a margin of 100 pixels that is the image stabilization reserved pixel count Pis is set for each of up and down, and right and left of the intended field of view 125*o*. In contrast, for the image stabilization reserved pixel frame 126*r* (FIG. 12F), the image stabilization reserved pixel count Pis is corrected to be increased toward the peripheral part of the effective projection part 122.

In this way, as in the case of the shape of the intended field of view 125*r*, the shape of the reserved region used for image stabilization, provided around the intended field of view 125*r* also increases in its correction amount toward the peripheral part of the effective projection part 122 as shown in the image stabilization reserved pixel frame 126*r* of FIG. 12F. This is also because, in the present embodiment, an optical design of the taking lens 16 is close to stereographic projection fish eye. When the taking lens 16 is designed with an equidistant projection fish eye, equisolidangle projection fish eye, orthogonal projection fish eye, or the like, the relationship changes, so correction for the optical properties is performed on the image stabilization reserved pixel frame 126*r*.

The process of successively switching the shapes of the intended field of view 125 and its reserved region in consideration of the optical properties of the taking lens 16, executed in step S303, is a complicated process. Therefore, in the present embodiment, the process of step S303 is executed by using the table holding the shapes of the intended field of view 125*i* and its reserved region for each watching direction vi in the internal nonvolatile memory 102. Depending on the optical design of the taking lens 16 described above, an operational expression may be held in the overall control CPU 101, and an optical distortion value may be calculated by using the operational expression.

In step S304, the position and size of a picture recording frame are calculated.

As described above, in step S303, a reserved region used for image stabilization is provided around the intended field of view 125*i*, and the reserved region is calculated as the image stabilization reserved pixel frame 126*i*. However, depending on the position of the watching direction vi, the shape is considerably specific like, for example, the image stabilization reserved pixel frame 126*r*.

The overall control CPU 101 is able to clip a picture by executing a development process over only the range of such a special shape. However, using an image not in a rectangular shape is not general when recorded as picture data in step S600 or transferred to the display apparatus 800 in step S700. Therefore, in step S304, the position and size of the picture recording frame 127*r* with a rectangular shape, which includes the whole of the image stabilization reserved pixel frame 126*i*, are calculated.

FIG. 12F shows a picture recording frame 127*r* represented by the alternate long and short dashes line, calculated in step S304 for the image stabilization reserved pixel frame 126*r*.

In step S305, the position and size of the picture recording frame 127*r*, calculated in step S304, are recorded in the primary memory 103.

In the present embodiment, the upper-left coordinates Xi,Yi of the picture recording frame 127*r* in a super-wide angle picture are recorded as the position of the picture recording frame 127*r*, and the horizontal width WXi and the vertical width WYi of the picture recording frame 127*r* from the coordinates Xi,Yi are recorded as the size of the picture recording frame 127*r*. For example, for the picture recording frame 127*r* shown in FIG. 12F, the coordinates Xr,Yr, the horizontal width WXr, and the vertical width WYr shown in the drawing are recorded in step S305. The coordinates Xi,Yi are XY coordinates with respect to a predetermined reference point, specifically, the optical center of the taking lens 16 as an origin.

After the image stabilization reserved pixel frame 126*i* and the picture recording frame 127*r* are determined in this way, the subroutine of step S300 shown in FIG. 7D is exited.

In the description up to here, for the sake of simple description of complicated optical stain conversion, the description has been made by using the watching direction including horizontal 0°, that is, the watching direction vo (vector information [0°,0°]) and the watching direction vr (vector information [45°,0°]), as an example of the watching direction vi has been made. However, actually, the watching direction vi of the user can be various directions. Therefore, hereinafter, the recording range development process that is executed in such a case will be described.

For example, an intended field of view 125*l* in the case where the set angle of view ang is 90° and the watching direction vl is [−42°, −40°] is as shown in FIG. 12C.

Figure 12G:
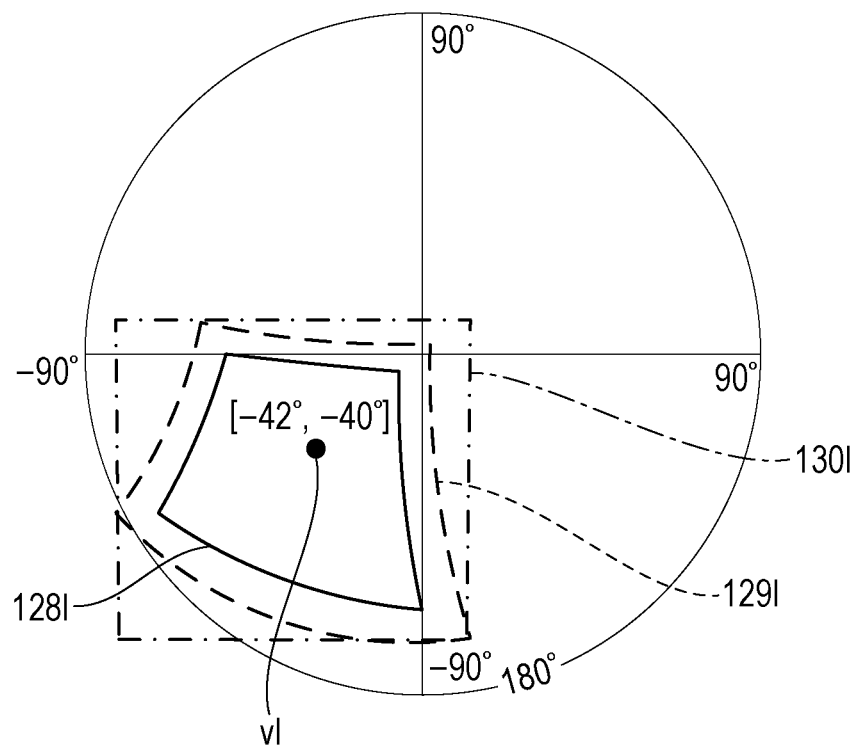
FIG. 12G is a view showing an example in which an image stabilization reserved region having the same image stabilization level as the image stabilization reserved region of FIG. 12E is provided around the intended field of view shown in FIG. 12D.

Even in the same watching direction vl (vector information [−42°, −40°]) as the intended field of view 125*l* but when the set angle of view ang is 45°, an intended field of view 128*l* smaller than the intended field of view 125*l* as shown in FIG. 12D is obtained. Furthermore, for the intended field of view 128*l*, an image stabilization reserved pixel frame 129*l* and a picture recording frame 130*l* as shown in FIG. 12G are set.

Step S400 is a basic operation of shooting, and the general sequence of the shooting section 40 is used, so the details will be known from other literatures, and the description here is omitted. In the present embodiment, the image capture signal processing circuit 43 in the shooting section 40 also executes a process of correcting a signal in a unique output form (an example of standards: MIPI, SLVS), output from the solid-state image capture element 42, to shooting data in a general sensor readout system.

When the mode selected by the shooting mode switch 12 is the moving image mode, the shooting section 40 starts recording in response to pressing down of the start switch 14. After that, when the stop switch 15 is pressed down, recording is stopped. On the other hand, when the mode selected by the shooting mode switch 12 is the still image mode, the shooting section 40 shoots a still image each time the start switch 14 is pressed down.

Figure 7E:
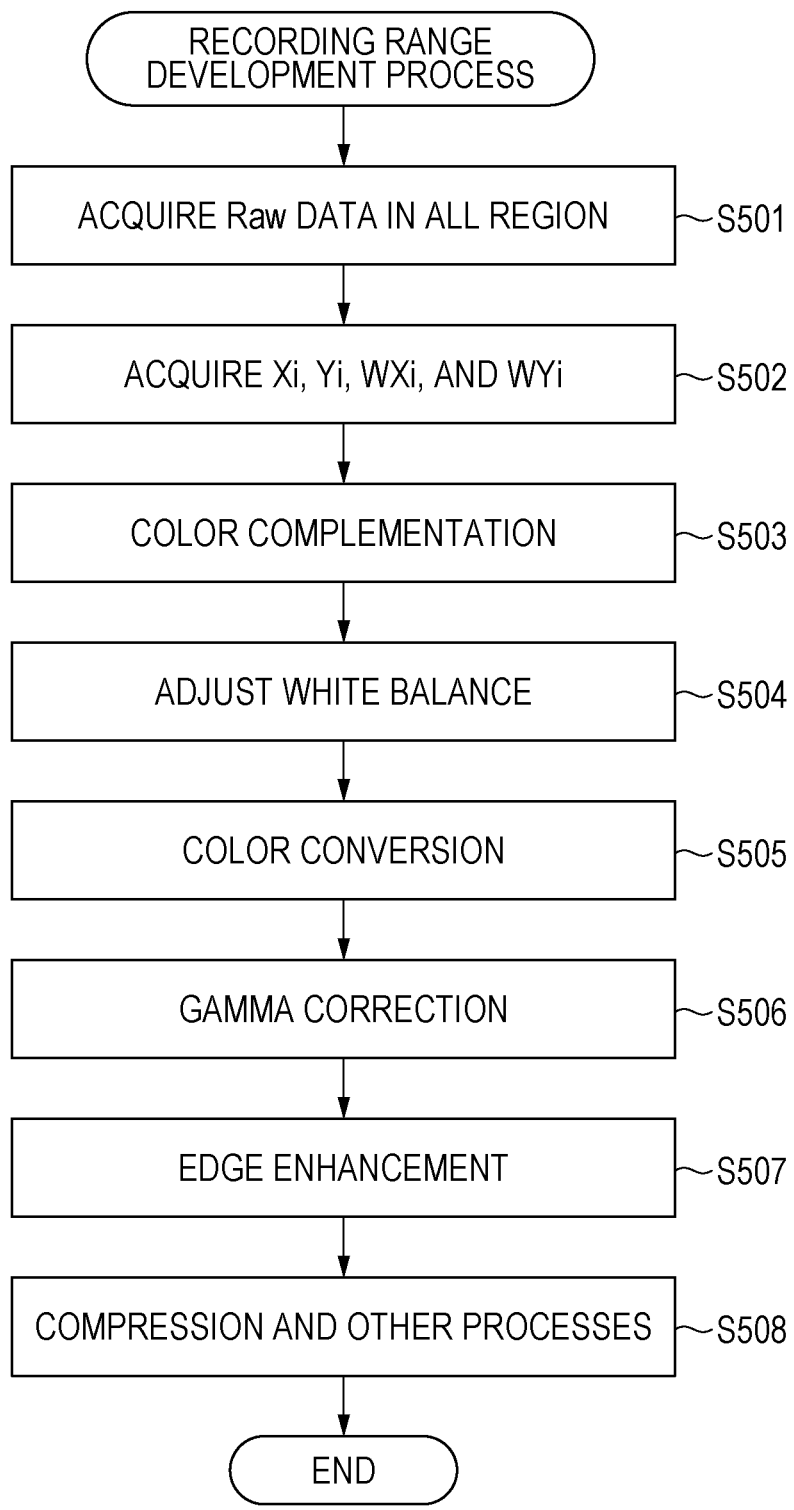
FIG. 7E is a flowchart of a subroutine of a recording range development process of step S500 of FIG. 7A according to the first embodiment.

FIG. 7E is a flowchart of the subroutine of the recording range development process of step S500 of FIG. 7A.

In step S501, Raw data of all the region of shooting data (super-wide angle picture) generated by the shooting section 40 in step S400 is acquired, and is input to a picture take-in section called a head section (not shown) of the overall control CPU 101.

Subsequently, in step S502, the picture recording frame 127r part is clipped from the super-wide angle picture acquired in step S501 in accordance with the coordinates Xi,Yi, the horizontal width WXi, and the vertical width WYi recorded in the primary memory 103 in step S305. After clipping, a crop development process (FIG. 7F) composed of step S503 to step S508 that will be described below is started on only the pixels in the image stabilization reserved pixel frame 126i. Thus, in comparison with the case where the development process is executed all over the region of the super-wide angle picture read in step S501, the amount of computation is significantly reduced, so computation time and power are reduced.

As shown in FIG. 7F, when the mode selected by the shooting mode switch 12 is the moving image mode, the processes of step S200 and step S300 and the process of step S400 are executed in parallel at the same frame rate or at different frame rates. In other words, each time one-frame Raw data of all the regions, generated in the shooting section 40, is acquired, the crop development process is executed in accordance with the coordinates Xi,Yi, the horizontal width WXi, and the vertical width WYi recorded in the primary memory 103 at that time point.

When the crop development process is started on pixels in the image stabilization reserved pixel frame 126i, color complementation for complementing pieces of color pixel information arranged in Bayer array is performed in step S503.

After that, white balance is adjusted in step S504, and then color conversion is performed in step S505.

In step S506, gamma correction for correcting tones is performed in accordance with a preset gamma correction value.

In step S507, edge emphasizing adapted for image size is performed.

In step S508, the obtained data is converted into a temporary saving data format by performing compression and other processes on the data and recorded in the primary memory 103, and then the subroutine is exited. The temporary saving data format will be described in detail later.

The order of the crop development process to be executed in step S503 to step S508 and whether a process is omitted may be determined according to a camera system and do not limit the present disclosure.

When the moving image mode is selected, the process from step S200 to step S500 is repeatedly executed until recording is stopped.

With the process, the amount of computation is significantly reduced as compared to the case where the development process is executed over all the regions read in step S501. Therefore, an inexpensive, low-power-consumption microcomputer is able to be used as the overall control CPU 101, with the result that heat generation in the overall control CPU 101 is suppressed, and the life of the battery 94 extends.

In the present embodiment, to reduce the control load on the overall control CPU 101, the optical correction process (step S800 of FIG. 7A) and the image stabilization process (step S900 of FIG. 7A) for a picture are not executed in the camera body 1 and are executed in the display apparatus control section 801 after data is transferred to the display apparatus 800. Therefore, if only the data of a picture partially clipped from a projected super-wide angle picture is sent to the display apparatus 800, the optical correction process or the image stabilization process is not able to be executed. In other words, there is no position information used to be substituted into an expression at the time of the optical correction process or to lock up from a correction table at the time of the image stabilization process even with data of a clipped picture, so these processes are not able to be properly executed in the display apparatus 800. Therefore, in the present embodiment, not only data of the clipped picture but also correction data including information on a clipped position, or the like, from the super-wide angle picture of the picture is sent from the camera body 1 to the display apparatus 800.

Here, when the clipped picture is a still image picture, the optical correction process and the image stabilization process are able to be properly executed in the display apparatus 800 even when data of the still image picture and correction data are separately sent to the display apparatus 800 since data of the still image picture and correction data are in a one-to-one correspondence. On the other hand, when the clipped picture is a moving image picture, if data of the moving image picture and correction data are separately sent to the display apparatus 800, it is difficult to determine which one of pieces of correction data for the frames of the moving image picture is the sent correction data. Particularly, if the clock rate of the overall control CPU 101 in the camera body 1 delicately differs from the clock rate of the display apparatus control section 801 in the display apparatus 800, the overall control CPU 101 is not able to be synchronized with the display apparatus control section 801 in several-minute moving image shooting. As a result, there is an inconvenience that, for example, the display apparatus control section 801 corrects a frame to be processed by using correction data different from correction data associated with the frame.

Thus, in the present embodiment, in sending data of the clipped moving image picture from the camera body 1 to the display apparatus 800, correction data for the data of the moving image picture is appropriately given to the data of the moving image picture. Hereinafter, the method will be described.

Figure 14:
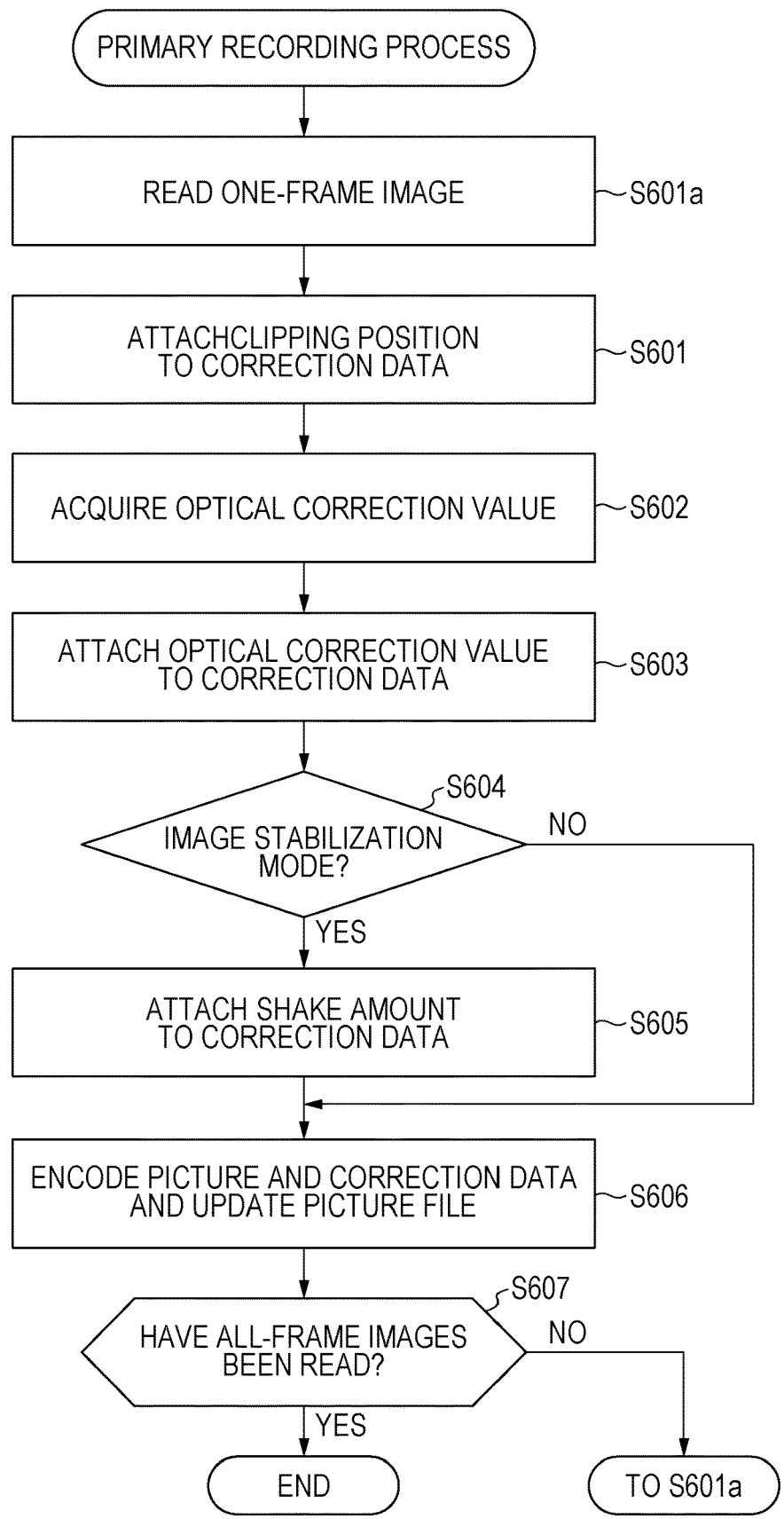
FIG. 14 is a flowchart of a subroutine of a primary recording process of step S600 of FIG. 7A.

FIG. 14 is a flowchart of the subroutine of the primary recording process of step S600 of FIG. 7A. Hereinafter, the process will be described with reference to FIG. 15. FIG. 14 shows the process in the case where the mode selected by the shooting mode switch 12 is the moving image mode. When the selected mode is the still image mode, the process begins from the process of step S601 and ends when the process of step S606 completes.

In step S601a, the overall control CPU 101 reads one-frame image for which the process from step S601 to step S606 is not yet processed, from the moving image picture developed in the recording range development process (FIG.

7E). The overall control CPU 101 (metadata generating unit) generates correction data that is the metadata of the read frame.

In step S601, the overall control CPU 101 attaches information on the clipped position of the image of the frame read in step S600 to the correction data. Information attached here is the coordinates Xi,Yi of the picture recording frame 127r acquired in step S305. Alternatively, information attached here may be vector information that indicates the watching direction vi.

In step S602, the overall control CPU 101 (optical correction value acquiring unit) acquires an optical correction value. The optical correction value is the optical distortion value set in step S303. Alternatively, the optical correction value may be a marginal illumination correction value or a correction value according to lens optical properties called diffraction correction.

In step S603, the overall control CPU 101 attaches the optical correction value used for distortion conversion in step S602 to the correction data.

In step S604, the overall control CPU 101 determines whether the image stabilization mode is set.

Specifically, when the image stabilization mode set in advance is "intermediate" or "high", it is determined that the image stabilization mode is set, and the process proceeds to step S605. On the other hand, when the image stabilization mode set in advance is "off", it is determined that the image stabilization mode is not set, and the process proceeds to step S606. Here, the reason why step S605 is skipped when the image stabilization mode is "off" is because it is possible to reduce the computation data amount of the overall control CPU 101 and the data amount during wireless transmission by the amount skipped, and, by extension, it is possible to reduce the power and heat generation of the camera body 1. A reduction of data used for the image stabilization process has been described. Data for a marginal illumination correction value included in the optical correction value acquired in step S602, or whether there is analysis correction, may be reduced.

In the present embodiment, the image stabilization mode is set in advance through user's operation on the display apparatus 800. Alternatively, the image stabilization mode may be set as a default setting of the camera body 1. When the camera system is configured to transfer data to the display apparatus 800 and then switch whether to set the image stabilization process, step S604 is omitted, and the process directly proceeds from step S603 to step S605.

In step S605, the overall control CPU 101 (movement amount detection unit) attaches the image stabilization mode acquired in step S302 and the gyroscope data associated with the frame read in step S600 and stored in the primary memory 813 to the correction data.

In step S606, a picture file 1000 (FIG. 15) is updated with data encoded from the data of the image of the frame read in step S600 and the correction data attached with various data in step S601 to step S605. When the first frame of the moving image picture is read in step S601a, the picture file 1000 is generated in step S606.

In step S607, it is determined whether reading of the images of all the frames of the moving image picture developed in the recording range development process (FIG. 7E) is complete. When the reading is not complete, the process returns to step S601a. On the other hand, when the reading is complete, the subroutine is exited. The generated picture file 1000 is saved in the internal nonvolatile memory 102. Alternatively, the generated picture file 1000 may be saved in not only the primary memory 813 and the internal nonvolatile memory 102 but also the large-capacity nonvolatile memory 51. Alternatively, the generated picture file 1000 may be immediately subjected to the transfer process (step S700 of FIG. 7A) to the display apparatus 800 and, after being transferred to the display apparatus 800, may be saved in the primary memory 813.

Here, in the present embodiment, to encode means to merge picture data with correction data into a single file. At this time, picture data may be compressed or merged data of picture data with correction data may be compressed.

Figure 15:
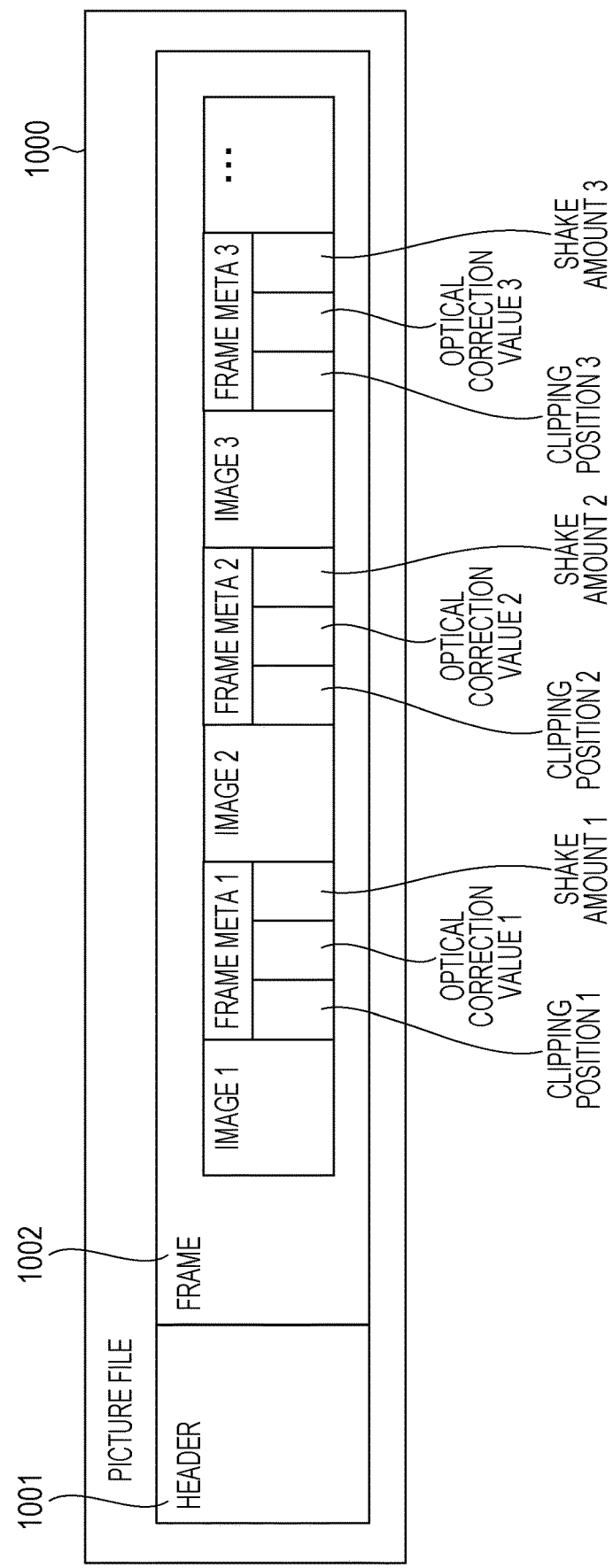
FIG. 15 is a diagram showing the data structure of a picture file generated through the primary recording process.

FIG. 15 is a view showing the data structure of the picture file 1000.

The picture file 1000 is made up of a header 1001 and a frame 1002. The frame 1002 is made up of frame data sets, each of which is a set of an image of each of frames that make up a moving image picture and a frame meta associated with the image. In other words, the frame 1002 includes frame data sets corresponding to the total number of frames of the moving image picture.

In the present embodiment, frame meta is information encoded from correction data attached as needed with a clipped position (in-picture position), an optical correction value, and gyroscope data; however, the frame meta is not limited thereto. For example, the information amount of frame meta may be changed by attaching other information to frame meta according to the shooting mode selected by the shooting mode switch 12, discarding a shake amount from frame meta, or the like.

An offset value up to the frame data set of each frame or a head address of each frame is recorded in the header 1001. Alternatively, metadata like time and size associated with the picture file 1000 may be saved.

In this way, in the primary recording process (FIG. 14), the picture file 1000 including sets of each frame of the moving image picture developed in the recording range development process (FIG. 7E) and the associated metadata is transferred to the display apparatus 800. Thus, even when the clock rate of the overall control CPU 101 of the camera body 1 delicately differs from the clock rate of the display apparatus control section 801 of the display apparatus 800, the display apparatus control section 801 is able to reliably execute the correction process over the moving image picture developed in the camera body 1.

In the present embodiment, frame meta contains an optical correction value. Alternatively, an optical correction value may be given to the overall picture.

Figure 16:
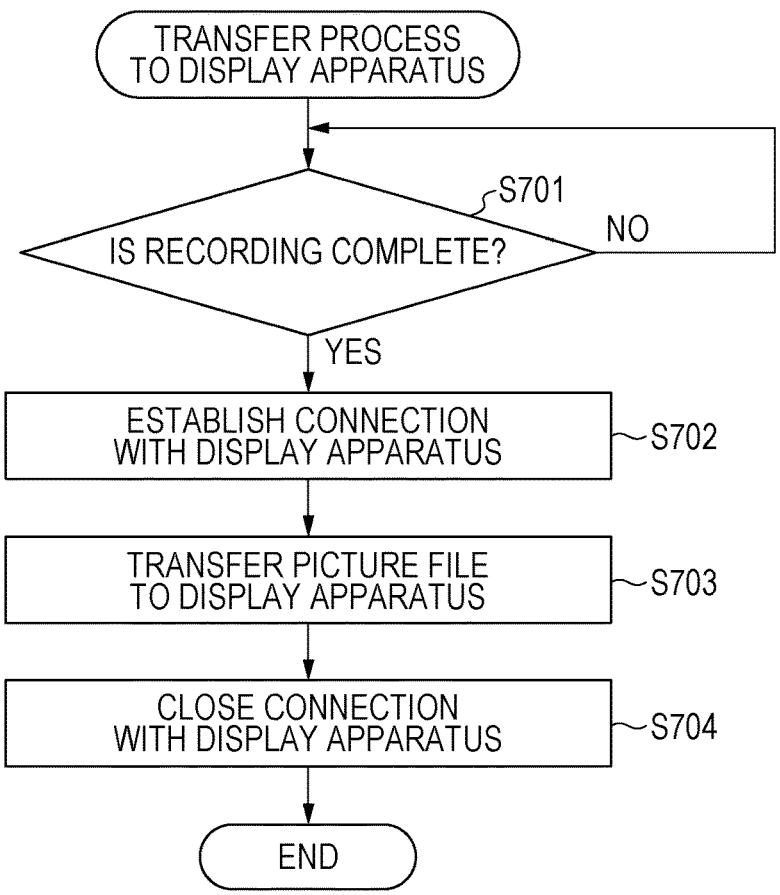
FIG. 16 is a flowchart of a subroutine of a transfer process to the display apparatus of step S700 of FIG. 7A.

FIG. 16 is a flowchart of the subroutine of the transfer process to the display apparatus 800 of step S700 of FIG. 7A. FIG. 16 shows the process in the case where the mode selected by the shooting mode switch 12 is the moving image mode. When the selected mode is the still image mode, the process begins from the process of step S702.

In step S701, it is determined whether recording of a moving image picture by the shooting section 40 (step S400) is complete or a moving image picture is being recorded. Here, when the moving image picture is being recorded, it is in a state where the recording range development process (step S500) for each frame and update of the picture file 1000 (step S606) in the primary recording process (step S600) are being sequentially executed.

Since wireless transfer increases electric power load, when wireless transfer is performed in parallel during recording, the battery capacity of the battery 94 needs to be increased or additional measures for heat generation need to be taken. From the viewpoint of computing power, when wireless transfer is performed in parallel during recording, computation load increases, so the high-spec overall control CPU 101 needs to be prepared. In the present embodiment, in light of these situations, after completion of recording of the moving image picture (YES in step S701), the process proceeds to step S702 to establish connection with the display apparatus 800. However, when the camera system of the present embodiment has a margin in electric power supplied from the battery 94 and does not need additional measures for heat generation, connection with the display apparatus 800 may be established in advance, for example, at startup of the camera body 1 or before recording is started.

In step S702, to transfer the picture file 1000 with a large data amount to the display apparatus 800, connection with the display apparatus 800 is established via the high-speed wireless unit 72. The low-power wireless unit 71 is used to transfer a low-resolution picture (or a picture) for checking an angle of view to the display apparatus 800 and transmit and receive various setting values to and from the display apparatus 800; however, the low-power wireless unit 71 is not used to transfer the picture file 1000 because it takes time to transfer.

In step S703, the picture file 1000 is transferred to the display apparatus 800 via the high-speed wireless unit 72, the process proceeds to step S704 when the transfer completes, connection with the display apparatus 800 is closed, and then the subroutine is exited.

Here, the case where a single picture file including images of all the frames of a single moving image picture is transferred has been described; however, in the case of a long-time moving image picture over several minutes, a plurality of picture files may be used by segmenting the moving image picture in units of time. For a picture file with the data structure shown in FIG. 15, even when a single moving image picture is transferred to the display apparatus 800 as a plurality of picture files, it is possible to correct the moving image picture without a difference in timing from correction data in the display apparatus 800.

Figure 17:
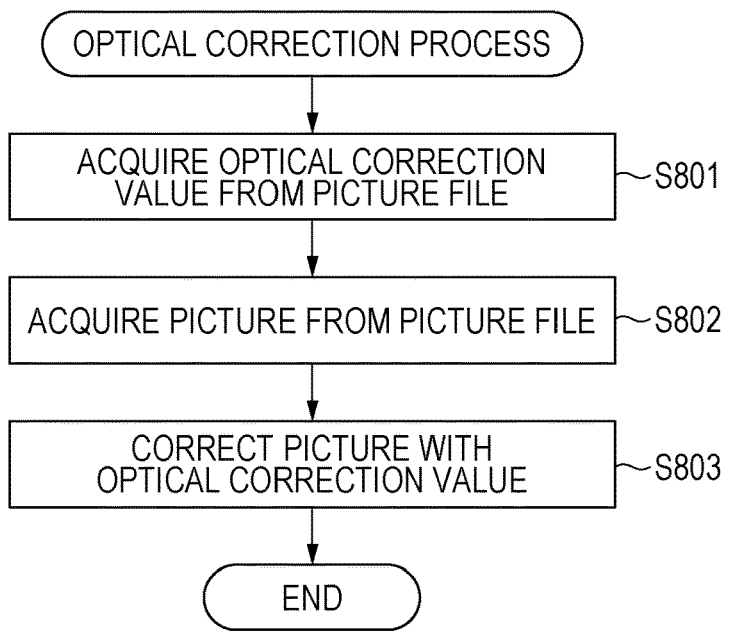
FIG. 17 is a flowchart of a subroutine of an optical correction process of step S800 of FIG. 7A.

FIG. 17 is a flowchart of the subroutine of the optical correction process of step S800 of FIG. 7A. Hereinafter, the process will be described with reference to FIG. 18A to FIG. 18F. As described above, the process is a process to be executed by the display apparatus control section 801 of the display apparatus 800.

In step S801, the display apparatus control section 801 (picture file receiving unit) receives the picture file 1000 from the camera body 1, transferred in the transfer process (step S700) to the display apparatus 800. After that, the display apparatus control section 801 acquires the optical correction value extracted from the received picture file 1000.

Subsequently, in step S802, the display apparatus control section 801 acquires a picture (one-frame image of the moving image picture) from the picture file 1000.

In step S803, the display apparatus control section 801 performs optical correction on the picture acquired in step S802 by using the optical correction value acquired in step S801, and saves the corrected picture in the primary memory 813. In performing optical correction, when an image is clipped from the picture acquired in step S802, the process is executed by clipping an image in a range narrower than the development range (intended field of view 125*i*) determined in step S303 (clipping development region).

FIG. 18A to FIG. 18F are views for illustrating the case in which distortion aberration correction is performed in step S803 of FIG. 17.

Figure 18A:
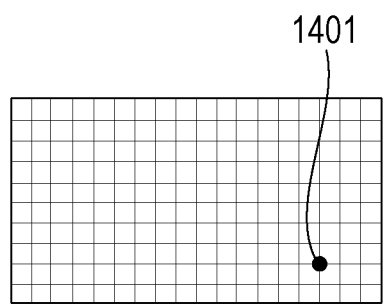
FIG. 18A to FIG. 18F are views for illustrating a process in which distortion aberration correction is performed in step S803 of FIG. 17.
Figure 18B:
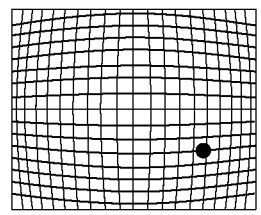

FIG. 18A is a view showing the position of a subject 1401 when the user views the subject 1401 with the naked eye at the time of shooting. FIG. 18B is a view showing an image that the subject 1401 is reflected on the solid-state image capture element 42.

Figure 18C:
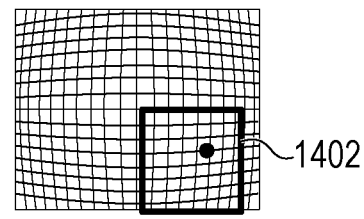

FIG. 18C is a view showing a development region 1402 in the image of FIG. 18B. Here, the development region 1402 is the clipping development region described above.

Figure 18D:
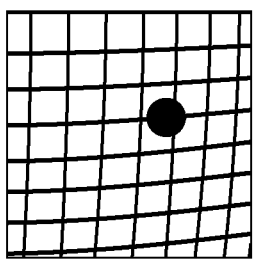
Figure 18E:
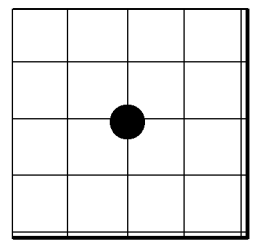

FIG. 18D is a view showing the clipping development region that the image of the development region 1402 is clipped. FIG. 18E is a view showing a picture obtained by performing distortion correction on the clipping development region of FIG. 18D. Since the clipping process is performed at the time of performing distortion correction on the clipping development picture, the picture shown in FIG. 18E is further smaller in angle of view than the clipping development picture shown in FIG. 18D.

Figure 19:
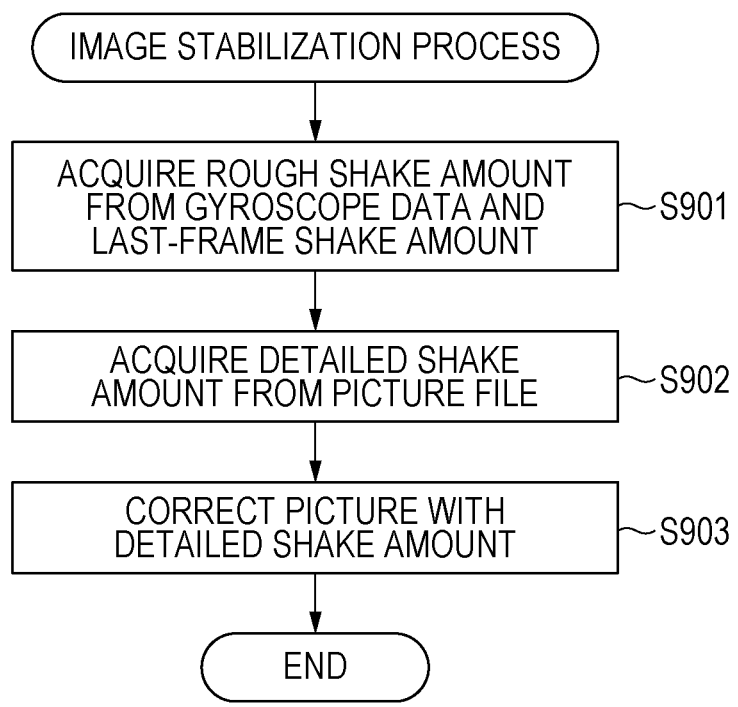
FIG. 19 is a flowchart of a subroutine of an image stabilization process of step S900 of FIG. 7A.

FIG. 19 is a flowchart of the subroutine of the image stabilization process of step S900 of FIG. 7A. Hereinafter, the process will be described with reference to FIG. 25. As described above, the process is a process to be executed by the display apparatus control section 801 of the display apparatus 800.

In step S901, a shake amount Vo and gyroscope data of a frame currently in process (current frame) and a shake amount $V_{n-1}$ and gyroscope data of a frame one frame before (last frame) are acquired from the frame meta of the picture file 1000. After that, an approximate shake amount $V_n^{Pre}$ is calculated from these pieces of information.

In step S902, a detailed shake amount $V_n^{Det}$ is obtained from the picture. Shake detection is performed by calculating how much the feature points of the image of the current frame have moved from the last frame.

A known method may be adopted to extracting feature points. For example, a luminance information image obtained by extracting only luminance information of the image of a frame may be generated, an image shifted by one to several pixels from the luminance information image may be subtracted from the original image, and pixels of which the absolute value is greater than or equal to a threshold may be extracted as feature points. An edge extracted by subtracting an image obtained by applying a high-pass filter to the luminance information image from the original luminance information image may be extracted as feature points.

A difference in luminance information image between the current frame and the last frame is calculated multiple times while shifting the luminance information image by one to several pixels, and the amount of movement is calculated by calculating a position where the difference at the pixel of a feature point reduces.

Because a plurality of feature points is used as will be described later, feature points can be extracted from a plurality of blocks into which each of the images of the current frame and the last frame is divided. The number of blocks divided can be generally 4×3, that is, 12 blocks to 96×64 blocks depending on the number of pixels and aspect ratio of an image. When the number of blocks is small, correction of a trapezoid, rotation of the optical axis direction, and the like due to tilt of the shooting section 40 of the camera body 1 is not able to be accurately performed. When the number of blocks is too large, the size of one block reduces, and feature points are close to each other, so errors are included. For these reasons, the optimal number of blocks is selected as needed according to the number of pixels, easiness of feature points, the angle of view of a subject, and the like.

To calculate the amount of movement, a difference in luminance information image between the current frame and the last frame is calculated multiple times while the luminance information image is shifted by one to several pixels, so the amount of calculation increases. Therefore, for an actual amount of movement, to calculate how many pixels deviated from the shake amount $V_n^{Pre}$, difference calculation is performed over only the neighborhood. Thus, the amount of calculation is significantly reduced.

Subsequently, in step S903, image stabilization correction is performed by using the detailed shake amount $V_n^{Det}$ acquired in step S902, and then the subroutine is exited.

Euclidean transformation that allows rotation and parallel displacement, affine transformation that allows them, projective transformation that allows keystone correction, or the like is an existing known method for image stabilization process.

Euclidean transformation is possible in the case of displacement or rotation with respect to the X-axis or the Y-axis; however, a shake that actually occurs in the case where an image is shot by the shooting section 40 of the camera body 1 can be a hand movement in a front and rear direction or in a pan/tilt direction, or the like. Thus, in the present embodiment, image stabilization correction is performed by using affine transformation capable of correcting enlargement, skew, and the like. In affine transformation, when the coordinates (x,y) of a reference feature point moves to coordinates (x',y'), it is expressed by the following expression 100.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \qquad (100)$$

Affine coefficients of the 3×3 matrix in the expression 100 can be calculated when deviations of at least three feature points are detected. However, when detected feature points are close to one another or lie on a straight line, image stabilization correction at a point far from the feature points and at a point spaced apart from the straight line is inaccurate. Thus, detected feature points far from one another and not on the same straight line can be selected. Thus, when a plurality of feature points is detected, one of feature points close to each other is omitted, and the remainders are normalized by the method of least squares.

Figure 18F:
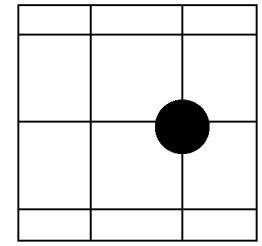

FIG. 18F is a view showing a picture obtained by applying image stabilization correction of step S903 to the picture subjected to distortion correction and shown in FIG. 18E. Since the clipping process is performed at the time of performing image stabilization correction, the picture shown in FIG. 18F is further smaller in angle of view than the picture shown in FIG. 18E.

By performing such an image stabilization process, a high-quality picture of which the shake is corrected is obtained.

A series of operations that is executed in the camera body 1 and the display apparatus 800 in the camera system of the present embodiment has been described.

The optical correction process and the image stabilization process are executed on pictures clipped into various shapes according to a watching direction in this way. With this configuration, even when the overall control CPU 101 of the camera body 1 is low-spec, the overall control CPU 101 is able to provide a picture about a subject, of which distortion and shaking are corrected, even when a picture of, for example, an intended field of view, with a large distortion is clipped. In other words, the user is able to obtain a picture shot in the watching direction of its own only by turning on the power switch 11 and selecting the mode with the shooting mode switch 12 without touching the camera body 1.

Here, the preset mode will be described.

The preset mode is a third shooting mode including a moving image mode and a still image mode.

The preset mode is a mode for custom shooting. For example, arrangement of an operating switch and a plurality of settings for a wearable device is difficult for the camera body 1. Therefore, detailed settings are performed by an external device, such as the display apparatus 800.

For example, assuming a case where, even in the same moving image shooting, an image with an angle of view of 90° and an image with an angle of view of 45° are intended to be successively shot. In a normal moving image mode, an angle of view of 90° is set. When the angle of view is intended to be switched to 45°, shooting is stopped, the display apparatus 800 is caused to shift into the setting screen, and the angle of view is reset to 45°. During continuous shooting, it is burdensome to operate the display apparatus 800 to change the setting, and a picture that the user wants to record can be missed.

When the preset mode is set in advance to the moving image mode with an angle of view of 45°, shooting is able to be immediately changed to zoom magnification shooting with an angle of view of 45° just by sliding the shooting mode switch 12 to the preset after the end of moving image shooting with an angle of view of 90°, and a current shooting action does not need to be interrupted.

The contents of the preset include not only changing the angle of view but also changing the image stabilization level designated as "high", "intermediate", "off", and the like, changing the setting of voice recognition not described in the present embodiment, and the like.

This is performed on the setting screen (FIG. 13) of the display apparatus 800.

Figure 11E:
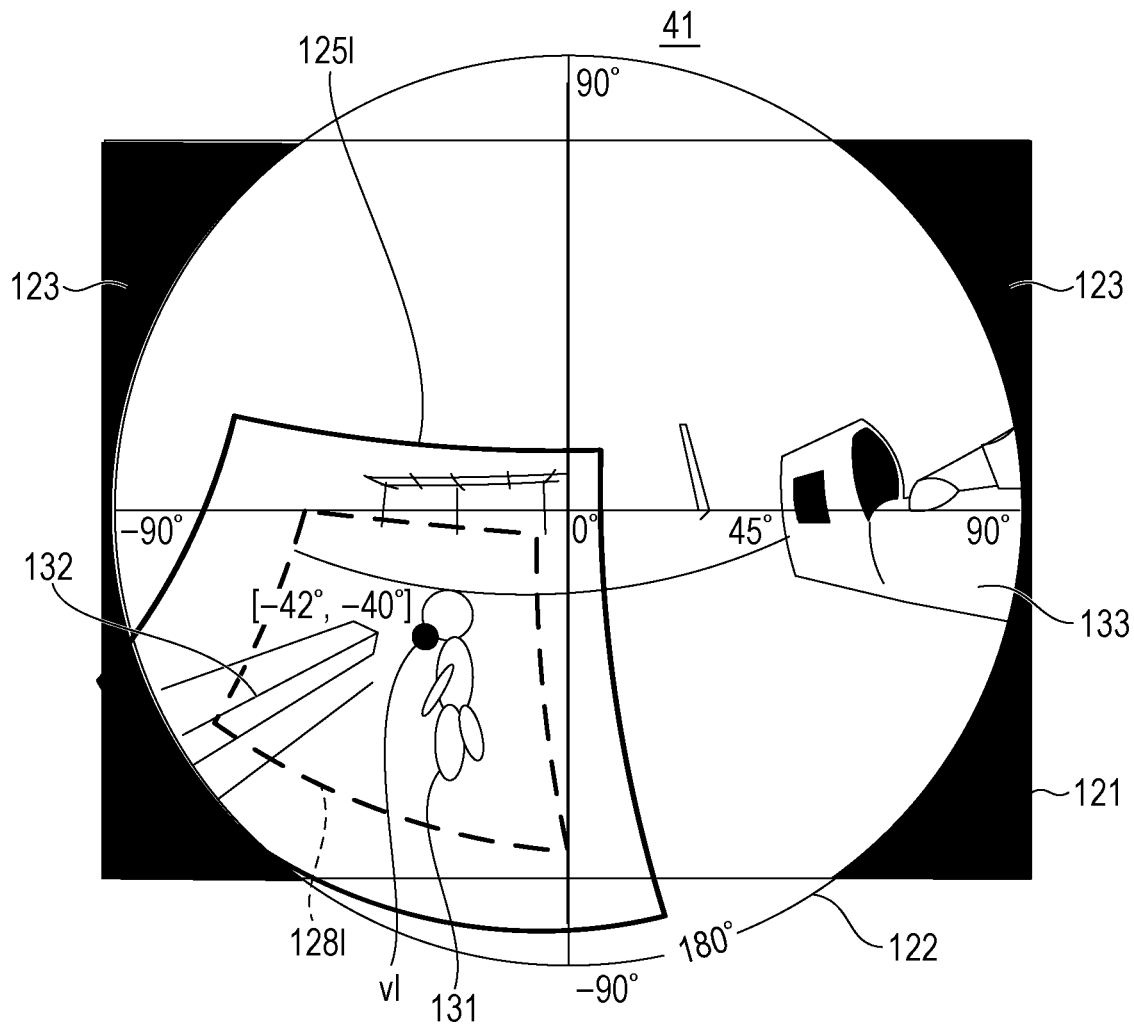
FIG. 11E is a view showing an intended field of view in the super-wide angle picture in a case where the user is watching subject A at a set angle of view smaller than that of FIG. 11C.

When, for example, in the above shooting situation, the user changes from the moving image mode to the preset mode with the shooting mode switch 12 while continuing to watch a child (subject A131), the set angle of view ang is changed from 90° to 45°. In this case, the recording direction and angle-of-view determining section 30 clips a picture with the intended field of view 1281 indicated by the dashed-line frame shown in FIG. 11E from a super-wide angle picture shot by the shooting section 40.

Figure 11F:
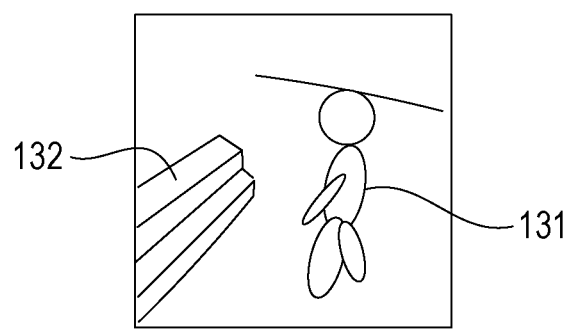
FIG. 11F is a view showing a picture obtained by correcting distortion and shaking on the picture of the intended field of view in FIG. 11E, clipped from the super-wide angle picture.

In the preset mode as well, the optical correction process and the image stabilization process are executed in the display apparatus 800 in step S800 and step S900. With this configuration, even when the overall control CPU 101 of the camera body 1 is low-spec, the overall control CPU 101 is able to provide a picture of which distortion and shaking are corrected and that is zoomed in about the child (subject A131) as shown in FIG. 11F. The example in which the set angle of view ang is changed from 90° to 45° in the moving image mode has been described. A similar operation can be performed in the still image mode. A similar operation can also be performed when the set angle of view ang for a moving image is 90° and the set angle of view ang for a still image is 45°.

In this way, the user is able to obtain a zoom-in picture shot in the watching direction of its own only by changing the mode of the camera body 1 with the shooting mode switch 12.

In the present embodiment, the case where the face direction detection section 20 and the shooting section 40 are integrated in the camera body 1 has been described; however, the configuration is not limited thereto as long as the face direction detection section 20 is worn on the body of the user, other than the head, and the shooting section 40 is worn on the body of the user. For example, the shooting and detection section 10 of the present embodiment may be installed on the shoulder or at the abdomen. However, in the case of on the shoulder, when a camera is installed on the right shoulder, the left side is considered to be obstructed by the head, so a plurality of image capture units can be installed to further provide an image capture unit on the left shoulder or the like in addition to the right shoulder. In the case of the abdomen, a parallax spatially occurs from the head, so correction calculation for the watching direction to correct the parallax as described in a third embodiment can be performed.

Second Embodiment

In a second embodiment, a method of determining a clipping range in the case where calculation of the watching direction fails will be described with reference to FIG. 20, FIG. 21A, and FIG. 21B.

Basically, the present embodiment describes a modification from the first embodiment. Therefore, like reference signs denote the same components in the configuration of the camera system of the second embodiment as those of the camera system of the first embodiment, the overlap description is omitted, and different components will be described in detail as needed.

In the first embodiment, as shown in FIG. 7A, the intended field of view is set in the recording direction and range determining process in step S300 in accordance with the watching direction calculated from the face direction detected by the face direction detection section 20 in step S200. However, the face direction detection section 20 can be covered with an obstacle, such as a collar and hair, the face direction detection section 20 can be broken, or the face direction detection section 20 can be detached from the user. In such a case, the face direction of the user is not able to be acquired. In such a case, the user is not able to shoot a picture with an intended field of view, that the user wants to shoot.

In Japanese Patent Laid-Open Publication No. 2014-181949, when a second camera that shoots a user fails to detect the user, the fact that the user has failed to detect the user is not saved in the history of watching information or the like of the user till then, and detection of the user is performed again. In the case of shooting while tracking the face direction, a picture that does not significantly deviate from user's intention is shot by determining a shooting direction depending on a situation when detection of the face direction fails.

In contrast, in the present embodiment, when the face direction of the user is detectable, the face direction is detected by the face direction detection section 20, and a picture with an intended field of view is shot in a recording direction based on the watching direction calculated in accordance with the face direction, as in the case of the first embodiment. On the other hand, when the face direction of the user is not able to be detected and the watching direction of the user is not able to be calculated, a picture with an intended field of view based on user's intention is shot. In other words, in the present embodiment, when the face direction detection process completes in step S200, the watching direction determining process is executed before the recording direction and range determining process is executed in step S300. In this process, when the face direction detection section 20 fails to detect the face direction of the user, user's intention is determined according to a situation, and the watching direction is estimated. In other words, a picture with an intended field of view is shot in a recording direction based on information other than the watching direction calculated from the face direction.

Figure 20:
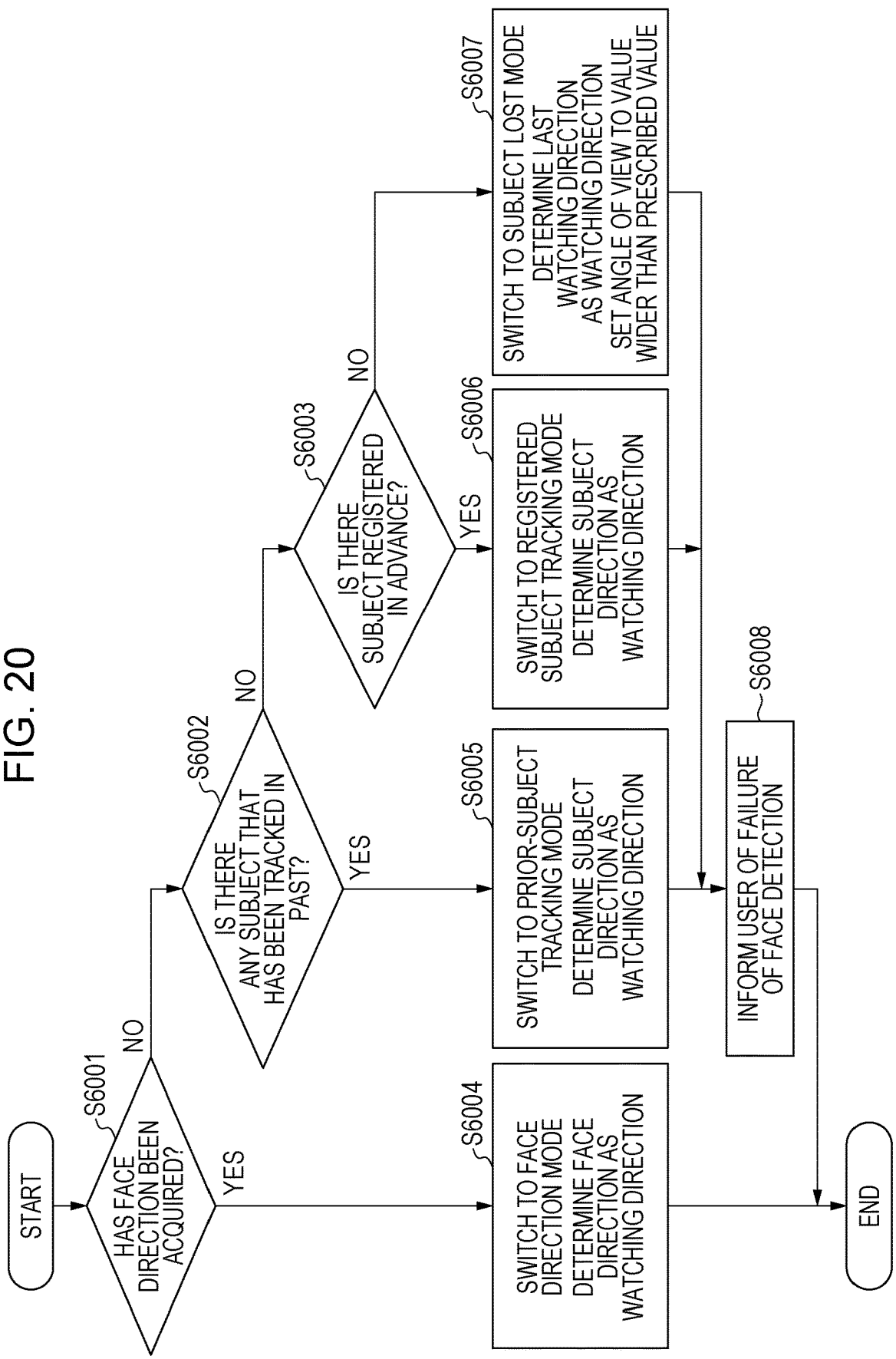
FIG. 20 is a flowchart of a watching direction determining process according to a second embodiment.

FIG. 20 is a flowchart of the watching direction determining process according to the present embodiment, which is executed by the overall control CPU 101. Hereinafter, the process will be described with reference to FIG. 21A and FIG. 21B.

In step S6001, it is determined whether the face direction is acquired in the face direction detection section 20. When the face direction is acquired, the process proceeds to step S6004, the overall control CPU 101 (mode shifting unit) switches the mode of the process to a face direction mode (first shooting mode) and determines the watching direction calculated from the face direction with the method described in the first embodiment as the recording direction. After that, the subroutine is exited.

On the other hand, when the face direction is not able to be acquired (NO in step S6001), the overall control CPU 101 (mode shifting unit) proceeds with the process to step S6002 to shift into another mode and determines whether there is a subject that has been tracked in the past.

Here, the determining process of step S6002 will be described with reference to FIG. 21A that shows the relationship between a detected status of the watching direction of the user for each frame and a shot picture.

In FIG. 21A, n is a frame number of a picture, θ is a moving angle in the horizontal direction of the face of the user, and a user status represents a positional relationship between the user and a watching object in each frame. An overall picture represents a super-wide angle picture shot by the shooting section 40 in each frame, and a shot picture represents an image secondarily recorded in each frame.

In FIG. 21A, as shown in each screen of the user status, the user is watching an object represented by "open square mark" in the lower side of the screen as a watching object and is not able to detect the watching object of the user at the fifth frame, that is, n=5.

In the present embodiment, with reference to the current frame, a period of past four frames before the current frame is set as a predetermined period of time. When a subject that can be determined as the same subject three or more times is included in the shot picture in the predetermined period of time, it is determined that there is a subject that has been tracked in the past.

As shown in FIG. 21A, where n=1 to 4, although the moving angle θ changes by +10°, an object represented by "open square mark" that can be determined as the same subject is included in the shot picture. Therefore, when n=5, it is determined that there is a subject that has been tracked in the past.

The determination criterion of step S6002 may be changed according to the detection period of the face direction or the accuracy of the face direction detection section 20.

Referring back to FIG. 20, when it is determined that there is a subject (same subject) that has been tracked within the past predetermined period of time (YES in step S6002), the process proceeds to step S6005.

In step S6005, the mode of the process is switched to a prior-subject tracking mode (second shooting mode) in which a prior-subject direction is set for the recording direction, the recording direction is determined so as to track the subject, and then the process proceeds to step S6008. In this way, in the present embodiment, even when the face direction is not able to be detected, but when there is a subject that has been tracked in the past, the mode is shifted to the prior-subject tracking mode, and the recording direction is determined, so user's intention immediately before is able to be reflected in a picture. A technique for recognizing a subject in a shot picture and a subject tracking detection technique performed by the overall control CPU 101 (subject recognition unit) are known, so the detailed description is omitted.

On the other hand, when it is determined that there is no subject that has been tracked in the past (No in step S6002), the process proceeds to step S6003.

In step S6003, it is determined whether a subject registered in the internal nonvolatile memory (subject registration unit) in advance has been detected from a latest shot picture.

In the present embodiment, prior-registration of a subject is performed in a manner such that, from among images saved in the display apparatus 800, the user designates an image containing a human figure that the user wants to shoot, and the display apparatus control section 801 recognizes the features of the selected human figure and sends the features of the human figure to the overall control CPU 101 in the camera body 1. A subject to be detected in step S6003 is not limited thereto, and may be, for example, a subject included in a shot picture acquired at a readout completion timing or another detection timing. Whether the subject registered in advance coincides with a subject in the latest shot picture is determined by a pattern matching technique. Since the pattern matching technique is known, the detailed description is omitted.

When it is determined that the subject registered in advance has been detected from the latest shot picture (YES in step S6003), the process proceeds to step S6006.

In step S6006, the mode of the process is switched to a registered subject tracking mode (third shooting mode) in which the direction of the subject detected in step S6003 is set as the recording direction, and the process proceeds to step S6008.

When it is determined that the subject registered in advance has not been detected from the latest shot picture (NO in step S6003), it is determined that a watching object is not able to be estimated, and the process proceeds to step S6007.

In step S6007, the overall control CPU 101 (angle-of-view changing unit) changes the mode of the process to a subject lost mode (fourth shooting mode) in which the recording direction before detection of the face direction fails is maintained, while the shooting angle of view is changed to a wider angle as compared to the last angle of view. After that, the process proceeds to step S6008. The recording direction in the subject lost mode may be configured to continue to move by the amount of change in the watching direction before detection of the face direction fails.

Here, the case where the process proceeds to step S6007 in which the subject lost mode is set will be described with reference to FIG. 21B.

In FIG. 21B, the case where the watching object of the user is not able to be detected at the fifth frame, that is, n=5, will be described as an example.

In the example of FIG. 21B, a major subject has not been found in the period of n=1 to 4, and a prior-registered subject is also not found in the shot picture at n=5. Therefore, the watching direction for n=5 is obtained by applying inertia in the right-hand direction to an overall picture, which is the moving direction during the period of n=1 to 4. An angle of view to be clipped from the overall picture is changed to a wide angle.

In step S6008, when the recording direction is determined from among directions other than the face direction in any one of step S6005 to step S6007, the overall control CPU 101 (notification unit) provides the user with an error message (detection error message) indicating that detection of the face direction fails. After that, the subroutine is exited. In the present embodiment, the vibrator 106 of FIG. 5 is used to warn the user. The notification method in step S6008 is not limited to the method of the present embodiment. Another notification method, such as warning with the LED 17 and indication with a terminal, such as the display apparatus 800, that cooperates with the camera body 1, may be used.

As described above, in the present embodiment, when the face direction has not been detected, the recording direction and the angle of view are changed according to a situation, so it is possible to avoid missing of shooting a picture with an intended field of view that the user originally wants to shoot.

In other words, in the present embodiment, when the face direction has not been detected and a subject that has been tracked in the past or a subject registered in advance has been detected, the subject is tracked. On the other hand, when such a subject has not been detected, missing of shooting is reduced and re-detection of a subject is easy, so the angle of view is changed to a wider angle than a prescribed angle of view.

With this configuration, it is possible to reduce shooting of a picture not intended by the user because detection of the face direction fails.

The processes of step S6001 to step S6008 are executed every frame, and, after the transition into each mode, the mode is able to be shifted in accordance with mode determination information, such as whether the face direction is acquired from the face direction detection section 20. For example, as the result that the angle of view is made wider than that in the subject lost mode in the present embodiment, when a prior-registered subject has been detected, the mode shifts to the registered subject tracking mode in which the face direction of the detected subject is set as the watching direction. In this case, the widened angle of view is returned to the prescribed angle of view.

The mode is changed through determination once in the present embodiment. Alternatively, the mode may be shifted in accordance with multiple results according to a frame rate and an ability to detect the face direction.

Third Embodiment

In a third embodiment, a method of determining a watching direction in accordance with the accuracy (reliability) of face direction detection will be described with reference to FIG. 22A to FIG. 25.

Basically, the present embodiment describes a modification from the first embodiment. Therefore, like reference signs denote the same components in the configuration of the camera system of the third embodiment as those of the camera system of the first embodiment, the overlap description is omitted, and different components will be described in detail as needed.

In the second embodiment, shooting in the recording direction not intended by the user is reduced by switching the mode of determining the watching direction according to whether the face direction has been detected. On the other hand, when the face direction of the user is not able to be stably detected as in the case of Japanese Patent Laid-Open Publication No. 2014-181949, shooting can be performed with an angle of view not intended by the user. Here, examples of the case where the face direction is not able to be constantly stably detected include the case where the shooting and detection section 10 of the camera body 1 is worn at the front of the clavicles as shown in FIG. 1B and the case where the detection accuracy of the face direction drops due to the influence of a collar, hair, or the like.

Figure 22A:
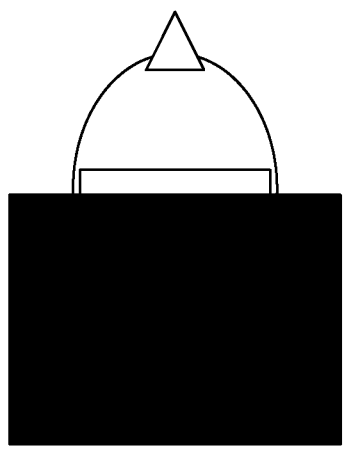
FIG. 22A to FIG. 22C are views for illustrating the relationship between a watching direction and a face region available for use in detecting a face direction.
Figure 22B:
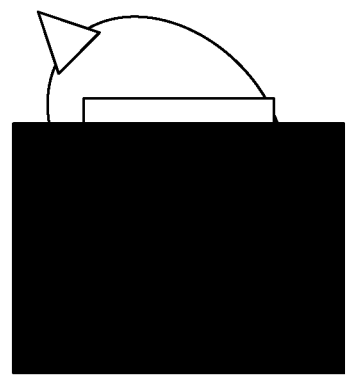
Figure 22C:
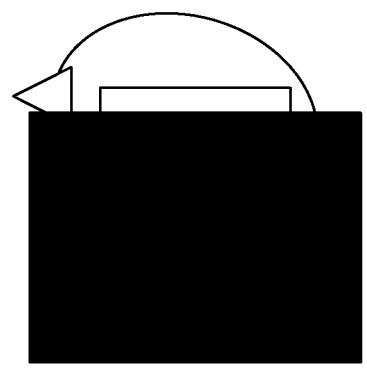

As shown in FIG. 22A to FIG. 22C, a region where the chin or the cheek is hidden by the body or the shoulder increases when the user is facing to the right (FIG. 22B and FIG. 22C) as compared to when the user is facing forward (FIG. 22A). In other words, the camera body 1 has characteristics such that there is a high possibility that a face region that is able to be used to detect the face direction narrows and the detection accuracy drops depending on the face direction. The characteristics significantly depend on the mounting position of the camera body 1 worn by the user.

Therefore, in the present embodiment, the detection accuracy (reliability) of the face direction is calculated in accordance with the mounting position of the camera body 1 and the detection result of the face direction, the face direction is reflected in the watching direction at a higher rate when the reliability is high, and the other information is reflected in the watching direction at a higher rate when the reliability is low. With this configuration, it is possible to shoot in accordance with user's intention.

Figure 23:
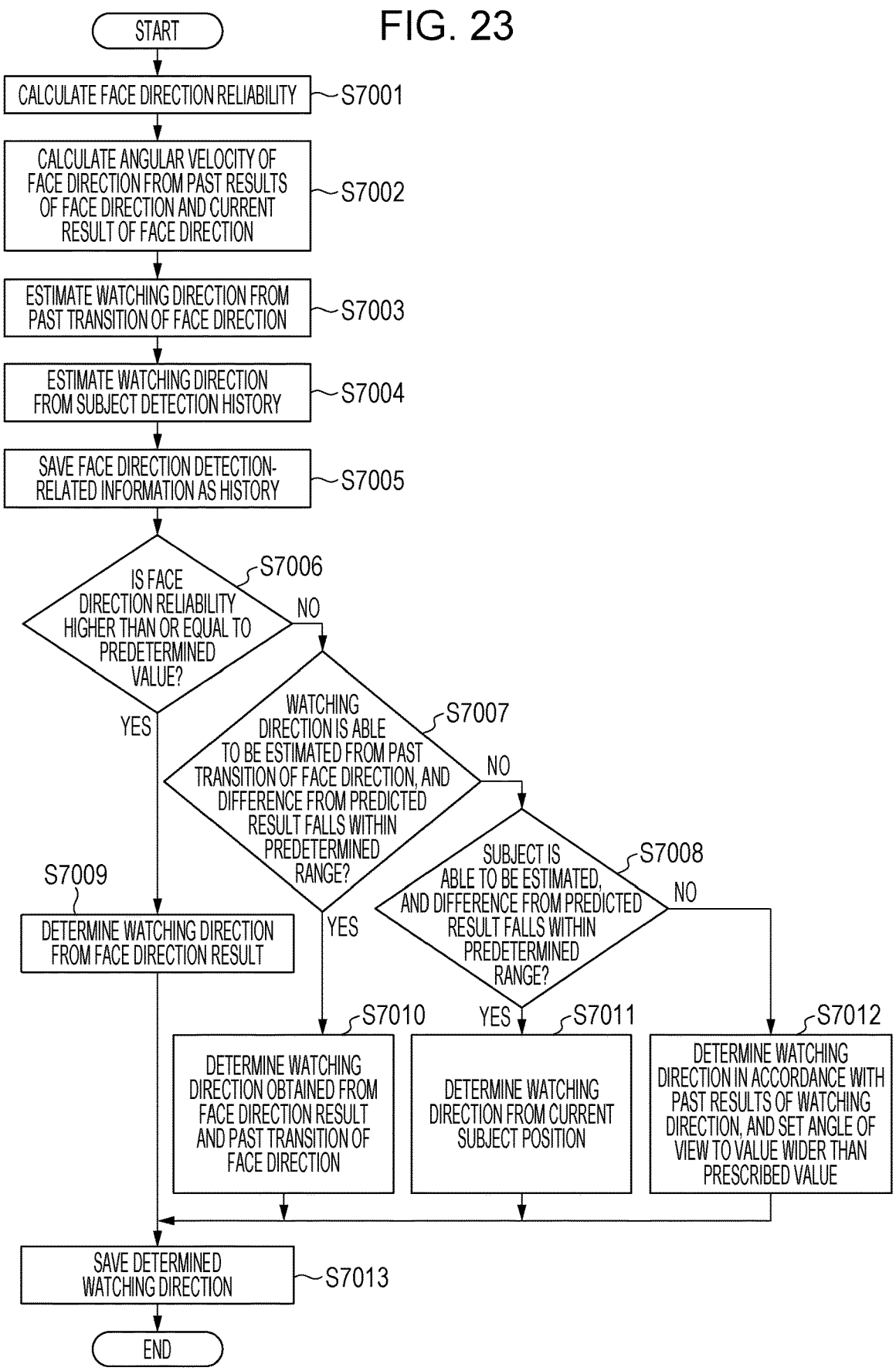
FIG. 23 is a flowchart of a watching direction determining process at the time of acquiring a face direction according to a third embodiment, instead of a process of step S6004 of FIG. 20.

FIG. 23 is a flowchart of the watching direction determining process in acquiring the face direction according to the present embodiment, instead of the process of step S6004 of FIG. 20. The process is executed by the overall control CPU 101 (watching direction determining unit).

In step S7001, the overall control CPU 101 calculates a face direction reliability $T_n$ in accordance with a face direction $\theta_n$ (first watching direction) acquired at the time of shooting at the n-th frame in the face direction detection section 20.

The face direction reliability $T_n$ is calculated as follows.

The face direction $\theta_n$ is divided into three components, that is, face directions $\theta_{yaw}$, $\theta_{pitch}$, $\theta_{roll}$. Here, the face direction $\theta_{yaw}$ indicates a rotational component that the face is moved right and left, the face direction $\theta_{pitch}$ indicates a rotational component that the face is moved up and down, and the face direction era indicates a rotational component that the neck is moved to incline.

In the present embodiment, on the assumption that the camera body 1 mounted at the clavicles of the user and the face direction is detected from the lower side of the face, $T_n (0 \le T_n \le 1)$ is obtained from the following expression 701.

$$T_n = \frac{1}{1 + |\tan(2 \times \theta_{yaw})| \times |\tan(2 \times \theta_{pitch})| \times |\tan(2 \times \theta_{roll})|} \quad (701)$$

Figure 24:
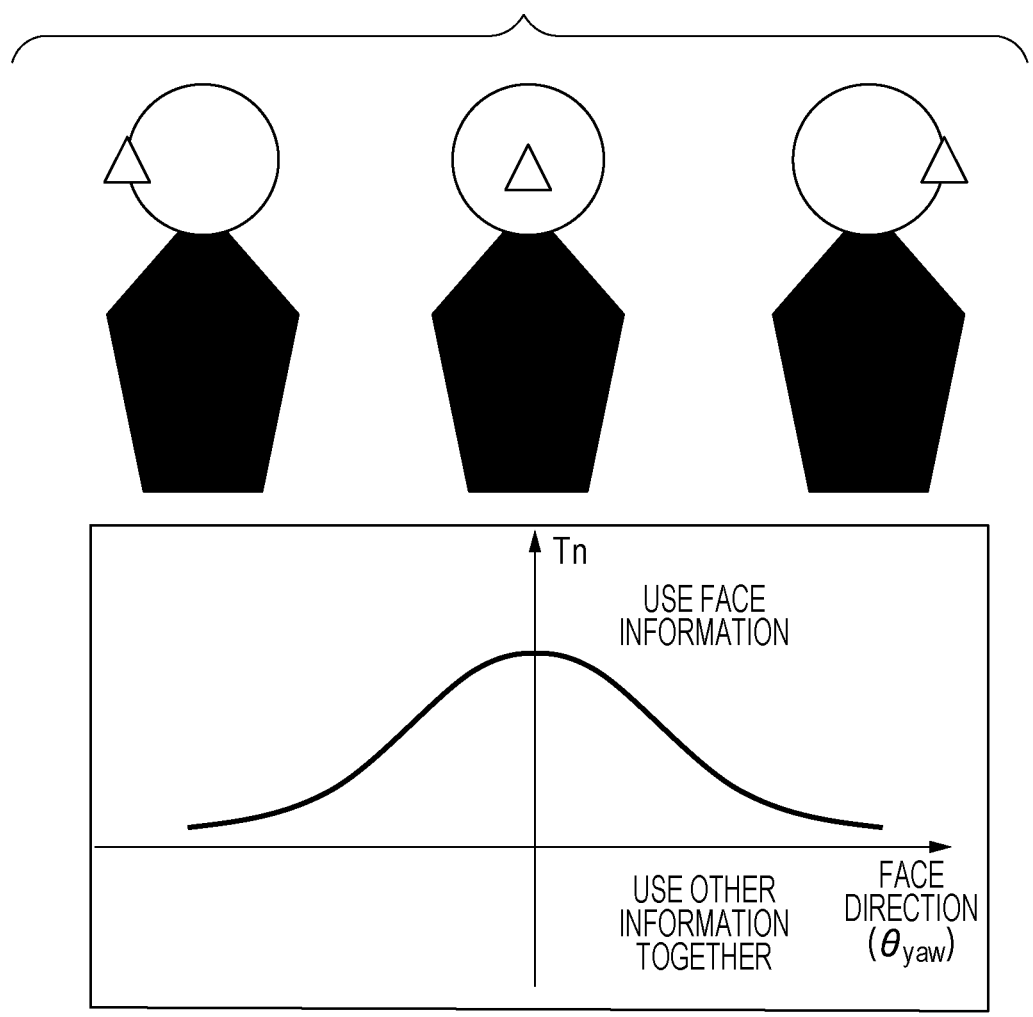
FIG. 24 is a view showing the relationship between a face direction and a face direction reliability in the third embodiment.

FIG. 24 shows a change in the face direction $\theta_{yaw}$ and the value of the face direction reliability $T_n$, and shows that, as a change in the face direction $\theta_{yaw}$ from the front increases, the face direction reliability $T_n$ decreases.

In the present embodiment, the face direction reliability $T_n$ is calculated by using the expression 701. Alternatively, face direction reliabilities calculated in the past may be assigned with weights according to the detection accuracy of the face direction by the face direction detection section 20, the frame rate of the detection, or the like, and the weighted average of the face direction reliabilities may be used. At the time of calculation of $T_n$, the accuracy of pattern matching, mounting position, and the like may be assigned with weights.

In the present embodiment, the reliability of prediction of a subject region is calculated by using a determination coefficient obtained from the expression 701. However, a method of calculating a determination coefficient is not limited thereto. When the face direction is detected by using machine learning, the relevance factor may be reflected in a determination coefficient.

In step S7002, the overall control CPU 101 obtains the angular velocity $$\overline{\omega_n}$$

of the face direction. Specifically, the angular velocity $$\overline{\omega_n}$$

is obtained from the face direction $\theta_n$ and face direction acquisition time $t_n$, acquired at the time of shooting in the n-th frame from the face direction detection section 20, and the face direction information $\theta_{n-1}$ and its acquisition time $t_{n-1}$ one frame before, saved in the primary memory 103 by the following expression 702.

$$\overrightarrow{\omega_n} = \frac{\theta_n - \theta_{n-1}}{t_n - t_{n-1}} \quad (702)$$

In the present embodiment, the angular velocity $$\overline{\omega_n}$$

is calculated by using information in the current frame and the frame one frame before. Alternatively, the angular velocity may be obtained by using one or more pieces of past information according to a frame rate or the like.

In step S7003, the overall control CPU 101 (watching direction prediction unit) predicts the current face direction from the transition of the past face direction, saved in the primary memory 103. In the present embodiment, where, with reference to the current frame, a period of past four frames before the current frame is set as a predetermined period of time, when the face direction continues to be displaced in a certain direction that can be determined as the same direction three or more times during the four frames, it is determined that the watching direction is able to be predicted from the past face direction and angular velocity. When this prediction is performed, a predicted angular velocity $$\overline{\omega_{ave}}$$

that is the weighted average of angular velocities obtained from the past four frames is calculated by the following expression 703, and a predicted face direction cave (second watching direction) is calculated by the following expression 704. Computations of the expressions 703 and 704 respectively correspond to the processes shown in (a1) and (a2) in FIG. 25.

The length of the predetermined period of time and how to apply the weighted average, used in step S7003, may be changed in accordance with the frame rate and the detection accuracy of the face direction detection section 20.

$$\vec{\omega}_{ave} = \frac{\sum_{t=1}^{3} \vec{\omega}_{n-t}}{3} \quad (703)$$

$$\theta_{ave} = \theta_{n-1} + (t_n - t_{n-1})\vec{\omega}_{ave} \quad (704)$$

In step S7004, the overall control CPU 101 predicts the watching direction by using, of pieces of information saved in the primary memory 103, internal information other than information from the face direction detection section 20.

Specifically, in the present embodiment, it is determined whether a subject is currently being tracked in accordance with a subject detection history. When it is determined that the subject is being tracked, a predicted watching direction $\theta_{sub}$ (second watching direction) is calculated in accordance with the movement of the subject. In the present embodiment, where, with reference to the current frame, a period of past four frames before the current frame is set as a predetermined period of time, when the subject (the same subject) that can be determined as the same subject three or more times from among the four-frame shot pictures has been detected, it is determined that the subject is being tracked. In subject tracking determination, the determination criterion may be changed in accordance with the detection period and detection accuracy by the overall control CPU 101. Since the subject tracking detection technique is known, the detailed description is omitted.

In the present embodiment, internal information used to predict the watching direction in step S7004 is present in the subject detection history; however, the configuration is not limited thereto. For example, the watching direction may be predicted by using the face information of the user reflected in the shooting section 40 or information on the movement and posture of the camera body 1, detected by the angular velocity sensor 107 and the acceleration sensor 108, according to the mounting position and performance of the camera body 1. As in the case of step S6006 of the second embodiment, when there is a prior-registered subject, the overall control CPU 101 (third watching direction prediction unit) may obtain the face direction of the prior-registered subject in the latest shot picture as a predicted watching direction $\theta_{sub}$.

In step S7005, the overall control CPU 101 saves the face direction detection-related information in the primary memory 103 as a history. Here, the face direction detection-related information is made up of the angular velocity $$\overline{\omega_n}$$

of the face direction, generated in step S7002, the face direction reliability $T_n$ calculated in step S7001, the face direction $\theta_n$ detected by the face direction detection section 20, face direction acquisition time $t_n$, and information indicating the time points at which these pieces of information are generated.

In step S7006, the overall control CPU 101 determines that the reliability of the face direction is high when the face direction reliability $T_n$ calculated in step S7001 is higher than or equal to a predetermined value, and the process proceeds to step S7009.

In step S7009, the overall control CPU 101 determines the face direction as the current watching direction $\theta'_n$, and the process proceeds to step S7013.

On the other hand, when the face direction reliability $T_n$ calculated in step S7001 is lower than the predetermined value (NO in step S7006), the process proceeds to step S7007.

In step S7007, when a condition that the predicted face direction $\theta_{ave}$ has been estimated in step S7003 and $|\theta_n - \theta_{ave}|$ falls within a predetermined angle is satisfied, the process proceeds to step S7010. In the present embodiment, determination is performed by setting the predetermined angle to π/8.

In step S7010, the overall control CPU 101 determines the current watching direction $\theta'_n$ by using $\theta_n$, $\theta_{ave}$, and the face direction reliability $T_n$. In the present embodiment, the current watching direction $\theta'_n$ is obtained from the following expression 705, and the process proceeds to step S7013. A computation of the expression 705 corresponds to the process shown in FIG. 25B. As shown in FIG. 24, the face direction reliability $T_n$ increases as the absolute value of the angle of the face direction $\theta_{yaw}$ reduces, so the face direction $\theta_n$ is reflected at a higher rate in the current watching direction $\theta'_n$ as expressed by the expression 705. On the other hand, the face direction reliability $T_n$ decreases as the absolute value of the angle of the face direction $\theta_{yaw}$ increases, so information (predicted face direction $\theta_{ave}$) other than the face direction $\theta_{yaw}$ is reflected at a higher rate in the current watching direction $\theta'_n$ as expressed by the expression 705.

$$\theta'_n = T_n \times \theta_n + (1 - T_n) \times \theta_{ave} \quad (705)$$

When the above-described condition is not satisfied in step S7007, the process proceeds to step S7008, and when the condition that the predicted watching direction $\theta_{sub}$ has been estimated and $|\theta_n - \theta_{sub}|$ falls within the predetermined angle is satisfied, the process proceeds to step S7011. As in the case of step S7010, determination is performed by setting the predetermined angle to λ/8 in the present embodiment.

In step S7011, the overall control CPU 101 (second watching direction prediction unit) determines the current watching direction $\theta'_n$ by using the face direction $\theta_n$, the predicted watching direction $\theta_{sub}$, and the face direction reliability $T_n$. In the present embodiment, the current watching direction $\theta'_n$ is obtained from the following expression 706, and the process proceeds to step S7013. As in the case of step S7010, the face direction reliability $T_n$ increases as the absolute value of the angle of the face direction $\theta_{yaw}$ reduces, so the face direction $\theta_n$ is reflected at a higher rate in the current watching direction $\theta'_n$ as expressed by the expression 706. On the other hand, the face direction reliability $T_n$ decreases as the absolute value of the angle of the face direction $\theta_{yaw}$ increases, so information (predicted watching direction $\theta_{sub}$) other than the face direction $\theta_{yaw}$ is reflected at a higher rate in the current watching direction $\theta'_n$ as expressed by the expression 706.

$$\theta'_n = T_b \times \theta_n + (1 - T_n) \times \theta_{sub} \quad (706)$$

When the above-described condition is not satisfied in step S7008, it is determined that the reliable watching direction is not able to be acquired currently, and the process proceeds to step S7012.

In step S7012, the current watching direction $\theta'_n$ is determined as the watching direction moved from the last watching direction $\theta'_{n-1}$ by imparting inertia in accordance with the displacement of the past watching direction, the angle of view is set so as to be wider than a prescribed value, and the process proceeds to step S7013. With this configuration, the possibility that the user misses shooting an intended subject is reduced.

In the current embodiment, a method of calculating the current watching direction $\theta'_n$ is switched in accordance with the face direction reliability $T_n$ and the detected status of a subject; however, the configuration is not limited thereto. For example, when the predicted face direction $\theta_{ave}$ and the predicted watching direction $\theta_{sub}$ are calculated, the reliabilities (predicted direction reliabilities) may also be calculated, and the calculated watching direction $\theta'_n$ may be corrected in accordance with those calculated reliabilities.

When the calculated reliabilities are lower than or equal to the predetermined value, it is conceivable that the user is likely to miss shooting an intended subject, so the angle of view can be set so as to be wider than a prescribed angle of view. In this case, the process may proceed to step S7012.

After that, when any one of the calculated reliabilities is higher than the predetermined value, the angle of view can be returned to the prescribed angle of view.

Through the process of FIG. 23, when the face direction reliability $T_n$ is high, the face direction $\theta_n$ is determined as the current watching direction $\theta'_n$. On the other hand, when the face direction reliability $T_n$ is low, the current watching direction $\theta'_n$ (recording direction) is determined by using information at the time point at which the face direction reliability $T_n$ is high or information other than the face direction, depending on a situation, and, in addition, the angle of view is widened depending on a situation.

In other words, in the present embodiment, when the face direction reliability $T_n$ is low and the accuracy of detecting the face direction is estimated to be low, shooting of a picture not intended by the user due to failure of detection of the face direction is reduced by using the predicted face direction $\theta_{ave}$ and the predicted watching direction $\theta_{sub}$.

Fourth Embodiment

In a fourth embodiment, a modification of the camera system that includes the camera body 1 will be described with reference to FIG. 26A and FIG. 26B.

Basically, the present embodiment describes a modification from the first embodiment. Therefore, like reference signs denote the same components in the configuration of the camera system of the fourth embodiment as those of the camera system of the first embodiment, the overlap description is omitted, and different components will be described in detail as needed.

In the first embodiment, a general smartphone is used as the display apparatus 800. There is a plurality of smartphone makers in the market, and the smartphones have a variety of computing power. For example, in the first embodiment, when a picture in the recording direction, clipped from a super-wide angle image, is transferred to the display apparatus 800, information to be used in the optical correction process and the image stabilization process is attached to the picture. The display apparatus 800 performs distortion aberration correction and image stabilization correction in accordance with the information; however, the computing power of the smartphone that the user uses as the display apparatus 800 may be too low to perform these corrections.

Therefore, the camera system of the present embodiment includes a camera body 1' serving as an image capture apparatus, and a display apparatus 9800 lower in computing power than the display apparatus 800.

In the camera body 1', when the processes up to the primary recording process for a picture (step S100 to step S600 in FIG. 7A) complete, the transfer process to the display apparatus 9800 is not executed, and the processes of step S800 and step S900 are executed. After that, in the camera body 1', the process of transferring the picture, on which the processes of step S800 and step S900 have been completed, to the display apparatus 9800 is executed.

On the other hand, in the display apparatus 9800, the picture from the camera body 1' is not subjected to the processes of step S800 and step S900, and is directly secondarily recorded.

Hereinafter, the camera system of the present embodiment will be specifically described.

FIG. 26A is a block diagram showing the hardware configuration of the display apparatus 9800 to be connected to the camera body 1' serving as the image capture apparatus according to the present embodiment.

In FIG. 26A, like reference signs denote the same components to those of the hardware configuration of the display apparatus 800 according to the first embodiment shown in FIG. 6, and the overlap description is omitted.

The display apparatus 9800 differs from the display apparatus 800 in that a display apparatus control section 9801 is provided instead of the display apparatus control section 801 and no face sensor 806 is provided.

The display apparatus control section 9801 is made up of a CPU lower in computing power than the CPU that makes up the display apparatus control section 801 (FIG. 6). The capabilities of the internal nonvolatile memory 812 and the primary memory 813 may be lower than those of the first embodiment.

Figure 26B:
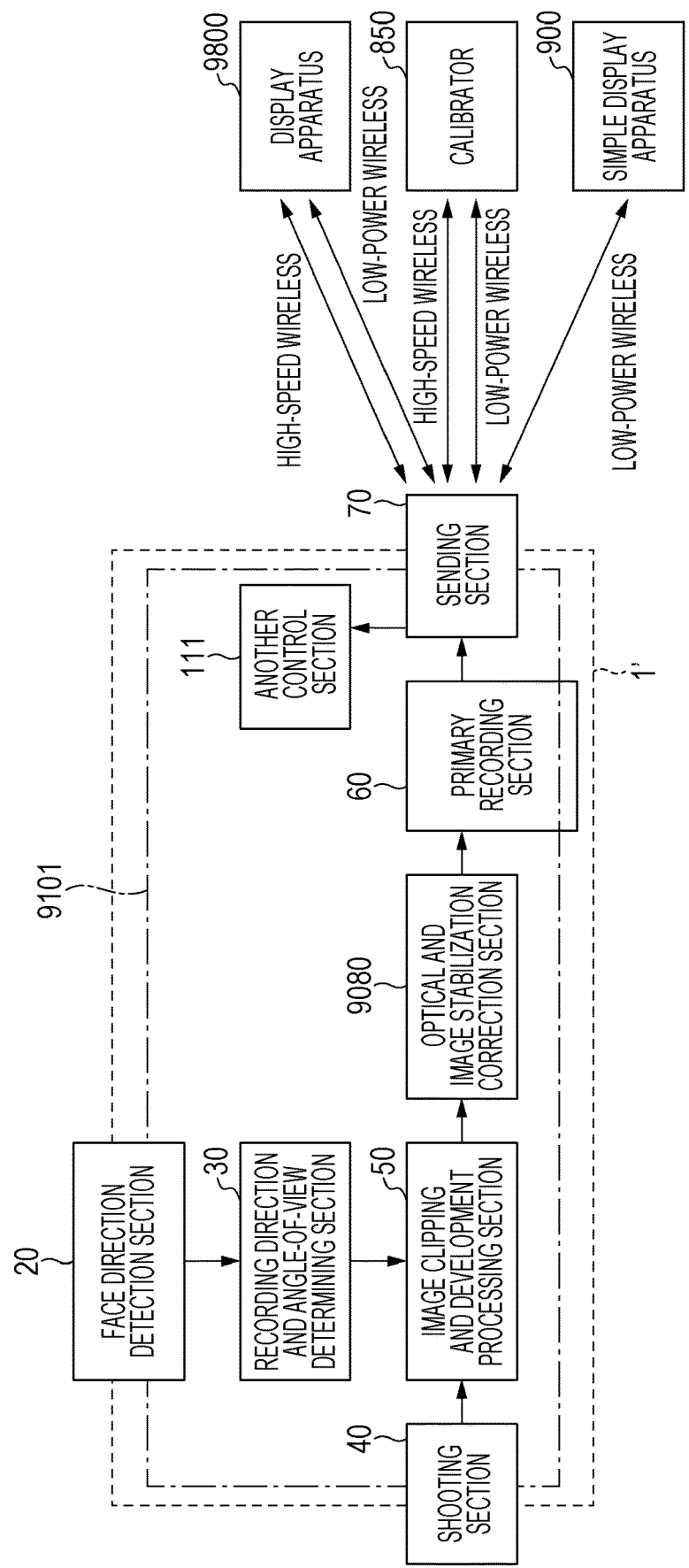
FIG. 26B is a functional block diagram of the camera body according to the fourth embodiment.

FIG. 26B is a functional block diagram of the camera body 1'.

In FIG. 26B, like reference signs denote the same components to those of the functional blocks of the camera body 1 according to the first embodiment shown in FIG. 4, and the overlap description is omitted.

The functional blocks shown in FIG. 26B differ from those of FIG. 4 in that an optical and image stabilization correction section 9080 that executes the optical correction process and the image stabilization process is provided and the functional blocks are implemented not by the overall control CPU 101 but by an overall control CPU 9101. The functional blocks shown in FIG. 26B differ from those of FIG. 4 in that one of predetermined devices with which the sending section 70 communicates is not the display apparatus 800 but the display apparatus 9800.

In other words, in the present embodiment, the optical and image stabilization correction section 9080 of the overall control CPU 9101 performs optical distortion correction and image stabilization correction by using an optical correction value and gyroscope data. Therefore, in comparison with the picture file 1000 that the sending section 70 transfers to the display apparatus 800 in the first embodiment, a picture file after optical distortion correction and image stabilization correction, which the sending section 70 transfers to the display apparatus 9800 in the present embodiment, is reduced in data amount.

The display apparatus 9800 does not execute the processes of step S800 and step S900, so the computing power is able to be lowered as compared to the display apparatus 800. The simple display apparatus 900 (watching section) made up of a smart watch or the like also allows to view a picture shot by the camera body 1'.

Fifth Embodiment

A fifth embodiment describes an embodiment related to a control method for the face direction detection section 20 of FIG. 5 in the first embodiment to accurately detect the face direction even in a situation in which a cameraman is under strong sunlight or in a situation in which there is a movement of the cameraman. More specifically, a control method for exposure of an infrared detection camera (first image capture unit) of the infrared detection processing device 27 and the light amount of the infrared LED 22 (irradiation unit) of the infrared LED turn-on circuit 21 in the face direction detection section 20 will be described. The description will be made on the assumption that the infrared detection camera of the infrared detection processing device 27 in the present embodiment is equipped with a monochrome sensor.

Figure 27A:
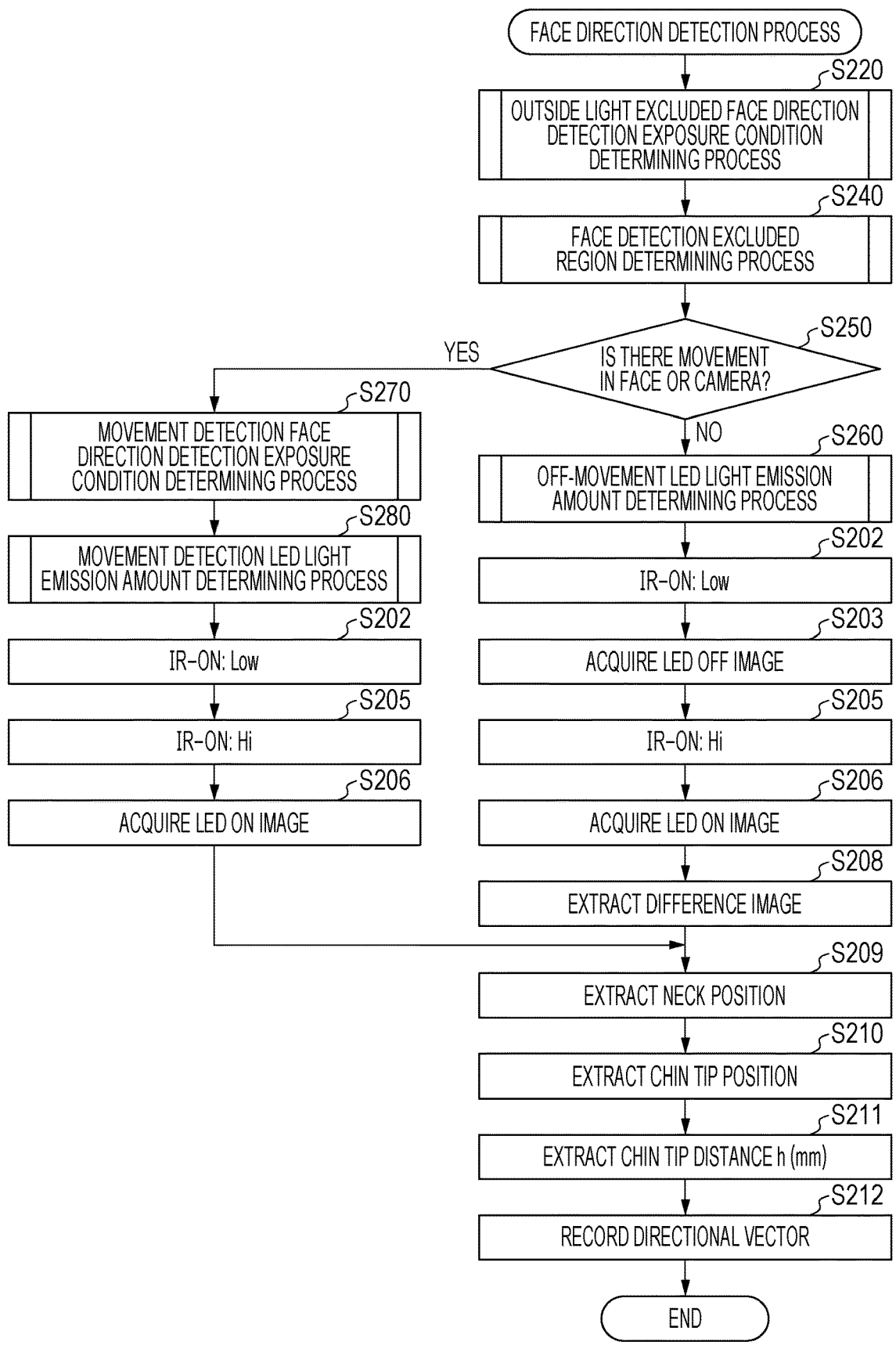
FIG. 27A is a flowchart of a subroutine of a face direction detection process of step S200 of FIG. 7A according to a fifth embodiment.

FIG. 27A is a flowchart of the subroutine of the face direction detection process of step S200 of FIG. 7A according to the fifth embodiment.

The process, as will be described later, includes an exposure control process of the infrared detection camera in the infrared detection processing device 27 and a light amount control process of the infrared LED 22 in the infrared LED turn-on circuit 21.

Step S202 to step S212 in FIG. 27A are the same step numbers to those of FIG. 7C of the first embodiment and are similar processes, so the detailed description is omitted. There are steps with different process details described although the step numbers are the same between FIG. 7C and FIG. 27A (for example, step S203, step S206, step S208, and the like); however, the process details are similar.

In FIG. 27A, the outside light excluded face direction detection exposure condition determining process for determining the exposure condition of the infrared detection camera capable of excluding the influence of outside light is executed in step S220, and then the process proceeds to step S240.

In step S240, the face direction detection section 20 (excluded region determining unit) executes the face detection excluded region determining process for determining a face detection excluded region from the region determined such that the outside light component is strong, for the LED OFF image shot under the exposure condition determined in step S220. After that, the process proceeds to step S250.

In step S250, it is determined whether there is a movement in the face or the camera body 1. When it is determined that there is no movement (NO in step S250, when no movement is detected), the process proceeds to step S260. On the other hand, when it is determined in step S250 that there is a movement in the face or the camera body 1 (YES in step S250, when a movement is detected), the process proceeds to step S270.

In step S260, an off-movement LED light emission amount determining process is executed. After that, the face direction detection section 20 (second image acquiring unit, third image acquiring unit, status detection unit, and direction detection unit) executes step S202 to step S212 as in the case of the face direction detection process in the first embodiment, and ends the process.

In step S270, a movement detection face direction detection exposure condition determining process for determining the exposure condition of the infrared detection camera at the time of detecting the face direction for movement detection is executed, and then the process proceeds to step S280.

In step S280, a movement detection LED light emission amount determining process for determining an infrared LED light emission amount for movement detection is executed in accordance with the exposure amount of the infrared detection camera, determined in step S270, and then step S202, step S205, and step S206 are executed. In other words, when a movement is detected, shooting while the infrared LED 22 is off in step S202 to step S203 described in the first embodiment and generation of a difference image (dark current removal) in step S208 are not performed. In other words, when a movement is detected, the face direction detection section 20 (fourth image acquiring unit) executes the face direction detection process by using only the image (fourth image) shot in a state where the infrared LED 22 is on, acquired in step S205 to step S206. After that, as in the case of the face direction detection process in the first embodiment, step S209 to step S212 are executed, and the process is ended.

Figure 27B:
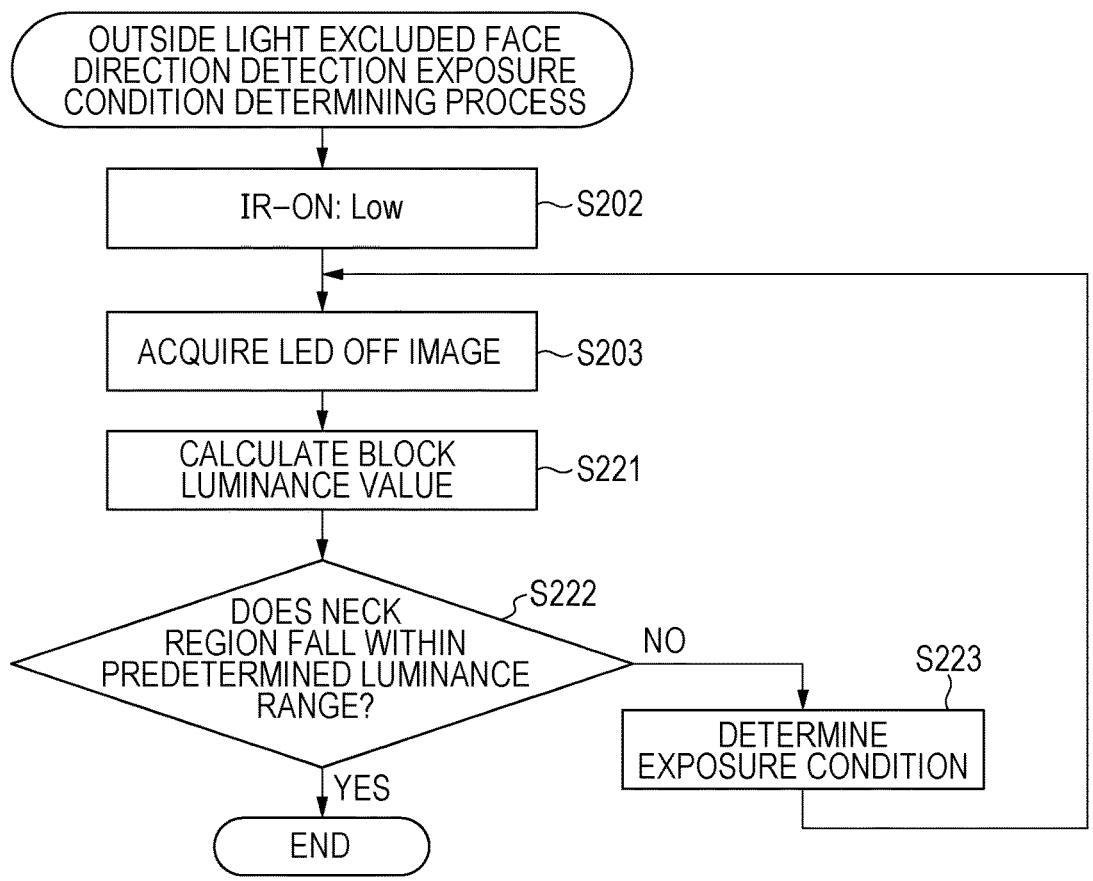
FIG. 27B is a flowchart of a subroutine of an outside light excluded face direction detection exposure condition determining process in step S220 of FIG. 27A.

FIG. 27B is a flowchart of the subroutine of the outside light excluded face direction detection exposure condition determining process in step S220 of FIG. 27A. Generally, an exposure condition in a camera is a combination of speed setting, exposure time, aperture value setting, and the like, and, in the present embodiment, the aperture is constant, and each exposure condition is set with a combination of speed setting and exposure time.

In FIG. 27B, the face direction detection section 20 (first image acquiring unit) executes step S202 to step S203, acquires an image shot in a state where the infrared LED 22 is off (LED OFF image, first image), and then the process proceeds to step S221. After the power switch 11 is turned on to turn on the power, shooting is performed for the first time without emission of the infrared LED 22 in step S202. Therefore, the exposure condition (first exposure condition) may be a predetermined exposure condition or may be the same exposure condition as the exposure condition in the shooting condition determined at the last shooting.

Other than the above-described techniques, auto exposure (AE) operation may be performed as a general exposure control method. AE operation is an operation in which, generally, a screen is divided into a plurality of block regions for an image output value and exposure control is performed in accordance with the average value of the output values of each block (block average value). For example, an average value obtained by adding up the output values of the blocks of the overall screen with equal weights may be calculated as a block average value, and averaging photometry for determining the exposure condition may be performed. Alternatively, a block average value may be calculated by the output values of blocks with weights while intensively placing weights on the output values in the center of the screen, and center-focused photometry for determining the exposure condition may be performed. Alternatively, spot photometry for determining the exposure condition may be performed such that a predetermined block region of an image has a predetermined value. Alternatively, a block average value may be calculated by intensively assigning weights to the output values of blocks of a region in which a subject is detected and adding up the output values with weights, and evaluation photometry for determining the exposure condition may be performed.

In step S221, block luminance values are calculated. Specifically, the LED OFF image acquired in step S203 is divided into a plurality of block regions, the average value of the output values of each block (block luminance value) is acquired, and then the process proceeds to step S222.

Figure 28A:
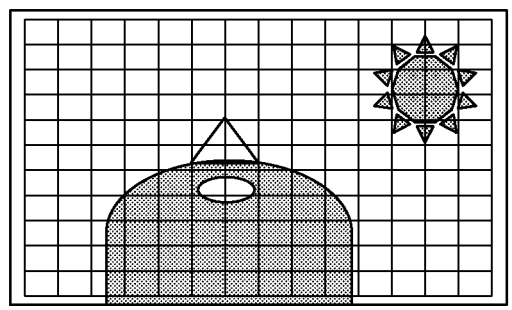
FIG. 28A is a view showing a state where region settings of blocks of which block luminance values are acquired in step S221 of FIG. 27B are assigned to an LED OFF image obtained by shooting a part under the chin of the face of a human figure under sunlight by the infrared detection camera.

FIG. 28A is a view showing a state where region settings of blocks of which block luminance values are acquired in step S221 of FIG. 27B are assigned to an LED OFF image obtained by shooting a part under the chin of the face of a human figure under sunlight by the infrared detection camera.

In step S222, it is determined whether the luminance value of the neck region falls within a predetermined range.

Figure 28B:
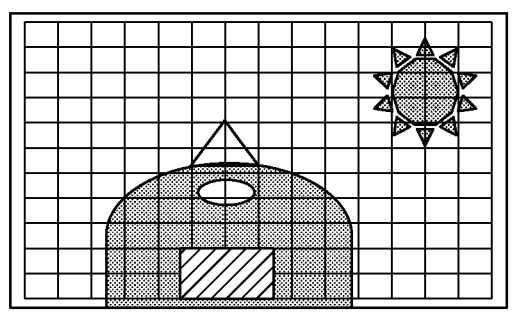
FIG. 28B is a view showing a case where a region indicated by diagonal lines among the blocks assigned in FIG. 28A is set as a neck region in advance.

FIG. 28B is a view showing a case where a region indicated by diagonal lines among the blocks assigned in FIG. 28A is set as the neck region in advance. When the neck region of a human body is set in advance, a part on the lower side of the center of the screen can be set as the neck region. When it is determined that the camera body 1 is moving severely according to the angular velocity sensor and the acceleration sensor, a dark region from near the part on the lower side of the center of the screen may be set as the neck region.

When the luminance value of the neck region falls within a predetermined luminance range (YES in step S222), the subroutine of FIG. 27B is exited. On the other hand, when the luminance value of the neck region does not fall within the predetermined luminance range (NO in step S222), the process proceeds to step S223, the exposure condition is determined such that the luminance value of the neck region falls within the predetermined luminance range, and an LED OFF image is acquired in step S203 again.

By using such a technique, the exposure condition is able to be determined such that the luminance value of the neck region falls within the predetermined luminance range (lower than a predetermined brightness value).

In the present embodiment, the infrared detection camera is attached to a position a certain distance apart from the bottom of the chin of the face. In an environment, such as the inside of a room, in which strong infrared light, such as sunlight, is not included, the irradiation amount of infrared light 23 from the infrared LED 22 and the exposure condition of the infrared detection camera are able to be properly determined in advance (irradiation amount determining process). Therefore, when shooting is performed under the preset exposure condition in a state where the infrared LED 22 is off and the luminance value of the neck region falls within the predetermined range (YES in step S222), the infrared LED light emission amount may be set under the exposure condition. On the other hand, when shooting is performed under the preset exposure condition in a state where the infrared LED 22 is off and the luminance value of the neck region becomes higher than or equal to the predetermined luminance due to, for example, strong incoming outside light (NO in step S222), the exposure condition is re-determined to an underexposure side in step S223.

FIG. 28C shows schematic diagrams of an LED OFF image and an infrared irradiated image (LED ON image) shot without appropriately setting the exposure condition according to the condition of outside light in an environment in which a large amount of infrared component is included in outside light, and a difference image between these images.

As shown in the difference image of FIG. 28C, when the exposure condition is not appropriately set according to the situation of outside light in an environment in which a large amount of infrared component is included in outside light, the overall luminance is dark, and it is difficult to extract a face detection region that is an infrared light irradiated part from the background. In other words, for the LED OFF image of FIG. 28C, infrared light from sunlight is reflected from surroundings and the ground and, as a result, infrared light is strongly applied to the neck region, so the neck region is shot brightly regardless of a situation in which the infrared LED 22 is not applying infrared light. However, in such a case, if the exposure condition is just re-determined to an underexposure side, the degree of influence of an infrared light component on the image resulting from irradiation of the infrared LED 22 decreases. In other words, when the infrared light component caused by outside light is large, a difference from an infrared light component caused by infrared light irradiation of the infrared LED 22 is small, so it is difficult to extract the face detection region that is the infrared light irradiated part by using the difference image only when the exposure condition is re-determined.

FIG. 28D shows schematic diagrams of an LED OFF image and an LED ON image shot under an exposure condition appropriately set according to the condition of outside light in the face direction detection process of FIG. 27A in an environment in which a large amount of infrared component is included in outside light, and a difference image between these images.

In other words, the LED OFF image shown in FIG. 28D is an image shot by the infrared detection camera after exposure control is performed in a state where the infrared LED 22 is not applied and the exposure condition is re-determined to an underexposure side. The LED ON image shown in FIG. 28D is an image shot by the infrared detection camera after the light emission amount of the infrared LED 22 is controlled to increase in accordance with the exposure condition.

As a result, the neck region in the LED OFF image of FIG. 28D is shot darkly as compared to the LED OFF image of FIG. 28C, while the neck region in the LED ON image of FIG. 28D is shot brightly as compared to the LED ON image of FIG. 28C. Therefore, as shown in the difference image of FIG. 28D, the face detection region that is the infrared light irradiated part is able to be extracted from the background.

An appropriate exposure condition in which the luminance value of the neck region falls within the predetermined luminance range in the present embodiment is that exposure is under by about two levels with respect to the exposure condition of a proper level in the case where an image is generally viewed under the same condition. When the exposure condition is changed to an underexposure side in step S223, an image obtained when infrared light of the infrared LED 22 is applied is dark, and the light emission amount of the infrared LED 22 is increased to apply brighter light to compensate therefor. In other words, electric power is consumed more than necessary, and it is not considered as appropriate exposure condition setting.

Figure 27C:
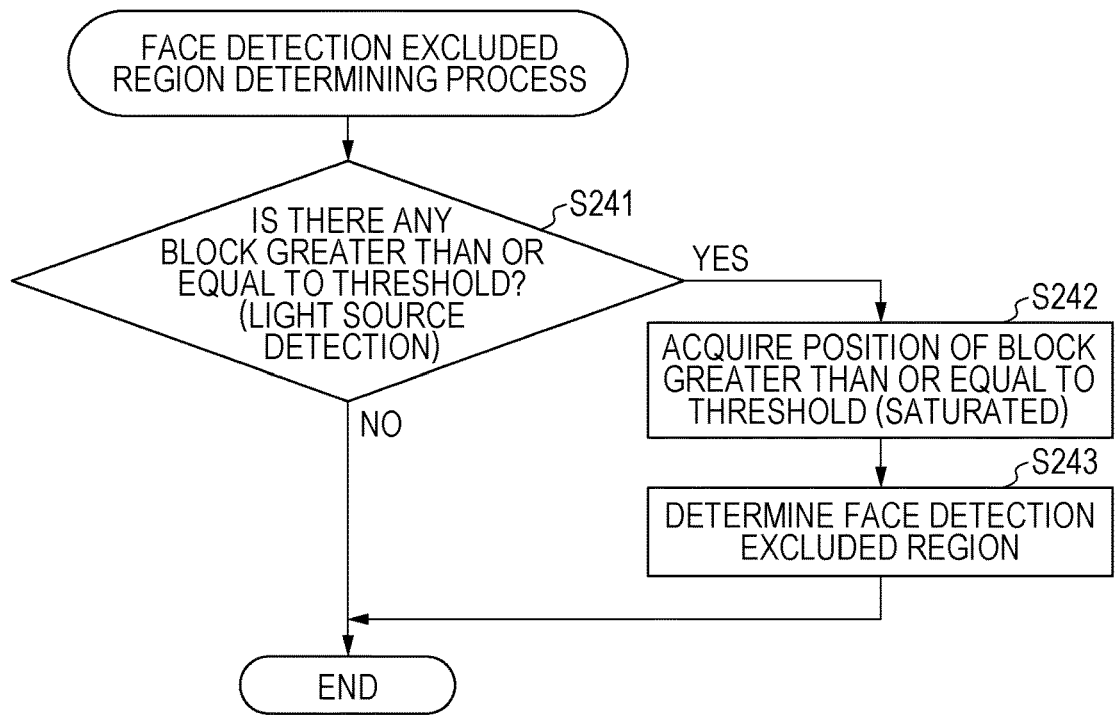
FIG. 27C is a flowchart of a subroutine of a face detection excluded region determining process in step S240 of FIG. 27A.

FIG. 27C is a flowchart of the subroutine of the face detection excluded region determining process in step S240 of FIG. 27A.

In FIG. 27C, in step S241, an LED OFF image is acquired under the exposure condition determined in step S220 of FIG. 27A, and the block luminance value of each block is calculated with a similar method to that of step S203 of FIG. 27B from the LED OFF image. When there is any block of which the calculated block luminance value is greater than or equal to a threshold, it is determined that the light source has been detected (YES in step S241), the process proceeds to step S242; otherwise (NO in step S241), the subroutine of FIG. 27C is directly exited.

In step S242, the position of the block having the block luminance value greater than or equal to the threshold is acquired, and the process proceeds to step S243.

In step S243, the region of the block at the position acquired in step S242 is determined as a face detection excluded region, and the subroutine of FIG. 27C is exited.

Figure 28E:
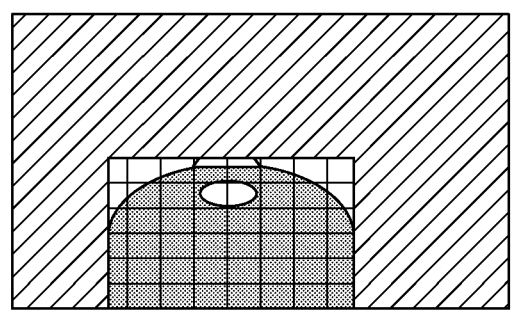
FIG. 28E is a schematic diagram of a case where the face direction detection excluded region determining process of FIG. 27C is executed on the LED OFF image of FIG. 28A.

FIG. 28E is a schematic diagram of a case where the face direction detection excluded region determining process of FIG. 27C is executed on the LED OFF image of FIG. 28A.

In FIG. 28E, a part with diagonal lines includes blocks of which the block luminance values are greater than or equal to the threshold, and the region of these blocks is determined as a region to be excluded from the face direction detection region in the face direction detection excluded region determining process of FIG. 27C.

In FIG. 27A, determination as to the movement of the camera body 1 in step S250 is able to be performed by using the acceleration sensor 108 or the angular velocity sensor 107 (shake detection unit) in FIG. 5. For determination as to the movement of the face in step S250, there is a technique for, for example, acquiring an image irradiated by the infrared LED 22 periodically by using the infrared detection processing device 27 and the infrared LED turn-on circuit 21 in FIG. 5 and performing the determination from the correlation among the images acquired in time-series.

The off-movement LED light emission amount determining process of step S260, which is executed when there is no movement in the face or the camera body 1 (NO in step S250), in FIG. 27A will be described.

Figure 30A:
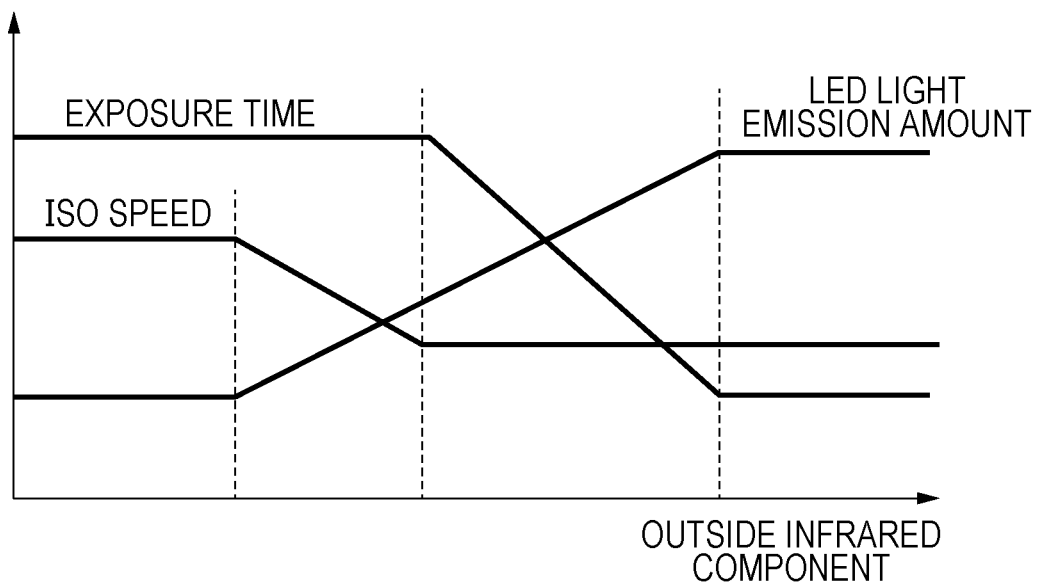
FIG. 30A is a graph of which the abscissa axis represents outside light infrared component and the ordinate axes respectively represent the ISO speed, exposure time, and the amount of LED light emission of the infrared detection camera, used in an off-movement LED light emission amount determining process of step S260 of FIG. 27A.

FIG. 30A is a graph of which the abscissa axis represents outside light infrared component and the ordinate axes respectively represent the ISO speed, exposure time, and the amount of LED light emission of the infrared detection camera, which is used in the off-movement LED light emission amount determining process of step S260 of FIG. 27A. Here, the LED light emission amount means the amount of light emission of the infrared LED 22.

As shown in FIG. 30A, in the off-movement LED light emission amount determining process, the LED light emission amount (first irradiation amount) is determined by the face direction detection section 20 (first determining unit) according to an outside light infrared component.

The outside light infrared component here is the average value of infrared components in the face detection excluded region determined in step S243, acquired from the LED OFF image acquired in step S241. When there is no block of which the block luminance value is greater than or equal to the threshold in the LED OFF image (NO in step S241) and the face detection excluded region is not determined, the outside light infrared component is the average value of infrared components acquired from the LED OFF image.

When, for example, the outside light infrared component is small in FIG. 30A, ISO speed, exposure time, and LED light emission amount all are set to constant values. On the other hand, with an increase in outside light infrared component, the ISO speed of the infrared detection camera is controlled to be decreased, and the LED light emission amount is increased accordingly. As the outside light infrared component further increases to be bright, the exposure time is controlled to be shortened while the ISO speed is maintained, and the LED light emission amount is increased accordingly.

In this way, in the off-movement LED light emission amount determining process, the exposure time and the ISO speed (second exposure condition) and the LED light emission amount are controlled, and an LED ON image (second image) and an LED OFF image (third image) for generating a difference image are acquired.

Figure 29A:
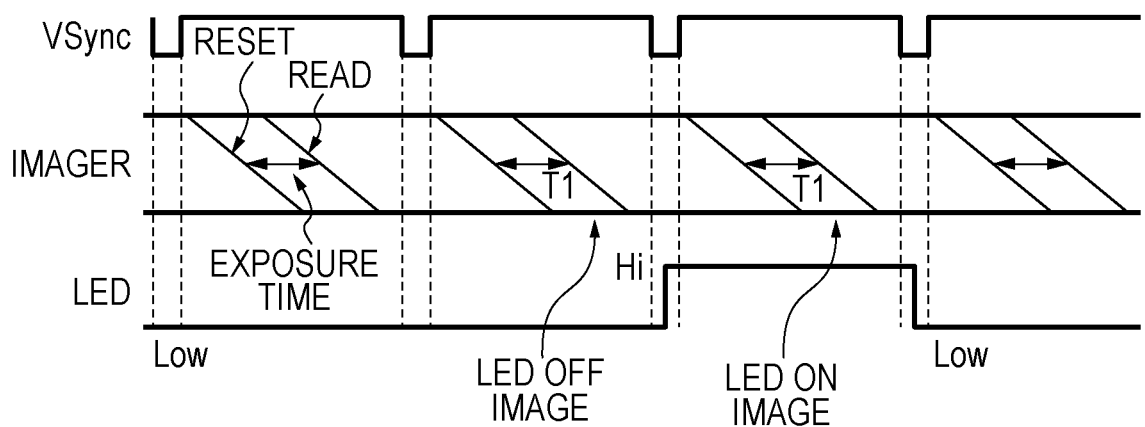
FIG. 29A is a timing chart of exposure by an image capture element in the infrared detection camera and switching of an infrared LED signal in the fifth embodiment.

FIG. 29A is a timing chart of exposure by the image capture element (imager) in the infrared detection camera and switching of an infrared LED signal in the present embodiment.

As shown in FIG. 29A, acquiring an image when the infrared LED 22 is off (LED OFF image) and acquiring an image when the infrared LED 22 is on (LED ON image) are performed by shooting under the same exposure condition. In the present embodiment, detection of the face direction is performed by generating a difference image obtained by subtracting the LED OFF image from the LED ON image and extracting the difference image as a region irradiated by the infrared LED 22. Therefore, the exposure conditions of the LED ON image and the LED OFF image can be the same.

However, the infrared LED 22 is turned on during exposure for acquiring an LED ON image, so an image signal value of the LED ON image depends on not only the exposure condition at the time of shooting but also the irradiation amount of the infrared LED 22. When, for example, the exposure time of the infrared detection camera becomes half, the signal value of an infrared LED irradiation component is extracted similarly as a half. Therefore, when the exposure time of the LED ON image is set to a half, the light emission amount of the infrared LED 22 is doubled to make the infrared irradiation component have a signal amount equivalent to the original signal amount. In other words, in the above-described outside light excluded face direction detection exposure condition determining process of step S220 of FIG. 27A, when the exposure condition of the infrared detection camera is set to be dark because the luminance value of the neck region is large, the outside light infrared component also reduces, so the light emission amount of the infrared LED 22 needs to be increased.

In the present embodiment, the description has been made on the assumption that the exposure condition at the time of shooting with irradiation of the infrared LED 22 and the exposure condition at the time of shooting without irradiation of the infrared LED 22 are the same. However, when the exposure conditions (exposure time and ISO speed) are different between the LED ON image and the LED OFF image, a difference image can be acquired after any one or both of the images are corrected such that an equivalent exposure condition is obtained in accordance with a difference in exposure condition.

Figure 29B:
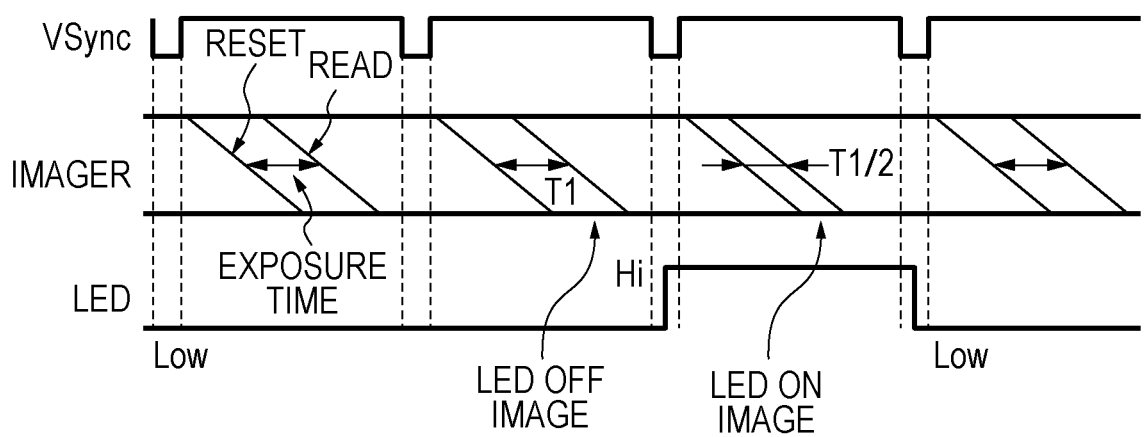
FIG. 29B is a modification of the timing chart of FIG. 29A in which the exposure conditions of an LED ON image and an LED OFF image are different from each other.

FIG. 29B is a modification of the timing chart of FIG. 29A in which the exposure conditions of the LED ON image and the LED OFF image are different from each other.

In FIG. 29B, the exposure time of the LED ON image is set to half of the exposure time of the LED ON image of FIG. 29A. In this case, the signal value of the LED ON image can be doubled, and then a difference from the LED OFF image can be acquired. When the exposure time is long and there is a possibility that a subject shake or the like occurs or when sensor saturation is likely to occur in an LED ON image, it is effective to acquire a difference image with this method.

In the present embodiment, the description has been made by using the example in which a slit rolling shutter (hereinafter, SR shutter) CMOS sensor is used for the image capture element of the infrared detection camera; however, the configuration is not limited thereto. For example, a global reset shutter (hereinafter, GR shutter) CMOS sensor that has been mainstream for security sensors or other sensors in recent years may be used as the image capture element of the infrared detection camera. In the case of shooting with the GR shutter system, exposure is performed with the same exposure time regardless of the up and down direction of an image, so rolling distortion does not occur at the time of moving object shooting.

Figure 29C:
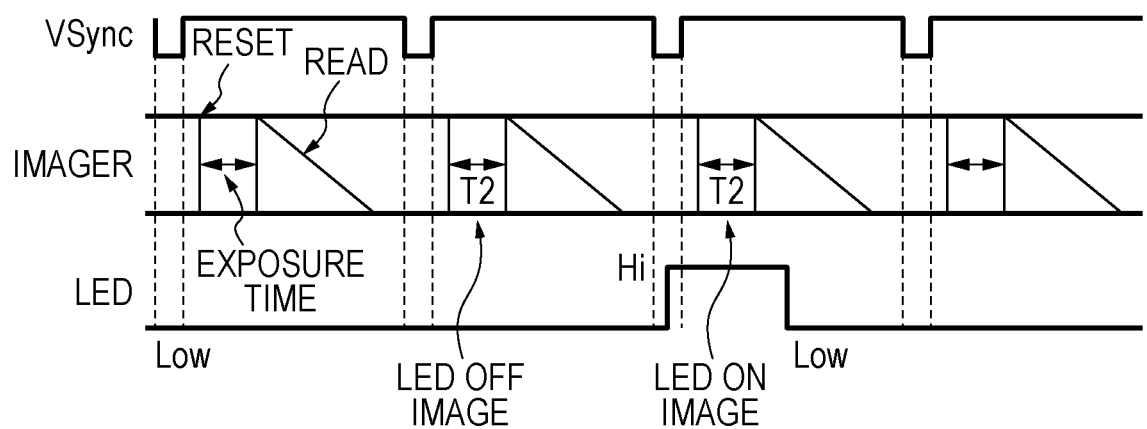
FIG. 29C is a modification of the timing chart of FIG. 29A, which uses a GR shutter CMOS sensor for the image capture element of the infrared detection camera.

FIG. 29C is a modification of the timing chart of FIG. 29A, which uses a GR shutter CMOS sensor for the image capture element of the infrared detection camera.

As shown in FIG. 29C, the GR shutter CMOS sensor is able to reduce exposure time, so the irradiation time of the infrared LED 22 is reduced, and the power consumption is reduced. In addition, rolling distortion resulting from a movement disappears for face direction detection through a subject that severely moves as described above, so the detection accuracy is improved.

Figure 29D:
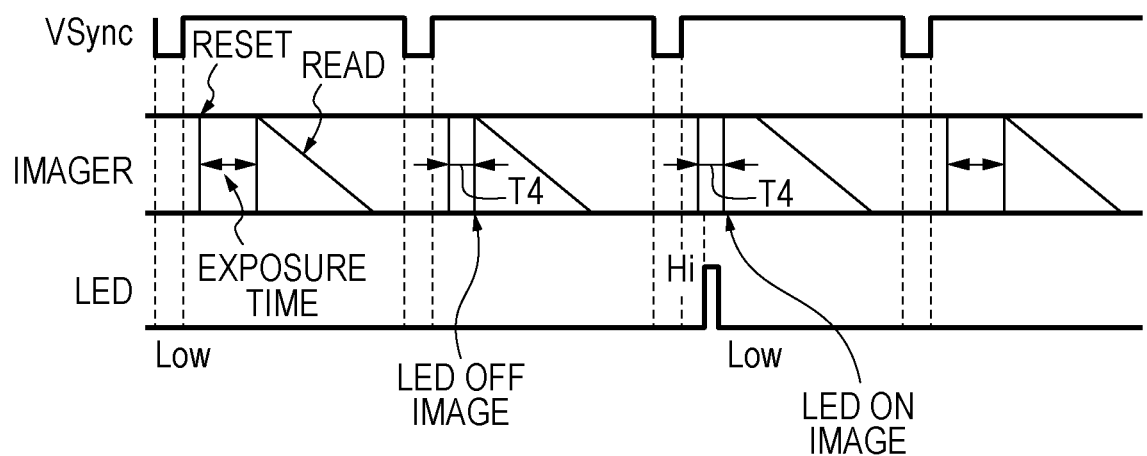
FIG. 29D is a modification of the timing chart of FIG. 29A, which uses a GR shutter CMOS sensor for the image capture element of the infrared detection camera and further extracts a face region by flash firing infrared irradiation.

FIG. 29D is a modification of the timing chart between the image capture element (imager) and the infrared LED signal (LED), as in the case of FIG. 29C, which uses a GR shutter CMOS sensor for the image capture element of the infrared detection camera and furthermore the infrared LED 22 is caused to perform flash firing.

To make the infrared LED 22 emit light as a flash, generally, electric charge is stored in a capacitor, and the stored electric charge is discharged to the infrared LED 22 at a time. Therefore, shooting is performed by synchronizing the image capture element of the infrared detection camera with the infrared LED signal. The amount of light emission of the infrared LED 22 is able to be controlled by controlling the discharge time of electric charge stored in the capacitor. General flash firing control is performed between 10 μsec and 500 μsec, and the amount of light emission is increased as the light emission control time is increased. In other words, since the time of flash firing is shorter than 1 msec, the exposure time of the infrared detection sensor is also able to be set to shorter than or equal to 1 msec. Therefore, even in an environment in which an outside light infrared component is large, the face direction is able to be detected by infrared irradiation. However, when the infrared LED 22 is caused to perform flash firing in this way, electric charge needs to be stored in a capacitor, so it is disadvantageous in that a detection time interval tends to be long since charging takes time. As a method of compensating for such a disadvantage, the amount of light emission of the infrared LED 22 at the time of flash firing may be reduced by setting the exposure time to a further shorter time and further reducing an outside light infrared component. For example, in the case of an environment in which it is not bright, the face direction is detected by turning on the infrared LED 22, in the case of a bright environment in which a large amount of infrared light is contained in outside light, the infrared LED 22 is caused to emit light as a flash to detect the face direction. Thus, both detection accuracy and detection environment are able to be maintained.

Next, the movement detection face direction detection exposure condition determining process in step S270 of FIG. 27A and the movement detection LED light emission amount determining process in step S280 of FIG. 27A will be described.

FIG. 28F shows schematic diagrams of an LED OFF image and an LED ON image shot in a case where there is a movement in the face of a cameraman, and a difference image between these images.

When there is a movement in the face of the cameraman, there occurs a difference in the face region of the cameraman between the LED ON image and the LED OFF image. Therefore, when the face region is extracted from the difference region shown in FIG. 28F, all the regions where the face has moved when infrared is irradiated and when infrared is not irradiated are erroneously extracted as an infrared irradiated region. In other words, when there is a shake in the camera body 1 or when there is a movement in the face, it is difficult to extract the face region by using a difference image.

Therefore, as described above with reference to FIG. 27A, when it is determined that there is a movement in the camera body 1 (YES in step S250), the face region is extracted without extracting a difference image in step S208. In this technique, a difference image is not computed, so, as compared to the case where the face region is extracted by using a difference image, an outside light infrared light component of an LED OFF image is reduced, and an infrared light component in the face region caused by irradiation of the infrared LED 22 is increased.

Figure 30B:
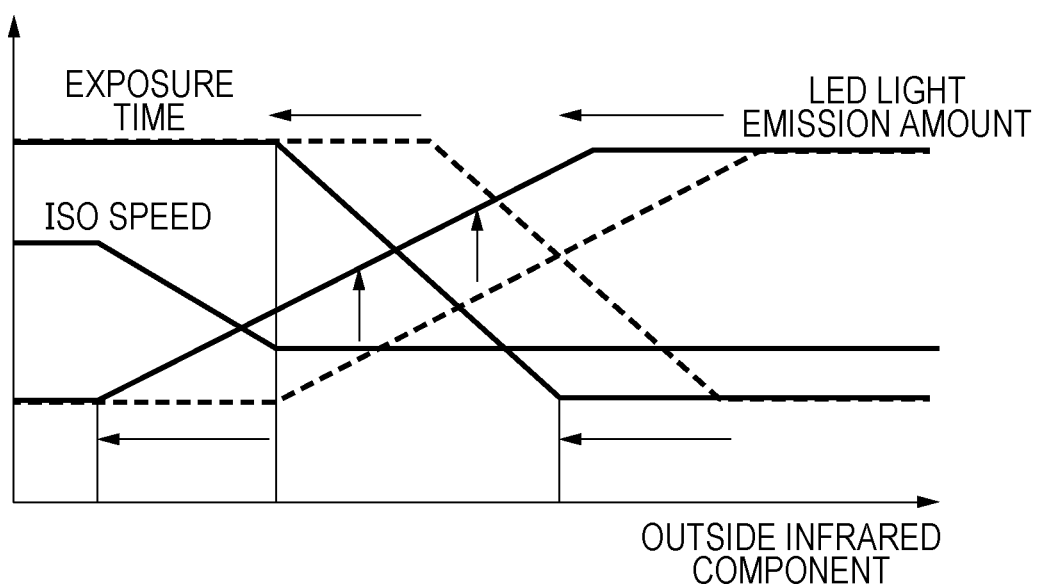
FIG. 30B is a graph of which the abscissa axis represents outside light infrared component and the ordinate axes respectively represent the ISO speed, exposure time, and the amount of LED light emission of the infrared detection camera, used in a movement-detected LED light emission amount determining process of step S280 of FIG. 27A.

FIG. 30B is a graph of which the abscissa axis represents outside light infrared component and the ordinate axes respectively represent the ISO speed, exposure time, and the amount of LED light emission of the infrared detection camera, which is used in a movement-detected LED light emission amount determining process of step S280 of FIG. 27A.

As shown in FIG. 30B, in the movement detection LED light emission amount determining process, the LED light emission amount (second irradiation amount) is determined by the face direction detection section 20 (second determining unit) according to an outside light infrared component.

In FIG. 30B, a difference from the graph used in the off-movement LED light emission amount determining process of step S260 of FIG. 27A shown in FIG. 30A is indicated by the arrows. As compared to the graph of FIG. 30A, in the graph of FIG. 30B, the setting (third exposure condition) of exposure time and ISO speed is controlled such that exposure gets darker from a state where the outside light infrared light component is relatively small. In addition, as compared to the graph of FIG. 30A, in the graph of FIG. 30B, the amount of light emission (second irradiation amount) of the infrared LED 22 is controlled to increase in accordance with the exposure control. Specifically, in FIG. 30B, the exposure condition determined in step S220 can be lowered by about two to three levels, and the amount of light emission of the infrared LED 22 can be increased by about two to three levels accordingly. As shown in the graph of FIG. 30B, the amount of light emission of the infrared LED 22 reaches the maximum in a state where the outside light infrared light component is smaller than that of the graph of FIG. 30A. Therefore, a method of extracting the face region by causing the infrared LED 22 to perform flash firing as described above or a method of extracting the face region by extending the face detection interval to set the maximum value of the amount of light emission of the infrared LED 22 to a relatively large value may be adopted. Alternatively, a method of, for example, detecting the face region by continuing the face region detection excluded region determining process in step S240 of FIG. 27A is also effective.

In the present embodiment, to detect the face direction, the description of the case where infrared light is applied from the infrared LED 22 to all over the image region; however, the configuration is not limited thereto. For example, the infrared LED 22 may serve as an infrared light pattern irradiation unit, and region setting may be performed such that the infrared LED 22 does not apply infrared light to the region excluded from detection of the face direction and determined in step S243 of FIG. 27C. With this configuration, electric power used by the infrared LED 22 to apply infrared light is reduced.

Figure 28G:
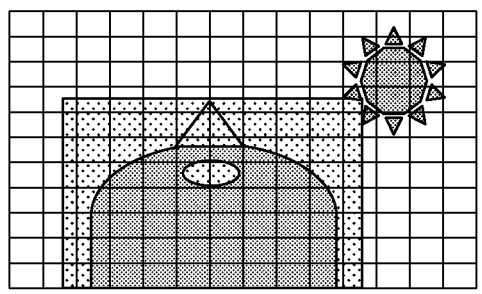
FIG. 28G is a view showing a state where the infrared LED applies infrared light to a region other than the diagonal line region of FIG. 28E, that is, a region set as the face detection region.

FIG. 28G is a view showing a state where the infrared LED 22 applies infrared light to a region other than the diagonal line region of FIG. 28E, that is, a region set as the face detection region.

In FIG. 28G, infrared light is applied to a region slightly wider than the region set as the face detection region. In this way, by setting a region to which infrared light is applied by the infrared LED 22, the face region and the face direction are able to be properly obtained even when the position and direction of the face are moving minutely.

When infrared light from the infrared LED 22 is configured not to be applied to the face detection excluded region, infrared light from the infrared LED 22 may be applied to the entire image including the face detection excluded region at a further longer period different from the detection period at which the face direction is normally detected. With this configuration, even when the face region significantly changes, the face region and the face direction are able to be detected.

To not apply infrared light from the infrared LED 22 to the face detection excluded region as described above, correspondence between an image position in the infrared detection camera and an infrared LED irradiated region needs to be acquired. For example, when there is no movement of the camera body 1 or the face or at the time of shipment of the camera body 1, such correspondence is acquired in advance. Other than the above, by taking the correlation among images shot by the infrared detection camera in time-series while periodically repeating on and off of irradiation of infrared light from the infrared LED 22, the correspondence is, of course, able to be corrected even when there occurs a deviation in mounting of the camera body 1.

In the present embodiment, the example in which the face direction detection section 20 in FIG. 4 is used as the status detection unit that detects the status of a subject has been described. Other than that, for example, a technique for detecting the center-of-gravity position of the face, a technique for detecting a hand movement (hand gesture), or other techniques may be used. As a unit of detecting the face direction, other than the above techniques, a technique for sticking an infrared light reflector, which reflects the irradiated infrared light to a subject, and detecting the face direction in accordance with the detection result of a reflection position of infrared light from the infrared light reflector, or other techniques may be used.

The present embodiment has been described on the assumption that the infrared detection camera is a monochrome sensor. In the case of a Bayer array color sensor, the sensor is, of course, able to be operated similarly to a monochrome sensor by taking weighted average of RGB four pixels around a pixel.

Sixth Embodiment

A sixth embodiment describes an embodiment related to a control method for the face direction detection section 20 of FIG. 5 in the first embodiment. More specifically, in the sixth embodiment, in a bright environment in which the light amount of infrared light is large or in a situation in which there is a movement in the face or the camera body 1, a technique for detecting a face direction by inputting an LED ON image to a model (hereinafter, referred to as AI) trained by deep learning (hereinafter, referred to as DL) will be described. In environments or situations other than the above, the above-described face direction detection using a difference image is performed.

FIG. 31 is a flowchart of the subroutine of the face direction detection process of step S200 of FIG. 7A according to the sixth embodiment.

Like step numbers denote steps in which the same processes as those of FIG. 7C of the first embodiment or FIG. 27A of the fifth embodiment, and the detailed description is omitted.

In FIG. 31, the face direction detection section 20 (unirradiated image acquiring unit, and irradiated image acquiring unit) executes step S202, step S203, and step S205 to step S208 for executing similar processes to those of steps in FIG. 7C of the first embodiment, and then the process proceeds to step S290.

In step S290, face direction detection is performed in accordance with the difference image generated in step S208, and the process proceeds to step S291.

In step S291, an AI-based face direction detection process in which the infrared light irradiated image (LED ON image) acquired in step S206 is input to the model (AI) trained by DL (described later) and the face direction is detected as the output result is executed, and the process proceeds to step S292.

In step S292, movement detection amounts of the face, the background, and the camera body 1 are calculated, and the process proceeds to step S293.

In step S293, an ambient brightness (the amount of ambient infrared light) is calculated, and the process proceeds to step S294.

In step S294, the face direction is calculated in accordance with the ambient brightness calculated in step S293, and the process proceeds to step S295.

In step S295, the face direction is calculated in accordance with the movement detection amounts of the face, the background, and the camera body 1, calculated in step S292, and the subroutine of FIG. 31 is exited.

Figure 32:
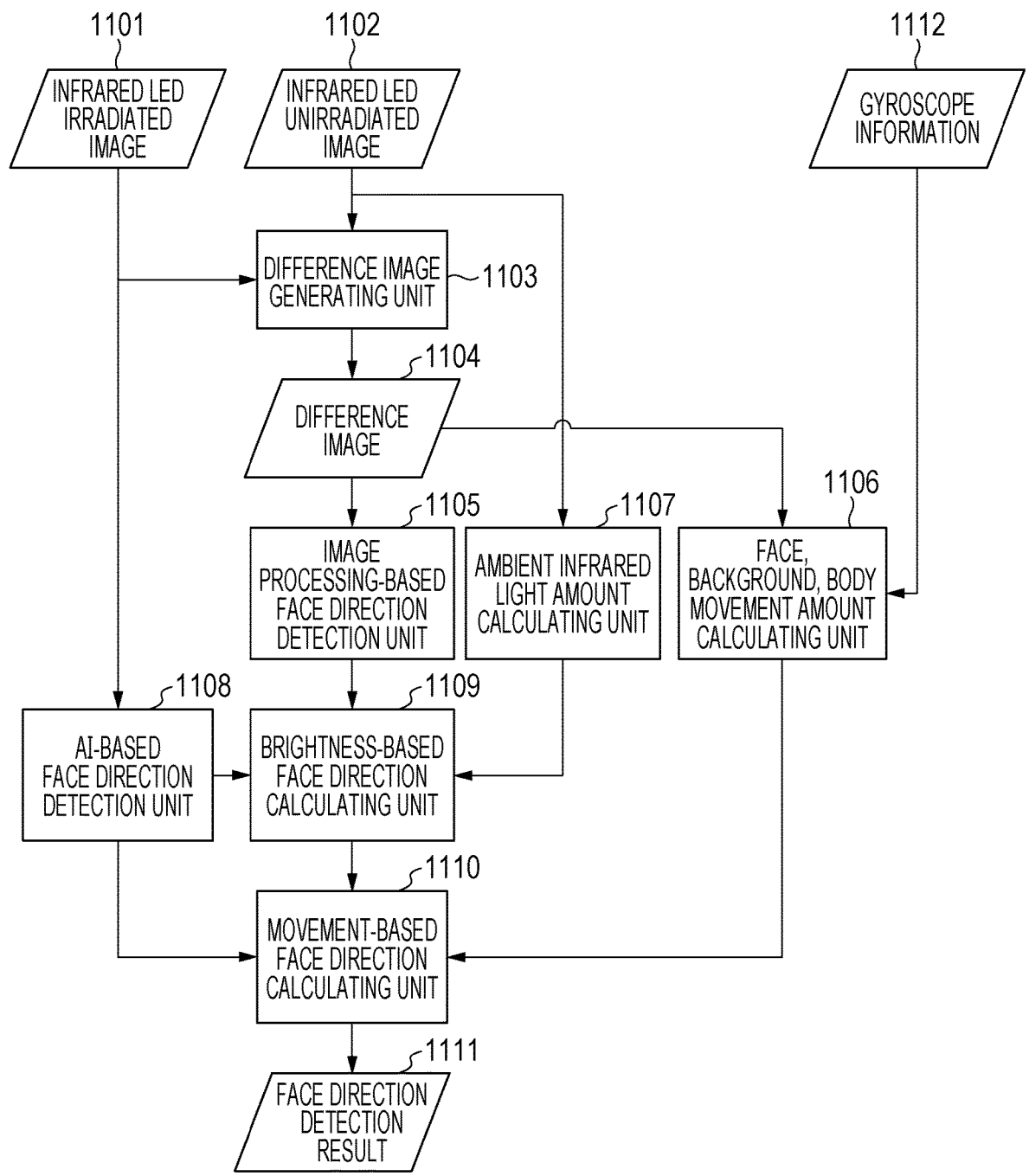
FIG. 32 is a data flow chart of a face direction detection process in the sixth embodiment.

FIG. 32 is a data flow chart of the face direction detection process in the present embodiment.

A difference image generating unit 1103 generates a difference image 1104 from an infrared LED irradiated image (LED ON image) 1101 and an infrared LED unirradiated image (LED OFF image) 1102.

An image processing-based face direction detection unit 1105 (second status detection unit) detects the face direction (second result) by using the difference image 1104 in step S290.

Gyroscope information 1112 is data that indicates the movement of the camera body 1, acquired by the acceleration sensor 108 or the angular velocity sensor 107.

A face, background, and body movement calculating unit 1106 (movement detection unit) calculates movement detection amounts of the face, the background, and the camera body 1 by using the gyro information 1112 and the difference image 1104 in step S292.

An ambient infrared light amount calculating unit 1107 (shooting environment detection unit) calculates the brightness of outside light (ambient) or the amount of infrared light of outside light (ambient) from the infrared LED unirradiated image 1102 in step S293.

An AI-based face direction detection unit 1108 (first status detection unit) detects the face direction (first result) by inputting the infrared LED irradiated image 1101 to AI to execute the AI-based face direction detection process in step S291.

A brightness-based face direction calculating unit 1109 (status calculating unit) calculates the face direction by using the amount of infrared light calculated by the ambient infrared light amount calculating unit 1107 and the detection result of the face direction of the AI-based face direction detection unit 1108 and the detection result of the face direction of the image processing-based face direction detection unit 1105. Although described in detail later, in accordance with the value of the amount of ambient infrared light, the face direction is calculated by selecting one of the detection result of the face direction by the AI-based face direction detection unit 1108 and the detection result of the face direction of the image processing-based face direction detection unit 1105 or combining these detection results. The brightness-based face direction calculating unit 1109 calculates the selected result (or the combined result) as the face direction (third result) in step S294.

A movement-based face direction calculating unit 1110 (status calculating unit) calculates the face direction by using the output of the face, background, and body movement calculating unit 1106, and the results of detection (calculation) of the face direction by the brightness-based face direction calculating unit 1109 and the AI-based face direction detection unit 1108. Although described in detail later, in accordance with the output of the face, background, and body movement calculating unit 1106, the face direction is calculated by selecting one of the results of detection (calculation) of the face direction by the brightness-based face direction calculating unit 1109 and the AI-based face direction detection unit 1108 or combining these results. The movement-based face direction calculating unit 1110 calculates the selected result (or the combined result) as the face direction (fourth result) in step S295, and outputs the calculated result as a face direction detection result 1111.

Hereinafter, the details of the processing units in FIG. 32 will be described.

A method of detecting the face direction through image processing of step S290 of FIG. 31, which the image processing-based face direction detection unit 1105 of FIG. 32 executes, is equivalent to the processes of step S209 to step S212 of FIG. 7C, and the detailed description is omitted.

The AI-based face direction detection process of step S291 of FIG. 31, which the AI-based face direction detection unit 1108 of FIG. 32 executes, is executed as follows.

In recent years, there have been suggested machine learning models that detect a face direction without detecting feature points, such as eyes and nose (see, for example, Fine-Grained Head Pose Estimation Without Keypoints (2017)).

By using these machine learning models, a face direction is able to be detected by using an image in which an upper side is shot by an infrared detection camera in the camera body 1 installed at a clavicle position of a cameraman.

The AI-based face direction detection unit 1108 may be a dedicated processing unit that uses ASIC or FPGA or may be configured to execute processing by using the overall control CPU 101.

The AI-based face direction detection unit 1108 is able to obtain angle information indicating the face direction by inputting the infrared LED irradiated image 1101 to AI set with pretrained parameters.

A large number of training images imparted with pieces of vertical and horizontal angle information, which are correct values for a face image, are used to train parameters to be set in AI for detecting a face direction.

Figure 35A:
FIG. 35A to FIG. 35C are schematic views showing examples of training images according to the sixth embodiment.
Figure 35B:
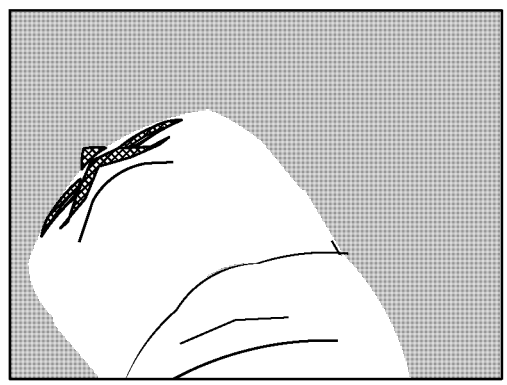
Figure 35C:

FIG. 35A to FIG. 35C are schematic views showing examples of training images according to the present embodiment. FIG. 35A shows a face image shot in a state where the face direction is zero degrees in the horizontal direction and zero degrees in the vertical direction. FIG. 35B shows a face image shot in a state where the face direction is 30 degrees in the horizontal direction and zero degrees in the vertical direction. FIG. 35C shows a face image shot in a state where the face direction is zero degrees in the horizontal direction and 33 degrees in the vertical direction.

Face images used as training images as shown in FIG. 35A to FIG. 35C are generated by moving a face in units of, for example, 10 degrees in a detection range of a face direction and a plurality of images of, for example, about 100 shots are taken at each angle.

For example, where the detection range of the face direction is −60 degrees to 60 degrees in the horizontal direction and −60 degrees to 50 degrees in the vertical direction, face images used as training images are shot by changing the vertical angle of the face in the range of −60 degrees to 50 degrees in units of 10 degrees while the horizontal angle of the face remains at zero degrees. Subsequently, face images used as training images are shot by changing the horizontal angle of the face in the range of −60 degrees to 60 degrees in units of 10 degrees while the vertical angle of the face remains at zero degrees.

Training images need to be shot so as to cover various conditions other than the angle of the face in order to support various users and various situations.

For example, subjects of training images are selected so as to cover the physical constructions, ages, and sexes of users assumed. A wide-range of background training images need to be prepared to absorb differences in background assumed, such as indoor and outdoor.

Figure 36:
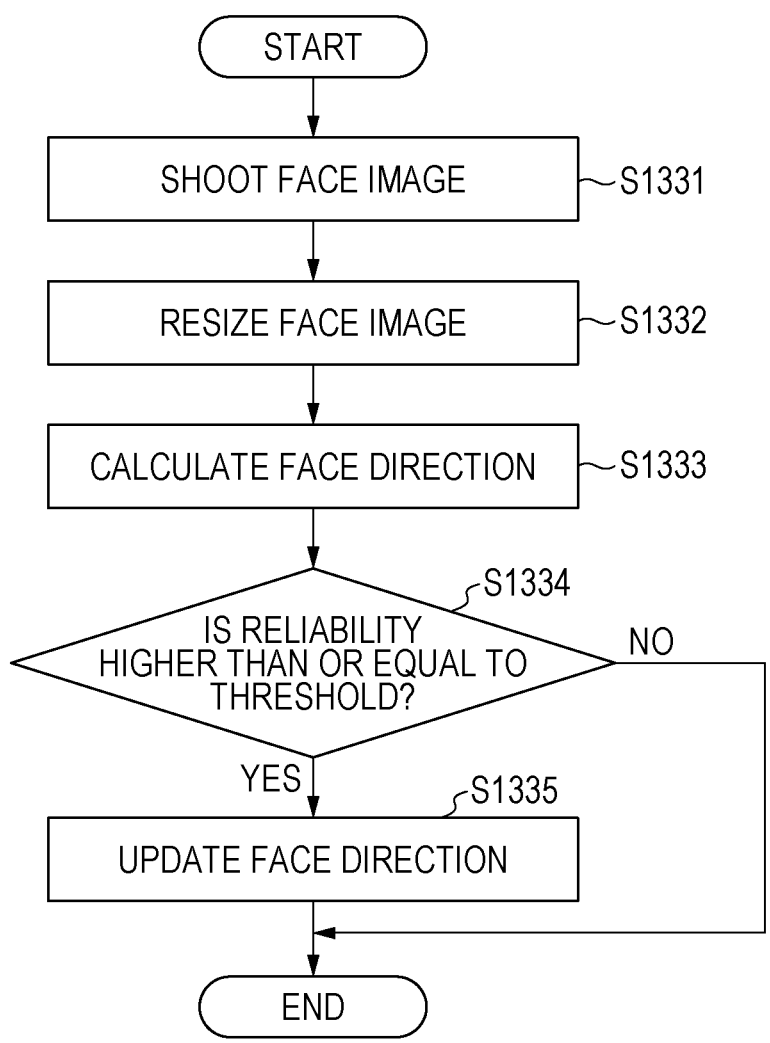
FIG. 36 is a flowchart of a subroutine of an AI-based face direction detection process in step S291 of FIG. 31 according to the sixth embodiment.

FIG. 36 is a flowchart of the subroutine of the AI-based face direction detection process in step S291 of FIG. 31.

A face image in a state where the infrared LED applies infrared light (infrared LED irradiated image 1101) is shot by using the infrared detection camera in the infrared detection processing device 27 (step S1331).

Subsequently, the face image shot in step S1331 is resized to a size to be input to the AI-based face direction detection unit 1108 (step S1332).

Subsequently, the face image resized in step S1332 is input to AI set with pre-trained parameters to calculate the face direction (step S1333). At this time, through a machine learning process, such as deep learning, not only the calculated result of the face direction but also the reliability indicating the degree of certainty of the calculated result is calculated.

In step S1334, it is determined whether the reliability calculated in step S1332 is higher than or equal to a predetermined threshold. When the reliability is higher than or equal to the threshold (YES in step S1334), the process proceeds to step S1335; otherwise, the subroutine of FIG. 36 is exited.

In step S1335, the face direction is updated with the face direction calculated in step S1333, and the subroutine of FIG. 36 is exited.

As described above, the AI-based face direction detection unit 1108 is able to detect the face direction by using machine learning, such as deep learning.

Next, a method of calculating the movement detection amounts of the face, the background, and the camera body 1 of step S292 of FIG. 31, which is executed by the face, background, and body movement calculating unit 1106 of FIG. 32, will be described.

Figure 33A:
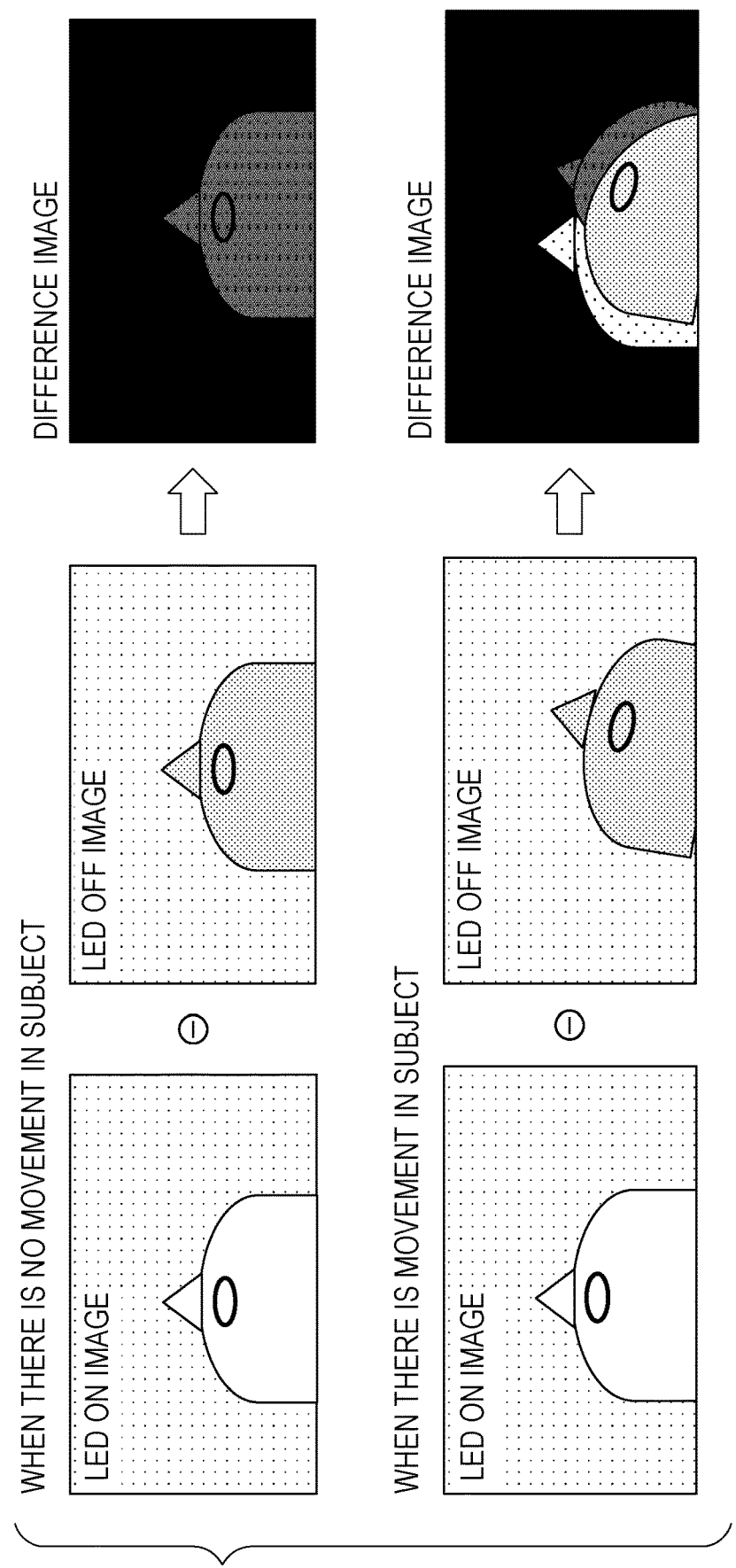
FIG. 33A shows schematic diagrams showing a state where a difference image between an LED ON image and an LED OFF image is generated when there occurs a movement in a subject.

FIG. 33A shows schematic diagrams showing a state where a difference image between an infrared LED irradiated image (LED ON image) and an infrared LED unirradiated image (LED OFF image) is generated when there occurs a movement in a subject.

As shown at the top view of FIG. 33A, when there is no movement in the subject while shooting the LED ON image and the LED OFF image, a subject region (face region) is able to be accurately extracted from the difference image.

However, as shown at the bottom view of FIG. 33A, when there is a movement in the subject while shooting the LED ON image and the LED OFF image, a strong component occurs at the edge part of the region where the face has moved, so a subject region is not able to be accurately extracted from the difference image.

FIG. 33B shows schematic diagrams showing a state where a difference image between an infrared LED irradiated image (LED ON image) and an infrared LED unirradiated image (LED OFF image) is generated when there occurs a movement in the background of a subject.

As shown at the bottom view of FIG. 33B, when a tree in the background swings while shooting the LED ON image and the LED OFF image, a tree movement component is extracted as a difference image, and a subject region is not able to be accurately extracted from the difference image.

In this way, there is a large difference in difference image between when there is a movement in the face or the background and when there is no movement, so the movement-based face direction calculating unit 1110 calculates the face direction in consideration of the amount of movement calculated by the face, background, and body movement calculating unit 1106. Only when the amount of movement is greater than or equal to a predetermined threshold and it is determined that the movement component of the face or background part is large, the movement-based face direction calculating unit 1110 may calculate the face direction in consideration of the amount of movement.

Here, the following methods are illustrated as modifications of the method of calculating the amount of movement by the face, background, and body movement calculating unit 1106. For example, a difference in center-of-gravity position coordinates obtained from a standard deviation and coordinate positions of components of a difference image from the last frame may be detected, and a variation in the coordinates of the center-of-gravity position may be calculated as an amount of movement. Other than the above-described method, a difference in angle information indicating the face direction (an angle in the up and down direction and an angle in the right and left direction) obtained by the AI-based face direction detection process to detect the movement of the face from the last frame may be calculated, and a variation in the angle information may be calculated as an amount of movement.

Detection of the movement of the camera body 1 may be performed by, for example, detecting the movement of the camera body 1 with the acceleration sensor 108 or the angular velocity sensor 107 in FIG. 5. As a method other than the above, the face, background, and body movement calculating unit 1106 may calculate an amount of movement by calculating the image correlation with the last frame or the amounts of movement of image feature points from the last frame or detecting a motion vector between frames in the entire image.

Next, a method of calculating an ambient brightness or the amount of infrared light in step S293 of FIG. 31, which is executed by the ambient infrared light amount calculating unit 1107 of FIG. 32, will be described. Calculation of the amount of ambient infrared light may be performed by correcting an accumulated value of the component of the infrared LED unirradiated image 1102 with the values of exposure time and ISO speed at the time of shooting.

When, for example, the infrared LED unirradiated image 1102 is acquired as a RAW image, the amount of infrared light is able to be calculated by converting the shutter speed at the time of shooting and a gain amount multiplied by the RAW image from an integrated value of the RAW image.

As a technique other than the above, an image region of the infrared LED unirradiated image 1102 may be separated into a region estimated as a neck region and a region estimated as a non-neck region, and the amount of infrared light may be calculated from the ratio between the integrated amounts of the separated regions. Generally, in the case of a clear weather, a larger amount of infrared light component is detected from the non-neck region, such as the sky and the background, than the neck region, so the amount of infrared light in the non-neck region may be estimated in accordance with the ratio between the integrated amounts of the separated regions.

Alternatively, for example, the amount of ambient infrared light may be determined according to the infrared component of the difference image 1104. When the difference image 1104 is subjected to exposure control to get an appropriate level at the time of shooting, the exposure control amount of the infrared detection camera is lowered (the exposure time is shortened or the ISO speed is decreased) as the outside light infrared component increases as described above with reference to FIG. 30A. Therefore, the infrared component caused by infrared LED irradiation is darker than the outside light infrared component. In other words, the amount of infrared component of the difference image 1104 reduces as the outside light infrared component increases, so the amount of ambient infrared light may be determined by using the accumulated amount of the infrared component of the difference image 1104.

An ambient brightness may be determined by an ambient brightness or subject luminance (By value), calculated from the output value of the solid-state image capture element 42 of the shooting section 40 disposed in the face forward direction in the first embodiment. Generally, as an ambient brightness increases, the likelihood of outdoor increases, so ambient brightness information may be used as an estimated value of the amount of ambient infrared light.

Next, a method of calculating the face direction of step S294 of FIG. 31, which is executed by the brightness-based face direction calculating unit 1109 of FIG. 32, will be described.

Figure 34A:
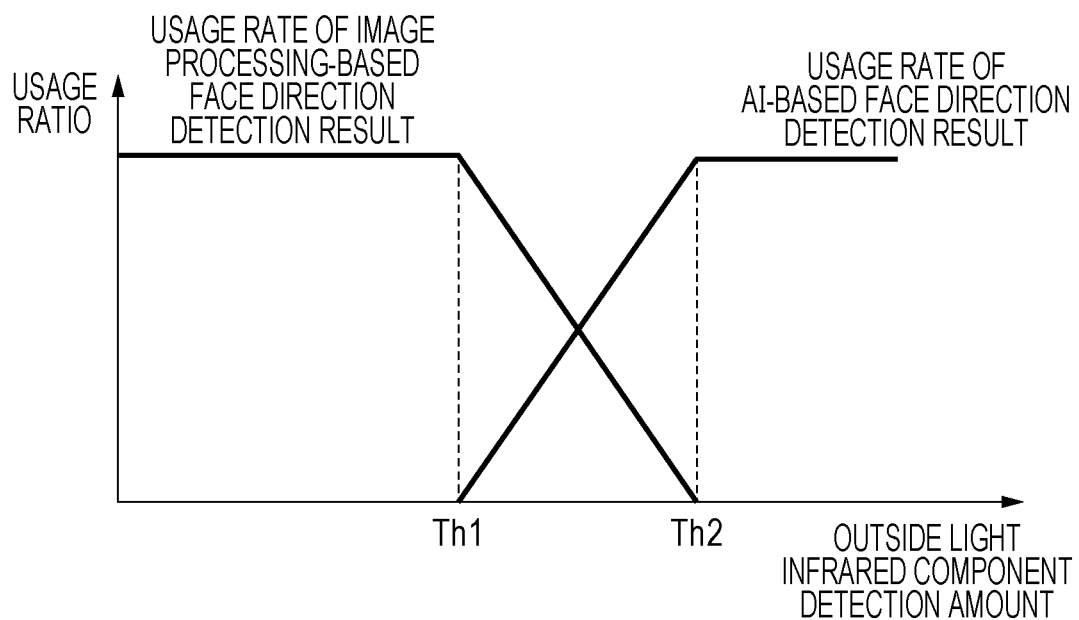
FIG. 34A is a graph for illustrating a method in which a brightness-based face direction calculating unit calculates a face direction in FIG. 32 in step S294 of FIG. 31.

FIG. 34A is a graph for illustrating a method in which the brightness-based face direction calculating unit 1109 calculates the face direction of step S294 of FIG. 31.

As shown in FIG. 34A, as the amount of infrared light (outside light infrared component detection amount) calculated by the ambient infrared light amount calculating unit 1107 increases, the usage rate of the detection result of the AI-based face direction detection unit 1108 (AI-based face direction detection result) is increased. On the other hand, as the outside light infrared component detection amount reduces, the usage rate of the detection result of the image processing-based face direction detection unit 1105 (image processing-based face direction detection result) is reduced.

More specifically, when the value of the outside light infrared component detection amount is smaller than a preset threshold Th1, the brightness-based face direction calculating unit 1109 outputs the image processing-based face direction detection result as the face direction detection result. More specifically, when the value of the outside light infrared component detection amount is larger than a preset threshold Th2, the brightness-based face direction calculating unit 1109 outputs the AI-based face direction detection result as the face direction detection result. When the value of the outside light infrared component detection amount is between the threshold Th1 and the threshold Th2, the brightness-based face direction calculating unit 1109 combines both the image processing-based face direction detection result and the AI-based face direction detection result and outputs the combined result as the face direction detection result.

As described above, as the amount of outside light infrared component increases, the amount of infrared component of the difference image 1104 reduces, and the image darkens, so the accuracy of image processing-based face direction detection decreases. Therefore, in a bright environment or in an environment in which the amount of ambient infrared light is high, the accuracy of face direction detection of the brightness-based face direction calculating unit 1109 is increased by increasing the usage rate of the AI-based face direction detection result.

On the other hand, in a dark environment or in an environment in which the infrared component is small, the difference image 1104 is able to remove an infrared component other than a reflected component caused by infrared LED irradiation, for example, an infrared component caused by a fluorescent lamp or the like on the ceiling in a building. Thus, in such a case, by increasing the usage rate of image processing-based face direction detection using the difference image 1104, the accuracy of face direction detection of the brightness-based face direction calculating unit 1109 is increased.

In a bright environment, as an alternative to a technique for detecting a face direction by performing image processing on a difference image (image processing-based face direction detection unit 1105), a technique for detecting a face direction by performing image processing on the infrared LED irradiated image 1101 is also conceivable. However, the infrared LED irradiated image 1101 includes an infrared component in a region not irradiated by the infrared LED 22, for example, the sky, sunlight, or a region reflecting sunlight. Therefore, it is difficult to separate an irradiated region of the infrared LED 22 (a region of the face and neck of a subject) and a region to which sunlight or the like is applied, and it is difficult to detect the face direction with the above-described alternative method.

Therefore, as a technique for extracting a face region from the infrared LED irradiated image 1101 and detecting a face direction from the extracted region, the above-described technique using machine learning (AI) is used since it is possible to accurately extract a region.

In the above-described technique using machine learning, a face region is extracted in a layer upstream of a trained model made up of a plurality of network layers and, in a layer downstream of that, the reliability of the face direction in the extracted face region is inferred for each angle direction of the face, such as pitch, yaw, and roll. Therefore, as described above, even when the infrared LED irradiated image 1101 is an image that includes an image component outside the face region of the subject, it is possible to accurately detect the face direction.

On the other hand, AI-based face direction detection uses a larger amount of computation for detection and takes computation time, so measures need to be taken by, for example, increasing CPU clock to compensate for that, so a large amount of electric power tends to be consumed for the system. To compensate for such a disadvantage, as described with reference to FIG. 34A, in a dark environment, the image processing-based face direction detection result can be used, and, in a bright environment, the AI-based face direction detection result can be used.

Next, a method of calculating the face direction of step S295, which is executed by the movement-based face direction calculating unit 1110 of FIG. 32, will be described.

Figure 34B:
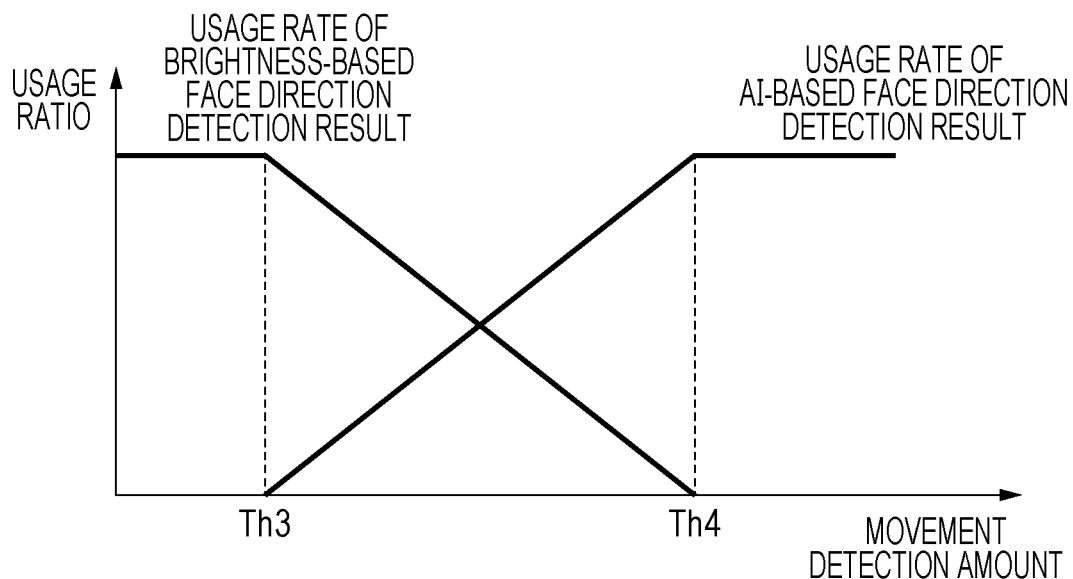
FIG. 34B is a graph for illustrating a method in which a movement-based face direction calculating unit calculates a face direction in FIG. 32 in step S295 of FIG. 31.

FIG. 34B is a graph for illustrating a method in which the movement-based face direction calculating unit 1110 calculates the face direction of step S295 of FIG. 31.

As shown in FIG. 34B, as the movement detection amounts of the face, background, and camera body 1 increase, the usage rate of the AI-based face direction detection result is increased. On the other hand, as the movement detection amounts reduce, the usage rate of the brightness-based face direction calculating result is reduced.

More specifically, when the movement detection amount is smaller than the preset threshold Th3, the movement-based face direction calculating unit 1110 outputs the brightness-based face direction calculating result as the face direction detection result. On the other hand, when the movement detection amount is larger than a preset threshold Th4, the movement-based face direction calculating unit 1110 outputs the AI-based face direction detection result as the face direction detection result. When the movement detection amount is between the threshold Th3 and the threshold Th4, the movement-based face direction calculating unit 1110 combines both the brightness-based face direction calculating result and the AI-based face direction detection result and outputs the combined result as the face direction detection result.

As described above, as at least one of the movements of the face, the background, and the camera body 1 increases, an infrared component other than an infrared component caused by infrared light from the infrared LED 22 occurs in a difference image. Therefore, as the movement increases, only the infrared LED irradiated image 1101 can be used without using a difference image, that is, the AI-based face direction detection unit 1108 can be used, to detect the face direction.

In the graph of FIG. 34B, the description has been made on the assumption that the abscissa axis represents the movement detection amounts of the face, the background, and the camera body 1; however, the configuration is not limited thereto. For example, the usage rate of the AI-based face direction detection result may be calculated in accordance with each of the amount of movement of the face, the amount of movement of the background region, and the amount of movement of the camera body 1, and the highest value of the calculated usage rates of the AI-based face direction detection results may be used as the usage rate of the AI-based detection result. With this configuration, it is possible to calculate the face direction detection result with high accuracy.

In the present embodiment, to determine whether it is an environment with a large amount of infrared light, an LED OFF image without irradiation of the infrared LED 22 is used; however, an LED ON image with irradiation of the infrared LED 22 may be used.

In the present embodiment, the AI-based face direction detection unit 1108 calculates the face direction by using an LED ON image. However, when the face direction is able to be sufficiently calculated by using an LED OFF image, the AI-based face direction detection unit 1108 may, of course, calculate the face direction by using an LED OFF image. When, for example, substantially the same face direction calculation results are obtained by the AI-based face direction detection unit 1108 from the last-frame LED ON image and LED OFF image, the face direction may be calculated by the AI-based face direction detection unit 1108 only with an LED OFF image in the next frame. However, when there is a change in the amount of ambient infrared light or when it is determined that there is a movement in the face, the background, or the camera body 1, the AI-based face direction detection unit 1108 also detects the face direction with an LED ON image. Thus, the number of times of irradiation inside the infrared LED 22 is reduced, so a reduction of electric power consumption is possible.

In the present embodiment, both the image processing-based face direction detection of step S290 and the AI-based face direction detection of step S291 are executed, and the face direction detection results of step S290 and step S291 are combined in accordance with an ambient brightness (the amount of ambient infrared light) in step S294 and output. However, the amount of ambient infrared light may be detected at the time of shooting an LED ON image, and whether both the AI-based face direction detection and the image processing-based face direction detection are executed or only one face direction detection may be selected in advance in accordance with the detection result of the amount of ambient infrared light. The details of the face direction detection process for making such a selection in advance will be described below with reference to FIG. 37.

Figure 37:
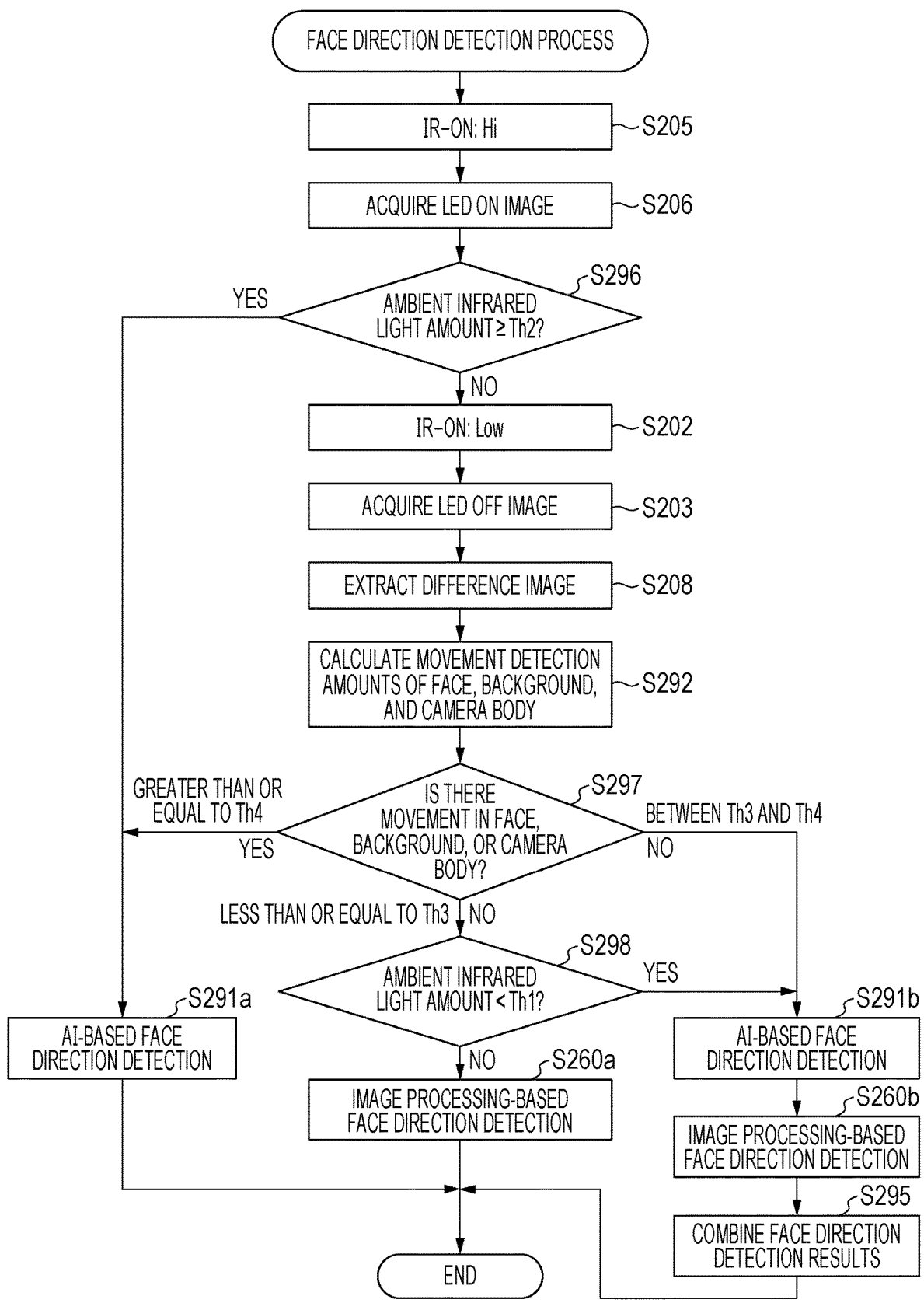
FIG. 37 is a modification of the flowchart of the subroutine of the face direction detection process of step S200 of FIG. 7A according to the sixth embodiment.

FIG. 37 is a modification of the flowchart of the subroutine of the face direction detection process of step S200 of FIG. 7A according to the sixth embodiment.

Like step numbers are assigned to steps of the same processes as those of FIG. 31, and the detailed description is omitted.

When an LED ON image is acquired in step S205 and step S206, the process proceeds to step S296.

In step S296, it is determined whether the amount of ambient infrared light is greater than or equal to the threshold Th2 of FIG. 34A. When the amount of ambient infrared light is greater than or equal to the threshold Th2 (YES in step S296), shooting of an LED OFF image or image processing-based face direction detection is not performed, and the process directly proceeds to step S291a, the AI-based face direction detection is performed, and then the subroutine of FIG. 37 is exited. On the other hand, when the amount of ambient infrared light is less than the threshold Th2 (NO in step S296), step S202, step S203, step S208, and step S292 are executed, and the process proceeds to step S297.

In step S297, it is determined whether there is a movement in the face, the background, or the camera body 1 in accordance with the movement detection amount calculated in step S292. When the movement detection amount is greater than or equal to the threshold Th4 of FIG. 34B, it is determined that there is a movement in the face, the background, or the camera body 1, the process proceeds to step S291a, the AI-based face direction detection is performed, and then the subroutine of FIG. 37 is exited. On the other hand, otherwise (when there is no movement in the face, the background, or the camera body 1), when the movement detection amount is less than or equal to the threshold Th3 of FIG. 34B, the process proceeds to step S298; whereas, when the movement detection amount is between the threshold Th3 and the threshold Th4, the process proceeds to step S291b.

In step S298, it is determined whether the amount of ambient infrared light is less than the threshold Th1 of FIG. 34A. When the amount of ambient infrared light is less than the threshold Th1 (YES in step S298), the process proceeds to step S260a, the image processing-based face direction detection is performed, and then the subroutine of FIG. 37 is exited. On the other hand, when the amount of ambient infrared light is greater than or equal to the threshold Th1, more specifically, since it is found that the amount of ambient infrared light is less than the threshold Th2 through the determination of step S296, when the amount of ambient infrared light is between the threshold Th1 and the threshold Th2, the process proceeds to step S291b.

In step S291b, the AI-based face direction detection is performed, then the process proceeds to step S260b, and image processing-based face direction detection is performed. After that, in step S295, the face direction detection results of step S291b and step S260b are combined, and then the subroutine of FIG. 37 is exited.

In the present embodiment, the face direction detection section 20 (FIG. 4) serving as the status detection unit that detects the status of a subject performs the face direction detection by using the image processing-based face direction detection or the AI-based face direction detection. Alternatively, the face direction detection section 20 may perform face direction detection with another technique. For example, a technique for determining a clipping position in accordance with the center-of-gravity position of the face, a technique for, for example, detecting a hand movement (hand gesture), or the like, may be used. As a unit of detecting the face direction, other than the above techniques, a technique for sticking an infrared light reflector, which reflects the irradiated infrared light to a subject, and detecting the face direction in accordance with the detection result of a reflection position of infrared light from the infrared light reflector, or other techniques may be used.

The embodiments of the present disclosure are described above; however, the present disclosure is not limited to these embodiments. Various modifications and changes are possible within the scope of the present disclosure.

Other Embodiments

The present disclosure can be implemented by processing of supplying a program for implementing one or more functions of the above-described embodiments to a system or apparatus via a network or storage medium, and causing one or more processors in the computer of the system or apparatus to read out and execute the program. Alternatively, embodiments of the present disclosure may be implemented by a circuit (for example, ASIC) that implements one or more functions.

According to the present disclosure, it is possible to accurately detect the status of a subject in various environments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to embodiments, it is to be understood that the disclosure is not limited to the disclosed embodiments, but is defined by the scope of the following claims.

This application claims the benefit of Japanese Patent Application No. 2021-125340, filed Jul. 30, 2021 and No. 2022-039638, filed Mar. 14, 2022, all of which are hereby incorporated by reference herein in their entirety.

What is claimed is:

1. An image capture apparatus comprising:
an irradiation unit configured to apply illumination toward a subject;
a first image capture unit;
one or more processors; and
a memory storing a program which, when executed by the one or more processors, causes the image capture apparatus to function as:
a first image acquiring unit configured to acquire a first image by capturing an image of the subject in a first exposure condition with the first image capture unit in a state where the illumination is not applied toward the subject;
a first determining unit configured to determine a first irradiation amount used by the irradiation unit, and a second exposure condition in accordance with the first image;
a second image acquiring unit configured to acquire a second image by capturing an image of the subject in the second exposure condition with the first image capture unit in a state where the illumination is applied toward the subject with the first irradiation amount;
a third image acquiring unit configured to acquire a third image by capturing an image of the subject in the second exposure condition with the first image capture unit in a state where the illumination is not applied toward the subject;
a shake detection unit configured to detect a movement of at least one of the image capture apparatus and the subject; and
a status detection unit configured to detect a status of the subject by using a difference image between the second image and the third imagery,
wherein, when the shake detection unit has not detected the movement, the status detection unit is configured to detect a status of the subject by using the difference image.

2. The image capture apparatus according to claim 1, wherein the first exposure condition is determined such that, within the first image, a brightness in a predetermined region of the subject is lower than a predetermined brightness.

3. The image capture apparatus according to claim 2, wherein the predetermined region is a neck region of a human body.

4. The image capture apparatus according to claim 1, further comprising:
wherein the image capture apparatus further functions as:
a second determining unit configured to, when the shake detection unit has detected the movement, determine a third exposure condition darker than the second exposure condition and a second irradiation amount greater than the first irradiation amount in accordance with the first image; and
a fourth image acquiring unit configured to acquire a fourth image by capturing an image of the subject in the third exposure condition with the first image capture unit in a state where the illumination is applied toward the subject with the second irradiation amount,
wherein when the shake detection unit has detected the movement, the status detection unit is configured to detect a status of the subject by using the fourth image.

5. The image capture apparatus according to claim 4, wherein the image capture apparatus further functions as an excluded region determining unit configured to determine a region to be excluded from a detection region to be detected by the status detection unit, from each of the first to fourth images.

6. The image capture apparatus according to claim 1, wherein the status detection unit is a direction detection unit configured to detect a direction in which the subject is facing.

7. The image capture apparatus according to claim 6, further comprising a second image capture unit configured to capture an image in the direction detected by the direction detection unit.

8. The image capture apparatus according to claim 1, wherein the irradiation unit is configured to apply infrared light as the illumination, and the first image capture unit includes a filter configured to pass infrared light.

9. A control method for an image capture apparatus that includes an irradiation unit configured to apply illumination toward a subject, and a first image capture unit, the control method comprising:
a first image acquiring step of acquiring a first image by capturing an image of the subject in a first exposure condition with the first image capture unit in a state where the illumination is not applied toward the subject;
a first determining step of determining a first irradiation amount used by the irradiation unit, and a second exposure condition in accordance with the first image;
a second image acquiring step of acquiring a second image by capturing an image of the subject in the second exposure condition with the first image capture unit in a state where the illumination is applied toward the subject with the first irradiation amount;
a third image acquiring step of acquiring a third image by capturing an image of the subject in the second exposure condition with the first image capture unit in a state where the illumination is not applied toward the subject;
a shake detection step of detecting a movement of at least one of the image capture apparatus and the subject; and
a status detection step of detecting a status of the subject by using a difference image between the second image and the third image,
wherein, when the shake detection step has not detected the movement, the status detection step detects a status of the subject by using the difference image.

10. An image capture apparatus comprising:
an irradiation unit configured to apply illumination toward a subject;
a first image capture unit;
one or more processors; and
a memory storing a program which, when executed by the one or more processors, causes the image capture apparatus to function as:
an unirradiated image acquiring unit configured to acquire an unirradiated image by capturing an image of the subject with the first image capture unit in a state where the illumination is not applied toward the subject;

an irradiated image acquiring unit configured to acquire an irradiated image by capturing an image of the subject with the first image capture unit in a state where the illumination is applied toward the subject;

a first status detection unit configured to detect a status of the subject as a first result by using one of the unirradiated image and the irradiated image;

a second status detection unit configured to detect a status of the subject as a second result by using the unirradiated image and the irradiated image; and a status calculating unit configured to calculate a status of the subject by using the first and second results, wherein the status calculating unit includes a shooting environment detection unit configured to detect a brightness around the subject, and the status calculating unit is configured to, in accordance with the detected value of the brightness around the subject, and the first and second results, calculate a status of the subject as a third result.

11. The image capture apparatus according to claim 10, wherein a face direction of the subject is detected as the status of the subject.

12. The image capture apparatus according to claim 10, wherein the shooting environment detection unit is configured to detect a brightness around the subject from the unirradiated image.

13. The image capture apparatus according to claim 10, wherein the status calculating unit is configured to calculate the second result as the third result when the detected value of the brightness around the subject is lower than a first threshold Th1, calculate the first result as the third result when the detected value of the brightness around the subject is higher than a second threshold Th2 which is inferior to the first threshold Th1, and calculate a combined result of the first and second results as the third result when the detected value of the brightness around the subject is between the first threshold Th1 and the second threshold Th2.

14. The image capture apparatus according to claim 10, wherein the status calculating unit further includes a movement detection unit configured to detect at least one movement of a vibration of the image capture apparatus, a movement of the subject, and a movement of a background of the subject, and the status calculating unit is configured to calculate a status of the subject as a fourth result in accordance with a value of a detected amount of the at least one movement, and the first and third results.

15. The image capture apparatus according to claim 14, wherein the movement detection unit is configured to detect the at least one movement in accordance with a difference image between the irradiated image and the unirradiated image.

16. The image capture apparatus according to claim 15, wherein the movement detection unit is configured to detect the at least one movement in accordance with an amount of movement of an image feature point from a last frame.

17. The image capture apparatus according to claim 14, wherein the status calculating unit is configured to calculate the third result as the fourth result when the detected value of the amount of the at least one movement is less than a third threshold Th3, calculate the first result as the fourth result when the detected value of the amount of the at least one movement is greater than a fourth threshold Th4 which is inferior to the third threshold Th3, and calculate a combined result of the first and third results as the fourth result when the detected value of the amount of the at least one movement is between the third threshold Th3 and the fourth threshold Th4.

18. The image capture apparatus according to claim 10, wherein the second status detection unit is configured to detect a status of the subject from a difference image between the irradiated image and the unirradiated image.

19. The image capture apparatus according to claim 10, wherein the first status detection unit is configured to input one of the irradiated image and the unirradiated image to a trained model trained by deep learning, and detect a status of the subject as an output result of the trained model.

20. The image capture apparatus according to claim 10, wherein the irradiation unit is configured to apply infrared light as the illumination, and the first image capture unit includes a filter configured to pass infrared light.

21. A control method for an image capture apparatus that includes an irradiation unit configured to apply illumination toward a subject, and a first image capture unit, the control method comprising:

an unirradiated image acquiring step of acquiring an unirradiated image by capturing an image of the subject with the first image capture unit in a state where the illumination is not applied toward the subject;

an irradiated image acquiring step of acquiring an irradiated image by capturing an image of the subject with the first image capture unit in a state where the illumination is applied toward the subject;

a first status detection step of detecting a status of the subject as a first result by using one of the unirradiated image and the irradiated image;

a second status detection step of detecting a status of the subject as a second result by using the unirradiated image and the irradiated image; and a status calculating step of calculating a status of the subject by using the first and second results, wherein the status calculating step includes a shooting environment detection step of detecting a brightness around the subject, and the status calculating step is configured to, in accordance with the detected value of the brightness around the subject, and the first and second results, calculate a status of the subject as a third result.

22. A non-statutory computer-executable medium comprising instructions which, when executed by an image capture apparatus that includes an irradiation unit configured to apply illumination toward a subject and a first image capture unit, cause the image capture apparatus to carry out a control method comprising:

a first image acquiring step of acquiring a first image by capturing an image of the subject in a first exposure condition with the first image capture unit in a state where the illumination is not applied toward the subject;

a first determining step of determining a first irradiation amount used by the irradiation unit, and a second exposure condition in accordance with the first image;

a second image acquiring step of acquiring a second image by capturing an image of the subject in the second exposure condition with the first image capture unit in a state where the illumination is applied toward the subject with the first irradiation amount;

a third image acquiring step of acquiring a third image by capturing an image of the subject in the second exposure condition with the first image capture unit in a state where the illumination is not applied toward the subject;

a shake detection step of detecting a movement of at least one of the image capture apparatus and the subject; and a status detection step of detecting a status of the subject by using a difference image between the/second image and the third image, wherein, when the shake detection step has not detected the movement, the status detection step detects a status of the subject by using the difference image.

23. A non-statutory computer-executable medium comprising instructions which, when executed by an image capture apparatus that includes an irradiation unit configured to apply illumination toward a subject, and a first image capture unit, cause the image capture apparatus to carry out a control method comprising:

an unirradiated image acquiring step of acquiring an unirradiated image by capturing an image of the subject with the first image capture unit in a state where the illumination is not applied toward the subject;

an irradiated image acquiring step of acquiring an irradiated image by capturing an image of the subject with the first image capture unit in a state where the illumination is applied toward the subject;

a first status detection step of detecting a status of the subject as a first result by using one of the unirradiated image and the irradiated image;

a second status detection step of detecting a status of the subject as a second result by using the unirradiated image and the irradiated image; and a status calculating step of calculating a status of the subject by using the first and second results, wherein the status calculating step includes a shooting environment detection step of detecting a brightness around the subject, and the status calculating step is configured to, in accordance with the detected value of the brightness around the subject, and the first and second results, calculate a status of the subject as a third result.

\* \* \* \* \*